(12) United States Patent
Lastra Diaz et al.

(10) Patent No.: US 10,509,814 B2
(45) Date of Patent: Dec. 17, 2019

(54) SYSTEM AND METHOD FOR THE INDEXING AND RETRIEVAL OF SEMANTICALLY ANNOTATED DATA USING AN ONTOLOGY-BASED INFORMATION RETRIEVAL MODEL

(71) Applicant: UNIVERSIDAD NACIONAL DE EDUCACIÓN A DISTANCIA (UNED), Madrid (ES)

(72) Inventors: Juan Jose Lastra Diaz, Madrid (ES); Ana Garcia Serrano, Madrid (ES)

(73) Assignee: UNIVERSIDAD NACIONAL DE EDUCACION A DISTANCIA (UNED), Madrid (ES)

( * ) Notice: Subject to any disclaimer, the term of this patent is extended or adjusted under 35 U.S.C. 154(b) by 897 days.

(21) Appl. No.: 14/576,679

(22) Filed: Dec. 19, 2014

(65) Prior Publication Data

US 2016/0179945 A1 Jun. 23, 2016

(51) Int. Cl.
*G06F 17/30* (2006.01)
*G06F 16/36* (2019.01)
(Continued)

(52) U.S. Cl.
CPC ...... *G06F 16/367* (2019.01); *G06F 16/24522* (2019.01); *G06F 16/24573* (2019.01);
(Continued)

(58) Field of Classification Search
CPC .......... G06F 17/30734; G06F 17/3043; G06F 17/30525; G06F 17/3053; G06F 17/30595
(Continued)

(56) References Cited

U.S. PATENT DOCUMENTS 7,672,952 B2 * 3/2010 Isaacson ................ G06K 9/627
707/999.01
7,953,593 B2 * 5/2011 Marchisio ......... G06F 17/30672
704/9

(Continued)

OTHER PUBLICATIONS

Saruladha ("A Survey of Semantic Similarity Methods for Ontology based Information Retrieval"), 2010 Second International Conference on Machine Learning and Computing (Year: 2010).*

*Primary Examiner* — Irete F Ehichioya
*Assistant Examiner* — Johnese T Johnson
(74) *Attorney, Agent, or Firm* — Lucas & Mercanti, LLP

(57) ABSTRACT

System and method for the indexing and retrieval of semantically annotated information units from a collection of semantically annotated indexed information units in response to a query using an ontology-based IR model. The retrieval method comprises: receiving a semantically annotated query with semantic annotations to individuals or classes within a determined populated base ontology; embedding, as a set of weighted-mentions to individuals or classes within the populated base ontology, the semantically annotated query in a semantic representation space of an ontology-based metric space IR model; obtaining the representation in the semantic representation space for every indexed information unit; computing the Hausdorff distance between the space representation of the query and the space representation of all the indexed information units of the collection; retrieving and ranking, the relevant information units based on the computed Hausdorff distance.

53 Claims, 17 Drawing Sheets

(51) Int. Cl.
    *G06F 17/27*      (2006.01)
    *G06F 16/28*      (2019.01)
    *G06F 16/2452*    (2019.01)
    *G06F 16/2457*    (2019.01)
    *G06F 16/33*      (2019.01)

(52) U.S. Cl.
    CPC ...... *G06F 16/24578* (2019.01); *G06F 16/284* (2019.01); *G06F 16/3334* (2019.01); *G06F 17/2785* (2013.01)

(58) Field of Classification Search
    USPC .......................................................... 707/739
    See application file for complete search history.

(56) References Cited

U.S. PATENT DOCUMENTS

2010/0324927 A1* 12/2010 Tinsley ................. G06F 19/322
                                                    705/2
2012/0076422 A1* 3/2012 Yang .................... G06K 9/6211
                                                    382/201

* cited by examiner

| Ontology-based metric space models | | | | | |
|---|---|---|---|---|---|
| IR Model | Doc. features | Doc. Space | Retrieval | Weighting | Ranking |
| Rada et al., 1989 | Set of boolean concepts | Ontology-based metric space (shortest path) | Integrated in ranking | Boolean | Average distance among sets of concepts |
| Present invention | Set of weigthed instances and concepts | Intrinsic ontology-based metric space (extension of JC distance) | Integrated in ranking | IC-based TF weights | Haussdorff distance among sets of weighted concepts and instances |
| Concept-based adapted VSM models | | | | | |
| IR Model | Doc. features | Doc. Space | Retrieval | Weighting | Ranking |
| Fang et al., 2005 | Weighted bivector of instances and keywords | Instance-keyword based bivector VSM | OWL-DL queries | TFIDF + semantic saliency factor | Bivector cosine score combination |
| Vallet et al., 2005 Castells et al., 2007 | Weighted bivector of instances and keywords | Instance-keyword based bivector VSM | SPARQL queries | TFIDF | Bivector cosine score combination |
| Mustafa et al., 2008 | Concept-based weighted vector | Concept-based single vector VSM | Pairwise semantic distance among sets of concepts (query and document) | TFIDF | Combined score (cosine function + edge-counting semantic distance) |
| Dragoni et al., 2010 | Wordnet concept-based vector | Concept-based single vector VSM | Integrated in ranking | TFIDF | Cosine score |
| Egozi et al., 2011 | Vector of weigthed keywords — Wikipedia ESA-concepts | enriched ESA concept-based single vector VSM | ESA-based retrieval (doc-passages ranking) | Combined ESA-concept cosine score for passages and full document | Combined concept-based cosine score document-passages vs query |
| Cao & Ngo, 2012 | Multi-vectors of weighted keywords + ontological features | enriched concept-based multi-vector VSM | Integrated in ranking | TFIDF | Barycentric combination of multiple cosine scores |
| Machhour & Kassou, 2013 | Vector of weighted concepts | concept-based single vector VSM | Integrated in ranking | TFIDF | Cosine score |

Fig. 2

| Measure | Semantic similarity or distance measure |
|---|---|
| Rada et al. | $d(c_1, c_2) = \min_{allpaths} \{L(c_1, c_2)\}$ |
| Wu-Palmer | $sim(c_1, c_2) = \frac{2 d_S(v_3)}{d_S(v_1) + d_S(v_2)}$ |
| Hirst-St-Onge | $d(c_1, c_2) = \frac{L(c_1, c_2)}{k}$ |
| Leacock-Chodorow | $d(c_1, c_2) = \frac{L(c_1, c_2)}{\max_{c_i \in C} \{d_S(c_i)\}}$ |
| Resnik | $sim(c_1, c_2) = \max_{c_i \in sup(c_1, c_2)} \{IC(c_i)\}$ |
| Jiang-Conrath | $d(c_1, c_2) = IC(c_1) + IC(c_2) - 2 IC(LCA(c_1, c_2))$ |
| Lin | $sim(c_1, c_2) = \frac{2 \log(LCA(c_1, c_2))}{\log(p(c_1)) + \log(p(c_2))}$ |
| Distance in the present invention | $d_{wjc}(c_1, c_2) = \min_{x \in paths(c_1, c_2)} \left\{ \sum_{e_{ij} \in x} w(e_{ij}) \right\}$ <br> $w(e_{ij}) = IC(P(v_i | v_j))$ |

Fig. 3

| Id | Elements of the IOS model | Definition and notation |
|---|---|---|
| 1 | Input base ontology (taxonomy) | $T = (O, \leq_O)$ with a root element $\rho \in C \mid \forall c \in C \to c \leq_O \rho$ |
| 2 | Family of sets of instances of any ontology class | $I_C = \{I_{C_i}\}$ |
| 3 | Populated base ontology | $O = (C \cup I_C, \leq_O)$ |
| 4 | Metric ontology | $O = (C \cup I_C, \leq_O, d_C)$ |
| 5 | Frequency-based weighted-set space $D$ of semantic annotations | $D = C \cup I_C \times \mathbb{N}$ |
| 6 | Input information unit $\delta_k \subset D$ defined by a tuple of frequency-based semantic annotations within the base ontology. | $\delta_k = \{(\tau_j, f_j^k)\} \in C \cup I_C \times \mathbb{N} \mid j \in J(o)\}$ |
| 7 | Ontological representation space given by the metric space $(X, d_X)$ | $(X, d_X)$, with $X = C \cup I_C \times [0,1] \subset \mathbb{R}$ and $d_X$ is a metric |
| 8 | Intrinsic ontology embedding (structure-preserving) | A pair of functions $\Phi = (\varphi_I, \varphi_C)$, that verifies the next axioms: <br> (1) $C_1 \leq_O C_2 \Rightarrow \varphi_C(C_1) \leq_O (C_2) \Rightarrow \varphi_O(C_1) \leq_{\varphi_O(C_2)} \forall (C_1, C_2) \in C \times C$ <br> (2) $d_C(C_1, C_2) = d_H(\varphi_C(C_1), \varphi_C(C_2)) \forall (C_1, C_2) \in C \times C$ <br> (3) $\varphi_I(\tau) \subset \varphi_C(C_i) \forall \tau \in I_{C_i}$ <br> $\varphi_I(\tau_i, f_j^k) \in \varphi_C(C_j) \forall \tau_i \in I_{C_j}, \forall C_j \in C, \forall C_j \geq_O C_j$ |
| 9 | Intrinsic embedding $\varphi_I$ for individuals in the proposed model | $\varphi_I : D \to X$ <br> $\varphi_I(\tau_j, f_j^k) = \begin{cases} (\tau_j, 1), & \tau_j \in I_C \\ (o, 1), & o \notin I_C \end{cases}$ |
| 10 | Class embedding $\varphi_C$ for mention to full classes (query) in the proposed model. | $\varphi_C : C \to X$ <br> $\varphi_C(C_i) = \{x \in X \mid \pi_O(x) \leq_O C_i\}$ <br> $\pi_O : X \to C \cup I_C$ <br> $\pi_O(\tau_j, w_j) = \tau_j$ |

Fig. 9A

| Id | Elements of the IOS model | Definition and notation |
|----|---------------------------|-------------------------|
| 11 | Information units embedding $\varphi$ and static weigths $w_j^s$ (indexes) | Frequency-based annotations space: $D = C \cup I_C \times \mathbb{N}$<br>Freq-based indexed units space (power set on $D$): $\mathcal{D} = \mathcal{P}(D)$<br>$\varphi : \mathcal{D} \to X$<br>$\varphi(\delta_k) = \{(\tau_j, w_j^s) \in X \mid j \in J(k)\}, \quad w_j^s = \dfrac{f_j^b}{\sum_{j \in J(k)} f_j^b}$ |
| 12 | Semantic weighting (normalized IC value for indexed information units) which endorses our TF-based weighting scheme in row 11 above. | $\widehat{IC} : \mathcal{D} \to \mathbb{R}$<br>$\widehat{IC}(\delta_k) = \sum_{j \in J(k)} \underbrace{w_j^s}_{\text{static weight}} \cdot \underbrace{IC(\tau_j)}_{\text{dynamic \& semantic}}$ |
| 13 | Novel weighted Jiang-Conrath distance among concepts, denoted by $d_{wJC}$. The values are pre-computed in the pre-processing step (see Figure 11). | $d_{wJC} : O \times O \to \mathbb{R}$<br>$d_{wJC}(a, b) = \min_{\pi \in P(a,b)} \left\{ \sum_{e_{ij} \in \pi} w(e_{ij}) \right\}$<br>$w : E \to \mathbb{R}$<br>$w(e_{ij}) = IC(P(c_i \mid c_j)) = -\log_2(P(c_i \mid c_j))$ |
| 14 | Metric of the IOS representation space (distance among weighted-mentions to individuals and classes). This function is used in block (6.1) of Figure 12. | $d_X : X \times X \to \mathbb{R}$<br>$d_X((x, w_x), (y, w_y)) = \begin{cases} \min\limits_{LA(x) \times LA(y)} \left\{ \underbrace{-\log_2(w_x \cdot P(x \mid LA(x)))}_{(1)} \underbrace{-\log_2(w_y \cdot P(y \mid LA(y)))}_{(2)} \underbrace{+d_{wJC}(LA(x), LA(y))}_{(3)} \right\}, & \text{if } x \neq y \\ \left| \log_2\left(\dfrac{w_x}{w_y}\right) \right|, & x = y \end{cases}$ |
| 15 | Intrinsic Ontological Spaces (IOS) = metric space + intrinsic embedding | $(X, d_X)$, with $d_X$ defined in (14) above |
| 16 | Hausdorff distance among subsets of a metric space $(X, d_X)$ | $d_H : \mathcal{P}((X, d_X)) \times \mathcal{P}((X, d_X))$<br>$d_H(A, B) = \max\left\{ \sup_{a \in A} \{d_X(a, B)\}, \sup_{b \in B} \{d_X(b, A)\} \right\}$ |
| 17 | Ranking of the model given by the set-valued distance function $d_\mathcal{D}$. This function is used in block (6) of Figure 12. | $d_\mathcal{D} : \mathcal{D} \times \mathcal{D} \to \mathbb{R}$<br>$d_\mathcal{D}(\delta_k, \delta_m) = d_H(\varphi(\delta_k), \varphi(\delta_m))$ |
| 18 | Distance in the representation space between any weighted-mention and the image of a full class (query mention), denoted by $d_{IC}$. It is a special case of $d_H$ that reduces to the expression here. This function is used in block (6.2) of Figure 12. | $d_{IC} : X \times \varphi_C \subset X \to \mathbb{R}$<br>$d_{IC}((\tau_j, w_j^s), \varphi_C(C_i)) = \begin{cases} 0, & \tau_j \leq_O C_i \\ d_X((\tau_j, w_j^s), (x_{c_i}, w_j^s)), & \text{otherwise} \end{cases}$ |

Fig. 9B

SYSTEM AND METHOD FOR THE INDEXING AND RETRIEVAL OF SEMANTICALLY ANNOTATED DATA USING AN ONTOLOGY-BASED INFORMATION RETRIEVAL MODEL

FIELD OF THE INVENTION

The present invention pertains to the field of information retrieval (IR). It particularly relates to the disclosure of a novel method and system to build a structure-preserving ontology-based IR model, called Intrinsic Ontological Spaces, for the indexing and retrieval of semantically annotated data, such as text documents, web pages, or any sort of information that can be represented as a set of semantic annotations (individuals and classes) on any sort of base ontology. The proposed method bridges the gap of modelling inconsistencies in current methods through the integration of the intrinsic structure of any populated ontology in the definition of the representation space itself. Our approach can be interpreted as a semantic metrization of the populated ontologies used to represent the semantic annotations of the indexed data. Moreover, the present invention also discloses a novel ontology-based semantic distance called weighted Jiang-Conrath distance, and a family of three novel intrinsic Information Content (IC) methods for the computation of the IC-based edge weights used in the weighted Jiang-Conrath distance. These three novel intrinsic IC-computation methods are herewith called IC-JointProbUniform, IC-JointProbHypo and IC-JointProbLeaves.

The broader use of the method proposed in the invention is the development of semantic search systems for any sort of information sources that have been semantically annotated within a base ontology. The main benefit for the final users, or the public, is that any search system based in the proposed invention will get an improvement in terms of the ranking quality of the retrieved information units, and the precision and recall measures. As result, the joint improvement of these evaluation measures contributes to improve the results expected by the final users of any information search system.

BACKGROUND OF THE INVENTION

The object of the present invention is a novel ontology-based IR indexing and retrieval method and system for any sort of semantically annotated data, called in this invention as Intrinsic Ontological Spaces. The semantically annotated data are also called information units to emphasize that the model can be used to index any sort of data, such as text documents, web pages, images or any other sort of multimedia data. One of the most broadly available semantically annotated information units are the collections of text documents, or web pages, and the main application of the proposed model will be the indexation, retrieval and ranking of text documents relevant for any semantically annotated query.

The proposed method is framed in the family of ontology-based Information Retrieval (IR) models, and its main motivation is to overcome the drawbacks of the current ontology-based IR models reported in the literature.

The Vector Space Model (VSM) [Salton et al., 1975] is known as "bag of words", because every document is represented by a vector whose coordinates are defined as a function of the term occurrence frequency within a document. The set of terms used to represent every document is called the vocabulary of the model, and it defines the base vectors of the model. In most of cases, the cosine function is used as a similarity measure between a query vector and the vectors representing the indexed documents. Due to its simplicity, the VSM model has been adopted in many tasks and applications of natural language processing (NLP), such as: information retrieval (IR), document categorization (TC) and clustering, web mining and automatic text summarization (TS) among others.

Recently, the vector space models has been extended to define word and phrase spaces, such is reflected in reviews made in [Erk, 2012], [Clark, 2012] and [Turney & Pantel, 2010]. A word or phrase space is a vector space where the vectors represent these information units instead of documents, and the space metric encodes the semantic similarity between information unit pairs. The word spaces are based in the distributional hypothesis [Basin & Pennacchiotti, 2010], which sets that words in similar contexts have similar meanings. In these models, the vectors representing every word are built as a function of the terms frequency in the context of one word within a document, so that these models allow encoding some semantic relations and statistics, such as the term co-occurrence, the synonymy and the meronymy among others.

Although the vector space models has been mainly used to represent text documents, such as we saw above, these models have been successfully applied to represent other types of information units, such as words, phrases and sentences. Following the previous reasoning, the ontology-based IR model proposed here works with any information unit that can be encoded in an ontology, according to the definition below.

The information units are the objects indexed by the ontology-based IR model proposed in the present invention, and it could be text documents, web pages, sentences, multimedia objects, or any sort of data that admit a concept-instances ontology representation. In the context of the present invention, an information unit is defined as any sort of semantically annotated data that can be represented as a collection of concepts (classes) or instances of them (individuals) within an ontology.

The main limitation of the VSM model is its lack of meaning. As it is noted in [Metzler, 2007, pp. 3], most of the current academic information retrieval models use a standard "bag of words" VSM model with meaningless terms, which make impossible to retrieve documents using queries with non-explicitly terms mentioned in the corpus. By other hand, the same situation occurs in other related problems where the same meaningless version of the VSM model was used, by example, in the text categorization problem [Sebastiani, 2002] [Lewis et al., 2004]. As it is noted in [Metzler, 2007], little information is known about the IR models used in commercial search engines like Yahoo, or Google, however, given the results to some input query, we could think that these models are mainly based in meaningless terms.

The advent of the semantic web has motivated a great change of paradigm in the IR community, the IR models has moved from a model based in meaningless terms to a model based on references to concepts or its instances. This new paradigm has converted the conceptual models and the knowledge bases in its core components, and ontology languages, such as OWL, has become the favorite representation to encode this knowledge and to store the references to the indexed data. Nowadays, the use of ontologies is omnipresent in all kind of semantic retrieval task in the context of the semantic web [Ding et al., 2007], as well as in other application contexts as the bioinformatics [Pesquita et al., 2009].

Motivated by the lack of meaning in previous IR models, some novel conceptual IR models have appeared during the last decade, whose main example is the family of ontology-based IR models. The abstract definition of these IR models is given below.

An ontology-based IR model is any sort of information retrieval model which uses an ontology-based conceptual representation for the content of any sort of information unit, whose main goal is its indexing, retrieval and ranking regarding to a user query.

The family of ontology-based IR models can be subdivided in three subfamilies:

(1) the vector ontology-based IR models, such as those disclosed in [Vallet et al., 2005], [Fang et al., 2005], [Castells et al., 2007], [Mustafa et al., 2008], [Dragoni et al., 2010] and [Egozi et al., 2011], whose main feature is the use of some adaptation of the standard VSM model to manage concepts instead of meaningless terms, (2) the ontology-based metric space IR models, whose unique known examples are the pioneering work of [Rada et al., 1989] and the present invention, and (3) the query-expansion ontology-based IR models, such as those disclosed in U.S. Pat. No. 8,301,633 B2 and U.S. Pat. No. 6,675,159 B1.

The only known ontology-based IR model based in a metric space is the model proposed in [Rada et al., 1989]. The work in [Rada et al., 1989] can be considered as the oldest reference within the ontology-based IR family. However, this work is not cited by the ontology-based IR models found in the literature, despite that the Rada's measure is highly cited and well known in the literature about ontology-based semantic distances.

The main features of the family of vector ontology-based IR models, also called adapted-VSM models, are:

(1) the use of a conceptual representation for documents and queries based in an ontology, (2) the retrieval of relevant documents through any ontology query language, (3) some sort of vector space for the representation of references to concepts and instances, based in a set of orthogonal base vectors defined by the classes and individuals of the ontology, (4) some sort of adaptation of standard term-frequency weights for the definition of coordinates, (5) the use of cosine function as ranking method to sort the relevant documents, and (6) a multivector representation and ranking combining different types of features, such as concepts, keywords or ontological features.

A vector space is a very rich algebraic structure that, precisely by its richness, has been underused or misused in the scope of information retrieval. Formally, a vector space is an additive Abelian group with a scalar product that is associative and distributive, it means that the space vector includes all the inverse elements for each document, and every linear combination between them; nevertheless, all these elements of the space are not used, or required, in any IR model. Actually, the only reason to use vector spaces in the current IR models is to rank the documents using the cosine function as similarity measure, due to its simplicity and computational efficiency.

The state of the art in ontology-based IR models has proven the potential benefits derived from the use of conceptual models with regard to the meaningless IR models. However, if we study carefully the assumptions made by these conceptual models, we find some important aspects that offer an important improvement capability in terms of ranking quality, as well as in the precision and recall measures.

Main motivation behind most of the adapted-VSM models have been to build a semantic weighting method to compare semantically annotated documents, however, these models have been using the vector space model (VSM) as a black-box without take into account some important implicit assumptions of the model and its consequences.

Making a review of the current literature about the topic, we find the following gap which motivates the present invention. The gap is summarized in seven issues:

(1) orthogonality condition,
(2) cardinality mismatch,
(3) statistical fingerprint vs. semantic distances,
(4) populated ontologies are not directly indexed,
(5) lack of a semantic weighting,
(6) continuity problems of some proposed metrics on sets,
(7) the Jiang-Conrath distance is not a well defined metric, and
(8) the Jiang-Conrath distance cannot be directly applied to sets of weighted-mentions to classes and individuals.
(9) the current intrinsic IC-computation methods, used in combination with any ontology-based IC-based semantic measure as the disclosed here, does not fulfil the following structural constraints: the difference of the IC values between a parent concept and a child concept in a taxonomy must be equal to the joint probability between them, and the sum of the joint probabilities of the children concepts in every parent concept must be equal to 1.

Orthogonality condition. The base vectors of any VSM model are mutually orthogonal, it means that similarity cosine function between different base vectors is zero. One consequence of the orthogonality condition of the adapted VSM models is that two vectors associated with two documents can get a zero, or very low similarity value, when they do not share references to the same concept instances, although these instances could share a common ancestor concept in the taxonomy. For example, documents with references to bicycle and motorbike models would not be related, although the instances are derived from the two-wheel vehicle concept.

Cardinality mismatch. Most of these ontology-based models are not including references to classes as sets of objects, and others are mixing references to classes and instances (individuals) at the same representation level. The main idea behind most adaptations of the VSM models to manage the ontology information is to make a mapping from individuals and/or classes to base vectors of the representation vector space. In this way, the models are assigning two different and opposite meanings to the same base vector, in one case the base vector represents the occurrence of one object (individuals), while in the opposite case, a base vector is representing a collection of objects (classes). These inconsistencies can be summarized as a cardinality mismatch in the adapted VSM models, and the nature of the objects represented by the model.

Statistical fingerprint vs. semantic distances. The metric used to compare documents by most of published ontology-based models is based in the Euclidean angle between normalized vectors (cosine score). The vectors encode the statistical fingerprint of the indexed documents (i.e. the statistical co-occurrence relations between different concepts in a document), but this metric lacks of a meaning in the sense that they are not encoding any semantic distance between concepts, as it is made by very well established ontology-based distances, such as the Jiang-Conrath distance measure [Jiang & Conrath, 1997]. The only exception to this problem is the IR model proposed in [Rada et al., 1989] which defines a Boolean semantic model, where the documents are represented by sets of concepts, but the concepts are annotated in binary form without using any semantic weighting method, as it is provided by the method of the present invention.

Populated ontologies are not directly indexed. Many of the ontology-based IR VSM models need to retrieve the related documents with the instances and concepts in the query before ranking them. The populated ontology is not indexed directly; for this reason, it needs to be searched using any ontology-based query language, such as SPARQL or any other. By contrast, the model of the present invention builds a direct geometric representation of the data in the populated ontology, integrating retrieval and ranking in a same step. It can produce bottlenecks for large scale ontologies, but the geometric model allows the integration of well-established geometrical search structures to speed-up the queries, such as the introduced in [Brin et al., 1995].

Lack of a semantic weighting. The weights in adapted VSM models are statistical values, not related to the real semantic weight of the concept/instance in the document.

Continuity problems of some proposed metrics on sets. In [Rada et al., 1989], the authors introduce an ontology-based IR model which defines a metric space using a shortest path metric on the taxonomy, and the average distance between sets of concepts as a distance between documents. The authors report some continuity problems which can be attributed to the use of a not well defined metric on sets.

The Jiang-Conrath distance is not a well-defined metric. Some recent research has unveiled that the Jiang-Conrath distance only satisfies the metric axioms for tree-like ontologies [Orum & Joslyn, 2009]. This fact contradicts the original statement of the authors in [Jiang & Conrath, 1997]. The Jiang-Conrath distance depends on the lowest common ancestor between two concepts, which is only uniquely defined for lattices, not for general partially ordered sets (posets). Despite of the JC distance is well defined on lattices, in [Orum & Joslyn, 2009] the authors provide some counterexamples to demonstrate that neither in this case the JC distance is a metric. The novel ontology-based semantic distance disclosed in the present invention introduces a generalization of the Jiang-Conrath distance to fulfil the metric axioms on any sort of taxonomy, solving the drawbacks described above.

The Jiang-Conrath cannot be directly applied to sets of weighted-mentions to classes and individuals, as required by the semantic representation space introduced herein. The Intrinsic Ontological Spaces of the present invention defines a metric space which unifies the representation of weighted classes and individuals in a same space; thus, the model needs a semantic distance that can be extended from concepts in a taxonomy to weighted classes and individuals associate to the same objects into a populated ontology. The novel weighted Jiang-Conrath disclosed herein allows to bridge this gap, providing a base metric to define the metric of the whole representation space, which combines four classes of elements:

(1) weighted-mentions to classes,
(2) weighted-mentions to individuals,
(3) whole-mentions to classes as sets, and
(4) whole-mentions to individuals.

The current intrinsic IC-computation methods, such as the introduced in [Seco et al., 2004] and [Zhou et al., 2008] do not fulfil some important constraints related to the definition of the taxonomy as the domain of a probability space. In [Jiang & Conrath, 1997], the authors note the relation between the difference of IC values between any two adjacent concepts {child,parent} in a taxonomy T, and the joint probability P(child|parent). Precisely, this relation has been taken into account before in the literature to design new semantic measures, and we use it to derive our novel semantic distance. Specifically, this relation is given by IC(child)−IC(parent)=−binaryLog(P(child|parent)). Other important probabilistic constraint is that the sum of the P(child|parent) values for each parent node must be equal to 1. To bridge this gap we have designed one family of intrinsic IC-computation methods based in the intrinsic estimation of the joint probability that we disclose in this invention, and we use to compute the IC-based edge weights required by our novel ontology-based semantic distance. Although these IC-computation methods are used here with our novel edge-based IC semantic distance, they can be directly adapted to use in combination with any ontology-based node-based IC semantic measures, such as the measures introduced in [Resnik, 1995], [Jiang & Conrath, 1997] or [Lin, 1998] among others. Therefore, these IC-computation methods have other direct application moreover the ontology-based IR model disclosed in this invention.

The use of any sort of vector space models is omnipresent in all sorts of information retrieval (IR) models for all sorts of web and data search engines. The ontology-based IR model proposed in this invention defines a new paradigm for the semantic indexing of all sort of semantically annotated data, whose main goal is transforming the search processes made by the users from a keyword-based search to a concept-based search. Therefore, this invention can be considered as a complement and a new generation of IR models destined to substitute the current generation of keyword-based search engines. The method disclosed in this invention is framed in the family of ontology-based IR models, and it shares a common goal with other previous methods: be the cornerstone of a new generation of semantic search systems. As the VSM models, the proposed invention can be applied in the context of any natural language processing (NLP) application where any sort of semantic space is used, among we can cite: web search system, any sort of IR system for text indexing and retrieval, cross-language information retrieval (CLIR) systems, automatic text summarization systems, text categorization and clustering, question answering systems, and word disambiguation among others. Moreover, the proposed model also can be applied in bioengineering applications where the data and the domain knowledge are represented within a domain-oriented ontology.

The ontology-based IR model proposed in the present invention is able to update any sort of application based in semantic vector spaces, or ontology-based adapted VSM models. By example, the VSM model has been extensively used in the context of multilingual or cross-language IR systems (MLIR/CLIR), such as the model shown in FIG. 1. Most of CLIR systems are based in classical monolingual IR models, which are interrogated using translations of the input queries. The monolingual retrieved documents are re-indexed and/or merged to be finally ranked according to its saliency for the input query.

Other problem where adaptations of the VSM model have been proven its utility, and the proposed model in the present invention could be applied, is in the automatic text summarization (TS). In the scope of extractive TS methods we can find some conceptual models based in adaptations of the VSM model to represent the semantic similarity relations among sentences. This is the followed approach in [Meng et al., 2005] where the authors define the conceptual vector space model (CVSM), whose ideas are very close to the ontology-based IR model approach. Other TS methods are based in the clustering of sentences, originating the notion of centrality, whose core idea is that any document can be represented by the more significative (central) sentence. These clustering methods use a VSM model to represent the sentences in any document, where each vector encodes a set of features of the sentence, and the model can use different functions to establish the similarity among sentences. Among these clustering TS methods we find the pioneering works of [McKeown et al., 1999] and [Hatzivassiloglou et al., 2001], as well as the works in [Siddharthan et al., 2004] and [García-Hernández & Ledeneva, 2009]. Finally, the most recent text summarization (TS) methods are based in graph-ranking algorithms derived from PageRank and HITS, whose main references are the works of [Erkan & Radev, 2004], [Mihalcea & Tarau, 2004], [Wolf & Ginson, 2004] and [Vanderwende et al., 2004]. If the sentences within a document are considered as information units, these graph-based methods could benefit from the proposed model in the present invention, because the graphs are derived from the semantic similarity among sentences obtained through adaptations of a vector space model and a set of semantic features.

In the scope of the Q&A systems, the vector space models have been used to represent sentences within a document, and to retrieve text fragments with a potential answer to a question. These approaches inspired in IR models, jointly with other techniques, have been successfully proven in DeepQA [Chu-Carroll et al., 2012] to retrieve relevant text fragments for a user query.

Finally, other potential application of the Intrinsic Ontological Spaces of the present invention is the word disambiguation problem, where several methods based in the vector representation of the context of a word have been proposed [Navigli, 2009], following the distributional hypothesis. Due to the omnipresence of the vector space models in NLP, the proposed model has many potential applications in the scope of NLP applications.

Some related work is hereinafter described in the context of this invention as well as some potentially related patents.

The present invention is mainly related with three categories of works in the literature:

(1) the ontology-based IR models,
(2) geometric representations for taxonomies, and
(3) ontology-based semantic distances.

According to the research problem studied, the present invention pertains to the family of ontology-based IR models, whereas according to the approach followed in the proposed solution, the present invention is strongly related with the family of ontology-based semantic distance and similarity measures. In fact, the present invention includes a novel ontology-based semantic distance called weighted Jiang-Conrath distance. By other hand, the geometric approach adopted in the present invention is inspired by the geometric spirit in the pioneering works about geometry and meaning of [Widdows, 2004] and [Clarke, 2007].

For a better understanding of the literature about the topic, a summary of the main features of the analysed ontology-based IR models are shown in FIG. 2. The ontology-based IR models have been categorized in three subfamilies according to the structure of its representation space: (1) metric-space models, like in the present invention, (2) adapted Vectors Space Models (VSM-based), and (3) query-expansion models, represented by some patents cited herein. In FIG. 2, we only include a comparison of the first two subfamilies of ontology-based IR models, while the works in family of query-expansion models are subsequently described in detail.

Hereinafter, the state of the art about the ontology-based IR models will first be reviewed. Later, some methods and ideas for the geometric representation of taxonomies that are related to the core ideas of the IR model proposed in the present invention will also be commented. Lastly, the state of the art about ontology-based semantic distances will be introduced and reviewed, enumerating the known facts and drawbacks about the Jiang-Conrath distance, which have motivated the development of the novel semantic distance that we call weighted Jiang-Conrath distance.

1. Ontology-Based IR Models

Regarding the ontology-based IR models in the state of the art, some previous surveys about the family of ontology-based IR models can been found, such as the reviews made in [Castells, 2008] and [Fernandez et al., 2011], as well as the survey in the context of multimedia retrieval made in [Kannan et al., 2012]. In other work [Wu et al., 2011], the authors survey the query expansion problem in IR and others ontology-based IR models, which will be later discussed. The surveys cited can be useful to follow the analysis of the state of the art about the object of the invention herein disclosed.

Ontology-Based IR Models Versus the Query Expansion Approaches.

The query expansion problem was reviewed in [Wu et al., 2011]. The relation between this approach and the ontology-based IR models are analysed. We can consider the query expansion approach the dual of the ontology-based models: the first one expands the query, while the last one expands the conceptual representation of the document. In the query expansion approach, the terms in the query are expanded with synonyms, related concepts or semantic annotations, and the expanded vector of terms is used to interrogate an unstructured semantic representation space. By other hand, in the ontology-based approach, the representation space is structured, and the semantic relations are already implicit in the indexation model, therefore the semantic representation of the documents is already expanded to match the queries in its base form.

In [Castells, 2008], the author makes a literature survey about the use of ontologies in IR and web mining, approach commonly known as semantic web, while he describes his experience in the development of a ontology-based IR system introduced in [Castells et al., 2007]. In other recent work [Fernandez et al., 2011], the same group of authors introduce some extensions to the model in [Castells et al., 2007] to can operate at web scale, while they also extend their previous literature survey. In [Kannan et al., 2012], the authors survey the ontology-based IR models in the context of the multimedia IR field.

Ontology-Based IR Models Based in Metric Spaces.

The first published ontology-based IR model is proposed in [Rada et al., 1989]. The main motivation of this work is the development of an IR model for biomedical applications, where the documents are represented as sets of concepts within a common ontology. Rada et al. proposes to use the shortest path between concepts within an ontology as a measure of its semantic distance, and they call this measure "distance". The proposed IR model represents the documents and the queries by the set of concepts referenced in these information sources; nevertheless, the proposed IR model lacks of any weighting method, being a Boolean model. The documents are represented by the concepts associated to the instances in the document, but unlike the model of the present invention, the instances are not represented in the model. To rank the documents according to a user query, the distance function is extended among concepts to sets of concepts to define in this way a distance measure between documents. The distance between sets of concepts (documents) is defined as follows: given two documents or queries, its ranking distance is defined as the average minimum distance among all the pair wise combinations of concepts in the two sets. To achieve that the distance function on sets of concepts can verify the axioms for a metric, the distance function among sets of concepts is forced to be zero when the two input sets of concepts are equal. The last modification was defined to force the verification of the zero property axiom of a metric, but as result of it, the authors report undesired continuity problem near the zero distance value.

The IR model proposed in [Rada et al., 1989] is close to the IR model and method proposed in the present invention, which we call Intrinsic Ontological Spaces. Both models are the unique ontology-based IR models that use a metric space for the representation of the indexed information units. We can find some similarities and differences among both models in some aspects, such as: the use of ontology-based semantic distances, the representation of documents by sets (not vectors) of concepts, and the definition of a rank function between sets of concepts.

There are several similarities and differences between both models. First, both models represent documents by sets of concepts, although the Intrinsic Ontology Spaces also includes instances of concepts (individuals). Second, both models use a semantic distance defined on the ontology, but while Rada et al. use the shortest path length, the present invention uses a generalization of the Jiang-Conrath distance [Jiang & Conrath, 1997] designed to remove known drawbacks in the edge-counting family of semantic distances and the standard Jiang-Conrath distance. Third, Rada's model uses the average distance among all cross-pairs of elements to define a metric among sets of concepts, whereas the present invention uses the standard Haussdorf distance as metric, with the advantage that the Hausdorff distance is better founded from a mathematical point of view [Henrikson, 1999]. Unlike the Rada's distance among sets, the Hausdorff distance selects the maximum distance among all the point-set distance values. The Hausdorff distance is the induced metric on subsets of a metric space as result from the extension of the metric of the space to sets. The Hausdorff distance is always continuous according to the topology induced by the metric of the space, removing the drawback related to the continuity around zero that Rada et al. report for their ranking function in [Rada et al., 1989].

VSM-based ontology-based IR models. The more recent family of ontology-based IR models start with the pioneering works in [Vallet et al., 2005] and [Fang et al., 2005]. Both works were independently published in very close dates, without any cross citation between them, or in others subsequent works as [Castells et al., 2007] and [Fernandez Sánchez, 2009]. We categorize these pioneering works, and all the subsequent works reviewed herein, in a subfamily of ontology-based IR models called vector-based conceptual models, or adapted VSM models, because all of them share a common approach based in the adaptation of a classical Vector Space Model (VSM) [Salton et al. 1975] to represent concepts, instead of keywords.

The IR model proposed in [Vallet et al., 2005] was continued in [Castells et al., 2007], being this research trend the core of the thesis of Miriam Fernández [Fernández Sánchez, 2009].

In [Vallet et al., 2005] and [Castells et al., 2007], the authors propose an ontology-based IR model based in the adaptation of a VSM model to represent concepts and individuals instead of meaningless terms. This model includes most part of the features exhibited by the models in the ontology-based IR family, and it could be considered as the canonical representative of this family.

The main idea in [Castells et al., 2007] is to substitute the keywords vocabulary of a classic keyword-based (KB) VSM, which defines the base vector set, for a vocabulary of concepts and instances within the base ontology of the KB, instead of a collection of meaningless terms. The documents are represented (indexed) by a vector of adapted TFIDF (Term Frequency—Inverse Document Frequency) weights, where each weight is defined according to the saliency of a concept, or instance of a concept, within a document, and its semantic discrimination capacity. Each document is represented by a set of concepts and concept instances, instead of keywords, in this way, the system index the documents using concepts and instances as base vectors of its VSM model. To index the documents, the system associates a set of semantic annotations for the found references to concepts in the knowledge base (KB), which define the collection of concepts instantiated within each document. The automatic semantic annotation is a very complex task which still is a very active research field in the information extraction (IE) community; for this reason, the automatic semantic annotation problem is out of the scope of the present invention, such as it is made in [Castells et al., 2007], and it is assumed that the IR model, method and system herein proposed need to be integrated with additional IE components for this task.

The operation of the IR model proposed in [Castells et al., 2007] is as follows. First, the system only accepts user queries in SPARQL format and it assumes that the documents have already been semantically annotated. Second, each document is represented by a set of semantic annotations within an ontology, which are defined by the references to concepts found in the documents. Third, the SPARQL query is used to interrogate the ontology and to retrieve all the documents with annotations derived from the concepts and instances included in the query. Fourth, all the documents retrieved are represented by vectors before to be ranked, while the base of the vector space is defined by all the concepts and instances (individuals) included in the ontology, and an adaptation of TFIDF weighting scheme is used to convert the set of annotations of each document in a normalized vector expressed in the base of the concept-based vector space. Finally, the retrieved documents are ranked using the cosine function. The system is a direct and natural adaptation of the classic VSM model to manage concepts. The proposal in [Castells et al., 2007] agrees with other cited authors in that the proposed semantic IR model needs to be combined with standard keywords-based VSM models, due to the impossibility to have broad covering ontologies in a near future; for this reason, their system builds two independent VSM models (keywords and concepts) that are combined in the last retrieval stage.

The semantic retrieval capability of the Castells-Fernandez-Vallet model is derived from the semantic retrieval of annotated document in the ontology, which is able to retrieve documents with references to concepts not included in the query, starting from more abstract concepts provided in the query. This capability is the essential contribution derived from the use of ontologies in IR, as well as the main reason to its broad acceptation in all sort of semantic search applications.

The documents retrieved by the Castells-Fernandez-Vallet model are the documents annotated with entities found in the document collection retrieved by the SPARQL query [Castells et al., 2007], but the work does not clarify how it manages, if it does, the mentions to classes of concepts as mention to sets of subsumed concepts and instances. A mention to a class as set of elements means that the name of class is being used to retrieve all the information units that includes semantic annotation of concepts or instances subsumed by the name of class, in other words, the mention to a class is acting like a selection operator for the whole set of subsumed concepts.

The model in [Castells et al., 2007] was extended in [Fernandez Sánchez, 2009] and [Fernandez et al., 2011], broadening its application to a large scale and heterogeneous context as the web. Meanwhile, in [Bratsas et al., 2007], the authors introduce an application of the model in [Castells et al., 2007] to the problem of information retrieval in biomedicine, using a domain specific ontology and a fuzzy query expansion.

In [Fang et al., 2005], the authors propose an ontology-based IR model almost identical to the model in [Castells et al., 2007]. The model of Fang et al. has the same functional structure that the Castells-Fernández-Vallet model. The system admits queries defined by keywords or complex expressions which are transformed to queries in format OWL-DL. The OWL queries retrieve the related RDF triplets contained in the knowledge base (KB) with references to the concepts and instances included in the user query. From the concepts and instances in the RDF triplets, the system retrieves the associated documents, and lastly, the documents are ranked according to the user query using the cosine function. Such as in [Vallet et al., 2005], the model in [Fang et al., 2005] builds an adapted VSM representation trough a TDIDF weighting scheme using the instances-document frequency matrix, but unlike [Vallet et al., 2005], the final weights include a saliency factor whose purpose is to take into account the semantic differences among concepts and instances.

The work of [Fang et al., 2005] can be considered as a first try to include a semantic distance measure in an ontology-based IR model, although it is a coarse approximation, because the theory about ontology-based semantic distances offers a well-founded and precise solution to this problem. Precisely, the Intrinsic Ontological Spaces model builds on an extension of previous results on this theory, with the aim to provide a unified representation that integrates the intrinsic structures of the ontology in the model, providing many potential benefits to the users while it overcomes the common drawbacks of the family of ontology-based IR models.

In [Mustafa et al., 2008], the authors propose a semantic IR model based in the use of RDF triplets and a thematic similarity function. The thematic similarity function associates concepts according to its membership in a common semantic field or theme. The user queries are encoded as RDF triplets, which are expanded to include synonyms and other semantically related concepts. The query expansion with related concepts uses a neighbourhood notion based in a measure of semantic distance among concepts on the ontology. To establish the semantic similarity among the queries and the documents, the system uses the RDF triplets in the query and the RDF annotations associated to the documents. The documents with RDF triplets matching the terms in the expanded query are extracted from the collection, and are ranked according to their saliency. To select the documents that match the query terms, the authors use a set of semantic distance functions on the ontology to compute the closeness among the concepts in the query and the concepts annotated by the document, in other words, the retrieval of documents is driven by a ontology-based semantic distance function instead of a formal Boolean SPARQL query. To rank the retrieved documents, the documents are represented into a vector space of RDF concepts using a TFIDF weighting scheme; then, the documents are ranked using a combination of the cosine function and the same semantic distance function that was previously used. The semantic distance function used in the IR model is a novel edge-counting measure proposed in the same work, which includes an exponentially decreasing factor according to the depth of the nodes. The methodology can be summarized in four steps: (1) query expansion of the RDF triplets, (2) retrieval of related documents based in a novel edge-counting semantic distance, (3) mapping of the documents to a concept-based vector space using a TFIDF weighting, and (4) document ranking using the standard cosine function. The main drawback of the model of Mustafa et al. is that it retains the same geometric inconsistencies that previous ontology-based IR models, despite its smart integration of the semantic distances in the retrieval process. Although the model retrieves the documents using an ontology-based semantic distance, notion that we share as support in the model of the present invention, in [Mustafa et al., 2008] the documents are ranked in a concept-based vector space where the semantic metric is missing. A second drawback of the model is the use of an edge-counting distance, which have been refuted by the research community, such as it will be later discussed when explaining the ontology-based semantic distances. Today, the Jiang-Conrath distance [Jiang & Conrath, 1997], in combination with any IC-based intrinsic method to get the Information Content (IC) values, is one of the most broadly accepted semantic distances in the literature [Sánchez et al., 2012]. Lasty, another drawback of the IR model in [Mustafa et al., 2008] is that it does not consider instances of concepts, or named entities, in its representation, in contrast with the Intrinsic Ontological Spaces model proposed in the present invention.

In [Dragoni et al., 2010], the authors propose a concept-based vector space model which uses WordNet leaf concepts as base vectors for the representation of documents and queries. The proposed IR model is an adapted concept-based VSM model with an adapted TDIDF weighting method, and the standard cosine function as method for the ranking of saliency documents. The paper does not give details about the process to convert terms in WN concepts. Because the model does not include abstract concepts in its vocabulary, all the explicit references in the texts to abstract concepts not included in the vocabulary are discarded by the system. Also, the model does not include named entities recognizers (NER). Like the other concept-based adapted VSM models already described, the model of Dragoni et al. falls in the same modelling inconsistencies reported in the motivation section.

In [Egozi et al., 2011], the authors introduce a novel conceptual IR model based in the extension of a keywords-based VSM model with concepts defined in an ontological KB. Both, documents and queries are represented by a vector of weighted terms enriched with weighted concepts obtained through the use of an automatic annotation method, which extracts the underlying concepts within both text sources. The automatic annotation method used is called Explicit Semantic Analysis [Gabrilovich & Markovitch, 2006], and it is used to expand the standard terms-based VSM representation. The concepts used in the model are extracted from a hand-coded ontology. The authors use a feature selection method to choose the subset of concepts that best represents the corpus, and the selected concepts are used to expand the keywords-based VSM representation. The model proposed improves the results of previous methods when it is evaluated over some TREC corpus. By other hand, this model joins keywords and abstracts concepts in a same VSM model, falling into the cardinality mismatch problem reported above. The authors follow the idea mentioned in [Castells et al., 2007] about the use of the ontology-based models as a complement to standard keywords-based models. The Explicit Semantic Analysis (ESA) model does not use a formal ontology to describe the structure relations of the concepts, although it could be easily extended to do it, such as is made by the authors in their proposal.

Besides the common drawbacks of the family of ontology-based IR models previously described, the main drawback of the model in [Egozi et al., 2011] is that it only includes references to abstract concepts (classes), not to entities (instances). From an abstract point of view, the model of Egozi et al. uses the same strategies that the models in [Castells et al., 2007], [Fang et al., 2005] and [Mustafa et al., 2008]. These strategies can be summarized as follows: (1) use a concept-based representation for documents and queries, (2) the use of ontologies, and (3) indexing and retrieval of documents based in a concept-based adaptation of the VSM model.

Unlike the model in [Castells et al., 2007], which builds two independent vector representations (keywords-based and concepts-based) that are combined later in the retrieval stage, the model in [Egozi et al., 2011] mixes concepts and meaningless terms in the same VSM representation. Precisely, the core idea of the work in [Egozi et al., 2011] is to enrich the vocabulary based in keywords with concepts. The references to entities are captured by the meaningless keywords or terms, while the references to abstract concepts are captured through the ESA annotation method.

In [Cao & Ngo, 2012], the authors propose an extension of the keywords-based VSM model with ontological features associated to the named entities. The basic hypothesis is that the named entities are the more discriminative terms in most of the user queries; therefore, the enrichment of the VSM model with information not explicitly represented in the documents should lead to improvements in the precision and recall measures. The main idea is to merge in a same vector representation the TFIDF weights derived from independent vocabularies with features from different nature. The model uses a multivector representation for each document, where each document is defined by a vector of TFIDF weights defined on multiples vocabularies associated to the different types of features, such as: keywords, the alias, the associated class to the named entity, and entity identifiers among others. By last, the model uses a barycentric combination of the cosine function for each independent vector, such that the similarity between a document and a query is a weighted function of the individual similarities among pairs of independent feature vectors. The weight factors used to merge the independent similarity measures are left as free parameters to be tuned by each application. Again, this adapted VSM model falls in the same modelling inconsistencies already reported.

In [Machhour & Kassou, 2013], the authors introduce a method to integrate the use of ontologies in VSM-based systems for text categorization (TC) already existent. The core idea of the method is to map the original term-based vectors, whose coordinates represent meaningless terms, to concept-based vectors whose coordinates represent concepts within ontology. The authors evaluate the proposed model with the known RCV1 corpus [Lewis et al., 2004], reporting only small improvements in performance, which they attribute to the strong pre-processing of these systems (stemming without disambiguation). Despite these discouraging results, the work studies a practical open problem with a clear application in TC.

In patent document US 2008/0270384 A1 the authors disclose a system and method for intelligent ontology-based knowledge search engine, called IATOPIA KnowledgeSeeker, which introduces a concept-based clustering method and a semantic annotation method for Chinese web articles. It can be applied to search the web, as in the embodiment that they present for news articles, using ontologies to analyze the semantics of Chinese texts. The components (modules of the system and method) are described in a detailed way as follows: (1) the topic ontology to model the kind (topic/several topics) of the articles, (2) the article ontology to represent the semantic content of the articles, (3) the lexical ontology to "understand" the semantics of Chinese text in HowNet. The system indexes HTML web pages containing articles categorized in the topic ontology; then, the system extracts the semantic content in the articles using an automatic semantic annotation method based in the article and lexical ontologies. The system produces a set of RDF triples as semantic annotation of every indexed web page. RDF annotation enables semantic quering on the classes, attributes ad properties defined or from imported ontologies. The news recommendation uses to approaches: a personalized content based recommendation that is based on user preferences. The article ontology allows the representation of the structure of the article (headline, abstract, body, etc.), as well as other metadata (author, date, organization, etc.). On other hand, the lexical ontology allows the annotation of the semantic content within the article through the identification of the concepts associated to the Chinese words. The lexical ontology is based in a bilingual Chinese-English resource called HowNet. Every Topic class is represented by a vector of weighted-concepts, called "sememes", whose weights are obtained from a corpus through a TFIDF weighting method. The proposed model uses a concept-based Vector Space Model (VSM), where the sememes are concept-based vectors with features derived from the lexical ontology. The indexing process is as follows: (1) one input article in HTML is semantically annotated by RDF triples using an automatic method and the article and lexical ontology, (2) the new indexed article is represented by a concept-based vector, whose features are ontology-based annotations, (3) the system computes the score similarity (cosine function) among the input article and the centroid vectors for each topic, and (4) the topic with the maximum score is selected to categorize the content of the article. The proposed method uses a concept-based VSM model to represent the indexed documents, and the cosine function as the score (ranking) function to carry-out the clustering of the input documents, thus, this method presents the same drawbacks and inconsistencies of the rest of the models in the adapted VSM models.

In patent document US 2014/0074826 A1 the authors disclose a novel vector ontology-based information retrieval (IR) system, which uses semantic annotations enriched with linguistic info, and a linear combination of multiple scores as document relevance function. The system parses any query into lexical elements defined by words or phrases; then, it computes automatically a semantic index composed by a set of ontology-based semantic annotations. Each semantic annotation is defined by a concept, or instance of a concept, and it is composed by the lexical token, concept, morphological invariant form (stem) of the token, and the part-of-speech. The semantic index of the query is used to retrieve and scored the related indexed documents. The system ranks the retrieved documents using multiple scoring functions, while it uses the same language processing and semantic annotation for queries and the indexed documents. The system uses a query-matching language (IML) to analyze the user's queries, and a rule engine converts the queries in a set of search criteria and into actions list. The response engine of the system takes the actions list and search criteria as input, and it defines a document-level relevance method based in a linear combination of four different scores as follows: (1) a TDFIF weighting term-based cosine score, (2) a concept-based vector cosine score, with a custom normalized weighting function, (3) a stem-based cosine score using the same concept-based weighting function, and (4) a link-based score method. In sum, the scoring system to define the document relevance with regard to the input query is using three different Vector Space Models (term-based, stem-based and concept-based) plus a link-based ranking function. This system exhibits the same drawbacks than the rest of concepts-based vector IR models already cited above.

Patent document US 2008/0288442 A1 discloses a rule-based method and its corresponding system to decide if a set of statements (RDF) according to a specified ontology has to be stored, indexed or not at all. Several indices can be produced using the set of rules, a set partitioned regarding two functionalities: one part to decide what kinds of indexes are needed (for the textual part of the RDF triplets) and a second one to process every new statement. The method can also be used to mark up the ontology with metadata containing information about what statements with textual data has to be send to the storage, to some of the indexes or not. The main claim of this invention is that it helps to deal with the unorganized and unstructured web of data, by using RDF to represent this huge amount of information. The RDF statements can be stored very efficient and saving resources, but when the statements contain a textual part, the problem has to be addressed using indexes. That way the meaning of the query is also taking into account as the indexed terms are part of the RDF triplets and not isolate words. This method exhibits same drawbacks as the rest of approaches already cited in the family of VSM-based models.

Query-Expansion Ontology-Based IR Models.

The query-expansion ontology-based IR methods share some common features, such as:

(1) the semantic expansion of the queries to increase the retrieval capability of relevant document, (2) the use of multiple-feature enriched semantic keys, which includes different types of semantic predicates, grammar role, and other linguistic information, (3) a document retrieval based in two stages, a first selection of candidate documents, and a second stage of matching and ranking, (4) the lack of a unified representation space to make the comparison and ranking of the indexed units, (5) the lack of the use of ontology-based semantic distances as it is proposed in the present invention, and (6) the use of ad-hoc scoring methods combining different semantic features.

In U.S. Pat. No. 6,675,159 B1 the authors disclose a concept-based indexing and search system for collections of documents, which have been semantically annotated with ontology-based predicates. The system extracts the concepts associated to any user query, and returns only those documents that match the concepts in the query. The documents and queries are represented by ontology-based predicates of different types, which encode "is-a" relations, verb arguments, or other semantic relations among individuals. The system uses an ontology-based parser to extract a collection of semantic predicates from the queries and documents, to be used as its representation. The retrieval of related documents is made in two stages: (1) candidate selection, and (2) comparison and ranking. The system holds the indexed corpus organized in domain-based clusters, and it uses a naive Bayes classifier to get the closest cluster for any input query. The filtered documents are semantically compared and ranked with regards to the query using a scoring method that combines weighted scores designed by type of semantic predicates. In spite of the fact that the documents are represented by a rich set of ontology-based predicates, the proposed method lacks from a unified representation space for the retrieval, comparison and ranking of documents. The lack of a unified representation space prevents the use of efficient search and ranking methods; moreover, the scoring function is not using a well-founded ontology-based semantic metric to compare concepts, such as the one that is proposed in this invention.

In U.S. Pat. No. 8,301,633 B2 the authors disclose a system and a method for the indexing and semantic search in a corpus of documents. The indexed documents are structured in passages, and the last ones are defined as the main indexed unit. The system builds an inverted index that relates every index term with all the passages where it appears, and every passage is related with every document. Every passage is represented by an inverted semantic key composed by different fields associated to the index terms, called tokens, such as (a) the key term in a lexicon, (b) an ontology-based semantic annotation of the key term, (c) a semantic role labelling annotation, (d) the grammar role, (e) some linguistic annotations, and (f) some transformation rules. A key term is an index term defined in a key term lexicon, which represents an occurring word in an indexed document. Every index term can be the occurring word, or other related word, such as a synonymous, hypernym, or hyponym. The user queries are transformed to the semantic representation of the system, and the retrieval is carried-out in two stages, the search and the retrieval, as follows: (1) in the search stage, the system extracts a collection of candidate passages using the key term of the expanded query, and (2) in the retrieval stage, the system compute both, the semantic matching among the query and the passages, and the ranking using the full semantic representation for the query and the passages. The semantic matching of the queries and documents is a high computational task whether the full semantic representation is used, thus, the system uses a pre-selection stage based in a keyword-based query expansion method to retrieve all the candidate passages. The semantic representation of the input query is transformed into a collection of index terms using all sort of semantic relations according to the fields included in the semantic keys, by a query expansion method. The system retrieves all the passages matching any index term in the expanded query, then, all the retrieved documents are merged or discarded using a Boolean set of operations with the retrieved passages, according to the semantic representation of the query. Unlike the present invention, this system does not include any weighting method, because it makes an exhaustive Boolean keyword-based semantic annotation at the level of passage. The system does not use any sort of semantic space as mean for the indexing, retrieval and ranking of documents, but an exhaustive inverted index based in the semantic annotation of keywords defined in a lexicon. The final ranking score of the document combines multiple scores derived from the combination of the multiple fields in the semantic keys. One score is a semantic distance based in the use of the order relation in an ordered list of concepts, or keywords related to the index terms in the query. The passage-based indexing and the rich semantic and linguistic structures used as semantic keys for the passages are well-tuned in the context of passage retrieval for question-answering (Q&A) systems; however, the system presents some drawbacks in the context of a more general semantic search system for documents, or any sort of semantically annotated data. First, the high computational complexity derived from the indexing based in passages and the multiple-fields semantic keys. Second, the semantic score lacks of a well-founded ontology-based semantic metric as it is proposed in the present invention; thus, the intrinsic semantic distance among concepts is missing in the final ranking. Third, the lack of a unified and well-founded geometric representation space for the semantic keys prevents the system to be able to use efficient search algorithms for the comparison and ranking of documents.

2. Geometric Representation for Taxonomies

The present invention is related with one distance-preserving ontology embedding proposed by Clarke in [Clarke, 2007], whose main ideas has been also published in [Clarke, 2009] and [Clarke, 2012]. Following some geometric ideas introduced by Widdows in [Widdows, 2004], Clarke proposes a distance-preserving embedding method for the concepts within a taxonomy, which is called vector lattice completion, whose main idea is to use the natural morphism between the taxonomies and the vector lattices.

Clarke's ideas are based in the very close relation between taxonomies and lattices, derived from the fact that many human-made taxonomies are join-semi lattices, although in the more general case, we could also find examples of taxonomies with multiple inheritance, where a pair of concepts do not have a supremum.

The vector completion builds an order preserving homomorphism which maps each concept to a linear subspace in the vector lattice, with the property that the Jiang-Conrath distance between concepts [Jiang & Conrath, 1997] is preserved as the Euclidean distance between vectors when the taxonomy is tree-like. The leaf concepts are mapped to base vectors of the space, while any non-leaf concept is mapped to the linear subspace spanned by its children concepts. The ontology embedding of Clarke is an implicit application of the theory of categories [Pierce, 1991], wherein his completion is a natural structure-preserving mapping among different, but intrinsically identical, algebraic structures.

Although the embedding proposed by Clarke represents a very important milestone in the search of a semantic distance-preserving representation for ontologies, and its application to the development of good ontology-based IR models, Clarke's work has two important drawbacks in the context of an ontology-based IR model that differentiate it with the model proposed here: (1) the lack of the integration of individuals (instances of concepts) in the model, and (2) the lack of the method to represent information units composed by a collection of concepts or references to them, such as documents. Unlike the model of the present invention, Clarke's embedding does not consider populated ontologies in his model, in other words, the vector lattice completion only works for concepts, not for individuals (instances). Moreover, the model of Clarke cannot be used to represent information units defined by a collection of concepts, or references to concepts (instances); in other words, we do not know how to use the vector lattice completion for representing and comparing documents. Precisely, Clarke surveys the compositionality vector-based representation problem in a recent work [Clarke, 2012].

3. Ontology-Based Semantic Distances

The necessity to compare semantic concepts has motivated the development of many semantic distances and similarity measures on ontologies. The distance and similarity functions are complementary functions with opposite meanings, in the sense that they produce antitone or opposite orderings, it means that for a greater similarity decreases the distance and vice versa. Any similarity function can be converted in a distance function, and vice versa; thus, we herein focus on the study of semantic distances on ontologies. For example, in the VSM model most of models employ the cosine function on the unit hypersphere (normalized vectors) which is exactly the opposite function of the geodesic distance among points on the feature space (unit n-sphere) of the model. The cosine function and the geodesic distance compute opposite orderings, but they produce exactly the same rankings of relevant documents for any input query.

An ontology-based semantic distance is a metric defined on the set of classes of any ontology, while an ontology-based semantic similarity is a similarity measure. We refer to both types of measures as ontology-based semantic measures. The ontology-based semantic measures (distances and similarities) can be categorized in three broad classes:

(1) edge-counting based, such as the measures proposed in [Rada et al., 1989], [Lee et al., 1993], [Wu & Palmer, 1994] and [Hirst & St-Onge, 1998];

(2) vector-based, such as the measures proposed in [Frakes & Baeza-Yates, 1992]; and (3), IC-based (IC stands for "Information Content"), whose main references are the proposals in [Resnik, 1995], [Jiang & Conrath, 1997] and [Lin, 1998].

The most broadly accepted family of measures are based in the information content (IC) of the concepts within a taxonomy. The IC-based family is subdivided in two subgroups: (a) corpus-based methods, which use corpus-based statistics to compute the occurrence probabilities and the IC values for each concept, and (b) the intrinsic methods which only use the information encoded in the structure of the ontology, in whose family we can cite the pioneering works of [Seco et al., 2004] and [Zhou et al., 2008].

Any IC-based semantic measure is the combination of two complementary methods: (1) the measure function between concepts, properly called as IC-based measure, and (2) the method used to compute the IC values for the taxonomy's nodes, called as IC-computation method. Thus, any IC-based semantic measure can be combined with any independent IC-computation method. By example, the Jiang-Conrath distance can be combined with any intrinsic IC-computation as the described ones in [Seco et al., 2004] and [Zhou et al., 2008].

The state of the art in semantic distances is defined by the IC-based measures disclosed in [Sánchez et al., 2012] and [Meng et al., 2012]. The main research trend in this area is the development of intrinsic IC-computation methods which use the intrinsic knowledge encoded in the ontology as means to remove the necessity to compute corpus-based statistics, as well as novel IC-based measures. The research activity in intrinsic IC-based methods has increased very recently.

According to some relevant benchmarks driven in the literature, we can conclude that the Jiang-Conrath distance offers some of the best results for most of the applications, in special, whether its IC values are estimated by any intrinsic method. In [Budanitsky & Hirst, 2001], the authors carry-out some benchmarks to compare the IC-based measures of Resnik, Jiang-Conrath, Leacock-Chodorow, Lin and Hirst-St-Onge, concluding that the Jiang-Conrath (JC) distance offers the best results. In a later work [Budanitsky & Hirst, 2006], the same authors arrive to the same conclusion, and the work includes cites to other reports with similar conclusions about the JC distance. In [Sánchez et al., 2011] the authors carry-out a benchmark among IC-based measures comparing corpus-based methods versus methods based on the computation of the IC values through intrinsic method. This last report concludes that all the measures work better using intrinsic IC computation, while the intrinsic Jiang-Conrath distance gets the second best global results for their tests, with a tiny difference to the first one. Most of the main benchmarks for ontology-based semantic measures consist in the evaluation of the semantic similarity between word pairs within the Wordnet [Miller, 1995] taxonomy.

We herein only survey the most representative measures in the cited categories. For a broader revision of the literature, we refer to some recent surveys, some of them are focused in biomedicine, such as [Lord et al., 2003], [Lee et al., 2008], [Pesquita et al., 2009], [Hsieh et al., 2013i], [Cross et al., 2013], and [Harispe et al., 2014], while others do not assume any specific domain, such is the case in [Saruladha et al., 2010], [Sánchez et al., 2012], [Xu & Shi, 2012], and [Gan et al., 2013]. The book by Deza and Deza also includes a short, but very useful section about network-based semantic distances on ontologies as the Wordnet [Deza & Deza, 2009, sec. 22.2].

The first ontology-based semantic distances to appear were the edge-counting based measures, whose main representative is the Rada's measure [Rada et al., 1989]. All these measures are characterized by the use of the shortest path length among concepts measured on the ontology graph. The key idea behind these methods is that the higher up you need to climb to find a common ancestor to both concepts, the greater should be the distance between concepts, and vice versa.

In [Rada et al., 1989], the authors propose to use the shortest path length among concepts of an ontology as distance measurement among them, measure that they call "distance". Their work sets the first known ontology-based semantic distance, and it also introduces the main hypothesis underlying all the subsequent ontology-based semantic distances: the conceptual distance as metrics hypothesis. This hypothesis states, following previous psychological studies, that the conceptual distance, or similarity, among concepts in a semantic network, is proportional to the path length that joins them. The shortest path length, also called geodesic distance, is a metric in the formal sense; for this reason the authors in [Rada et al., 1989] prove that these measures are metrics on ontologies.

Other measures in the edge-counting family, such as the works in [Lee et al., 1993], [Wu & Palmer, 1994], [Leacock & Chodorow, 1998] and [Hirst & St-Onge, 1998], are also based in some combination of the shortest path values, as it can be appreciated in FIG. 3, and all of them share the same drawbacks.

FIG. 3 shows a summary of the formulas used by some known measures to compute the semantic similarity or distance between a pair of concepts within an ontology, as well as the novel distance disclosed in the present invention. The similarities appears as sim($c_1$,$c_2$) and distance functions as d($c_1$,$c_2$). The function de(ci) returns the depth of any concept in the direct acyclic graph (DAG) defined by the ontology, it means the length from the concept to the root node. By other hand, function L($c_1$,$c_2$) denotes the shortest path length among two concepts.

The main drawback of the measures based in edge-counting is that they implicitly assume that every edge has the same relevance in the computation of the global path length, without to take into account its depth level or occurrence probability. This drawback can be called the uniform weighting premise. In [Resnik, 1995], the authors propose a new semantic distance based in an Information Content (IC) measure whose main motivation is to remove the uniform weighting premise of the edge-counting measures. The IC measure for every concept is only the negative logarithm of the occurrence probability of the concept, such as is shown in equation (1), information content for every node within the taxonomy, defining a probability space, whose integral value on the ontology is 1. Resnik et al. define a similarity measure shown in FIG. 3, which is equivalent to assign a weight with the value of the probability difference between the adjacent concepts of each edge.

$$\begin{cases} p: C \to [0, 1] \subset \mathbb{R} \\ IC(c_i) = -\log_2(p(c_i)) \end{cases} \quad (1)$$

The key idea behind the IC-based distances is as follows. The probability function p in equation (1) is growing monotone while the ontology is bottom-up; thus, while we climb on the ontology, the observation probability of any abstract concept increases. As higher is the occurrence probability of one concept, lower is its information concept and vice versa.

In [Jiang & Conrath, 1997], the authors propose a set of IC-based semantic distances encoding a set of semantics notions that fill some gaps in [Resnik, 1995]. Jiang and Conrath follow the IC approach of Resnik, but they note that previous measures not consider some important semantic notions encoded by an ontology, which affects the semantic similarity appreciated by the human beings. They consider the following issues: the number of descendants, the global depth of the concepts, the type of semantic relation (hyper/hypo/meronym), and the strength degree of a link between a parent concept and its children concepts. From the different measures proposed in [Jiang & Conrath, 1997], the more broadly adopted, also known as the JC measure, is the distance shown in FIG. 3.

In [Lin, 1998], the author refutes the vector-based distances, such as the proposed in [Frakes & Baeza-Yates, 1992], by the necessity to use vectors. Moreover, Lin also notes that the edge counting methods only works on taxonomies, not admitting other ways of knowledge representation, such as first order logic. Lin proposes a novel definition of semantic similarity based on a probabilistic model and the IC value.

The semantic distance proposed in [Jiang & Conrath, 1997] has three drawbacks that are solved by the novel ontology-based semantic distance proposed by the present invention, which is called weighted Jiang-Conrath. These drawbacks are the following:

(1) the Jiang-Conrath distance is only a metric in a strict sense when the ontology is tree-like, therefore the Jiang-Conrath does not satisfy the metric axioms on ontologies with lattice or general poset structure [Orum & Joslyn, 2009];

(2) the Jiang-Conrath distance is only uniquely defined for upper semi-lattice ontologies, not for ontologies with lattice or general poset structure; and (3) it is only defined on taxonomies of concepts, not weighted concepts (classes) or instances of concepts (individuals).

The standard formula of the Jiang-Conrath distance on taxonomies is given by equation (2), where the term LCA $(c_1,c_2)$ means the lowest common ancestor node between the concepts $c_1,c_2$, and it could be written as $c_1 \vee c_2$ when the taxonomy is a join semi-lattice, because in this case every pair of concepts holds a supremum element.

$$d(c_1,c_2)=IC(c_1)+IC(c_2)-2IC(LCA(c_1,c_2)) \quad (2)$$

Equation (2) is uniquely defined for lattices, being the upper semi-lattice taxonomies a special case. Any lattice is by definition a partially ordered set (poset) where each pair of elements shares a unique lowest common ancestor, called supremum. Therefore if the ontology is an upper semi-lattice, we find that any pair of concepts shares a unique common ancestor, and the third term in the equation (2) is well defined. By contrast, for general taxonomies that not fulfil the lattice axioms, we find pairs of concepts with more than one lowest common ancestor.

Taxonomies can be classified in three classes according to its structure, such as it is shown below. These three classes of taxonomies define a hierarchy of sets, in the sense that the set of general taxonomies subsumes the set of lattice taxonomies, and the last one subsumes the set of the tree-like taxonomies.

(1) Tree-like taxonomies (see FIGS. 4 and 6). FIG. 4 represents an example of a tree-like ontology, which is a partial sub-graph of WordNet around the "armchair" concept. FIG. 6 represents a tree-like ontology with the edge weights defined as the difference of Information Content (IC) values between its extreme nodes. These edge weights match the implicit edge weights defined by the Jiang-Conrath distance.

(2) Upper semi lattices (see FIG. 7). In FIG. 7 every pair of concepts has a unique lowest common ancestor, called supremum in this case. The taxonomy exhibits a structured type of multiple inheritance that verifies the semi-lattice axioms.

(3) General partially ordered sets (as the ones shown in FIGS. 5 and 8). In particular, FIG. 5 represents the complete lattice associated to the power set (i.e. set of all subsets) for the set {1,2,3}. FIG. 8 represents a taxonomy with the structure of a general partially ordered set (poset structure). In this case, the taxonomy exhibits an unstructured multiple inheritance. The concepts "m" and "p" do not have a supremum, because they share two lowest common ancestors, the concepts "f" and "g".

Starting from the observations above, we now summarize some of the main proven facts about the Jiang-Conrath distance. First, up to date, the Jiang-Conrath distance has proved to offer likely the best results for a semantic similarity/distance measure. This conclusion rises from many benchmarks carried-out in the literature, among we can cite the works in [Budanitsky & Hirst, 2006] and [Sánchez et al., 2012]. Today, the state of the art is based in intrinsic IC-based measures, in special, some intrinsic variants of the JC measure, such as is reported in [Sánchez et al., 2012].

Second, the Jiang-Conrath distance is uniquely defined only for taxonomies that verify the upper semi-lattice structure, such as the trees. Such as we explained above, this property is a consequence of the definition of the term $IC(LCA(c_1,c_2))$ as a function of the lowest common ancestor.

Third, the Jiang-Conrath distance is strictly a metric only on trees, not on semi lattices or general posets. The Jiang-Conrath distance is only uniquely defined on semi lattices where every pair of nodes has a unique supremum, or unique Lowest Common Ancestor (LCA); however, in [Orum & Joslyn, 2009], the authors prove that this condition is not enough to verify the axioms for a metric, because for some general rooted-posets (taxonomies) can happen that the triangle inequality was not satisfied. This theoretical result contradicts the claim made by Jiang and Conrath in their original paper [Jiang & Conrath, 1997], where they claim that their distance is a metric on any sort of taxonomy, without to include any exhaustive formal proof with regard it.

Fourth, the Jiang-Conrath distance is not uniquely defined on general taxonomies. For the case of general posets, the JC distance not only is not a metric, not even is well defined. The reason is that in this general case the existence of pairs of concepts with more than one LCA concept is possible. In a practical application, we can always select the first LCA concept found in a LCA search, but we conjecture that it can produce discontinuities of distance function near of these elements, such as the discontinuity problems reported in [Rada et al., 1989] as consequence of the constraint imposed in their distance function among sets of concepts.

Fifth, the theoretical limitations of the Jiang-Conrath distance prevent to get a well-founded metric space on general taxonomies. One possible solution for the non-uniqueness condition would be to compute all the LCA values for each pair of concepts [Baumgart et al., 2006]; then, we could select the ancestral path with the minimum distance value as the Jiang-Conrath distance. This idea allows defining uniquely Jiang-Conrath distance on any taxonomy; nevertheless, it is not enough to verify the metric axioms, because, such as is proven in [Orum & Joslyn, 2009], it is not even possible in the simpler case of semi lattices, where the uniqueness condition is already guaranteed.

Sixth, the Jiang-Conrath distance between one concept and its parent is equal to the difference of their information content values. It means that any taxonomy endowed with the JC distance can be interpreted as a weighted-graph where each edge is weighted by the IC difference between its adjacent concepts.

Seventh, the JC distance between one concept and its parent is proportional to their join probability. This fact is proven in [Jiang & Conrath, 1997], and it can be easily deduced.

The drawbacks of the Jiang-Conrath reported above motivate the development of the novel weighted Jiang-Conrath distance introduced in the present invention.

Intrinsic IC-based semantic distances. Today, it is broadly accepted by the research community that the IC-based semantic distance and similarities offer the best expected results in most of semantic evaluation tasks; however, the traditional IC-based family of methods has an important drawback from a practical point of view. The standard IC-based measures need to compute corpus-based statistics to evaluate the IC values for every concept within the ontology. The common method is to count every reference to a child concept as a reference to all its ancestors, and then using this frequency information to compute the occurrence probability for each concept on the ontology. The main problem with these corpus-based statistics is the difficulty to get well balanced corpus covering every concept in the ontology.

Motivated by the previous limitation, many authors have proposed novel methods, called intrinsic IC-based measures, whose main idea is to compute the IC values using only the information encoded in the same ontology, such as the density of the descendant nodes or its depth level respect to the root node.

The intrinsic methods are called IC-computation methods because they focus in the computation of the IC values used in combination with any IC-based semantic measure. It means that the intrinsic IC-computation is a complementary research problem associated to the development of ontology-based IC semantic measures. As pioneering works of this family, we can cite the works in [Seco et al., 2004] and [Zhou et al., 2008] and [Pirró, 2009].

The number of intrinsic IC-computation methods and intrinsic IC-measures proposed has grown rapidly during the last five years, converting the area in the main research trend in semantic distance and similarity measures. Among the collection of novel proposals, we can cite the works in [Pirró & Euzenat, 2010], [KhounSiavash & Baraani-Dastjerdi, 2010], [Saruladha et al., 2011], [Sánchez et al, 2011], [Sánchez & Batet, 2012], [Taieb et al., 2012], [Lingling & Junzhong, 2012], [Cross et al., 2013], [Harispe et al., 2013] and [Gupta & Gautam, 2014]. In spite of this huge research activity, the only available survey on the cited topic is the work in [Meng et al., 2012], although it is already out of date.

The current IC-computation methods in the literature do not fulfil the structural constraints already described above as motivation for the development of a new set of edge-based IC-computation methods disclosed in this invention.

For the ontology-based IR model proposed in the present invention, any intrinsic node-based IC-computation method may be used to compute the IC-values for each node, such as the methods proposed in [Seco et al., 2004] and [Zhou et al., 2008], or any intrinsic edge-based IC-computation method, like the ones disclosed in the present invention, which will be later discussed, which allow the direct computation of the of edge weights. The preferred method for the edge-based IC-weights in the present invention is defined by the equation (8) below, and the edge-based IC value given in the equation (3), which is simply the negative binary logarithm of the joint probability P(child|parent).

To summarize the state of the art, all the ontology-based IR models revised fall in the category of concept-based adapted VSM models, with the exception of the model proposed in [Rada et al., 1989], which is based in the use of semantic metric spaces defined by one ontology-based semantic distance. The model of Rada et al. is close to the proposed Intrinsic Ontological Spaces model. Despite the great advances and results obtained by the family of ontology-based adapted VSM models, whose main representatives are the models of [Fang et al., 2005], [Castells et al., 2007] and [Mustafa et al., 2008], the ontology-based IR models can be improved if the modelling inconsistencies shared by these models are solved, as it is made by the present invention.

As previously discussed, despite the many semantic measures in the literature, it is broadly accepted that the Jiang-Conrath semantic distance offers some of the best results for most of the evaluated applications. The state of the art considers the use of the Jiang-Conrath distance measurement with some type of intrinsic IC estimation, such as the methods proposed in [Seco et al., 2004] and [Zhou et al., 2008]. The current research trend in semantic distance measurement is to develop novel intrinsic IC-based estimation methods and measurements. Moreover, the Jiang-Conrath is very well founded due to its connection to the lattice theory, and it defines a metric when the underlying ontology/taxonomy is tree-like, fact proven in [Orum & Joslyn, 2009].

[Clarke, 2007] proposes a distance-preserving embedding method for the concepts within a taxonomy, which is called vector lattice completion, whose main idea is to use the natural morphism between the taxonomies and the vector lattices. Because most of taxonomies fulfil the join semi lattice axioms, the ideal completion builds an order preserving homomorphism which maps each concept to a linear subspace in the vector lattice, with the property that the Jiang-Conrath distance among concepts is preserved as the Euclidean distance between vectors when the taxonomy is a tree. The leaf concepts are mapped to base vectors of the space, while any non-leaf concept is mapped to the linear subspace spanned by its children concepts. The ontology embedding of Clarke is an implicit application of the theory of categories [Pierce, 1991], where his ideal completion is a natural structure-preserving mapping among different, but intrinsically identical, algebraic structures. Despite the fact that Clarke's model is not defined for individuals, it establishes a very important theoretical result: it is proven that any taxonomy can be embedded in a vector lattice, in such way that its topological structure (order) and metric structure (semantic distance) is preserved.

Next, a summary of the differences between the proposed method for the definition of an ontology-based IR model and the methods reported in the literature is provided.

First, unlike most of the previous methods, the present method represents the information units by sets of weighted-mentions to concepts (classes) or instances of concepts (individuals), instead of vectors whose coordinates represent weighted mentions on a set of mutually orthogonal vectors defined by the a set of concepts (classes) and/or instances of concepts (individuals).

Second, in the present invention the mentions to concepts (ontological classes) are represented by sets with the following structure. Every set of elements in the representation space, associated to the embedding of any class in the ontology, verifies the next property: the set subsumes all the subsets associated to the descendant classes (concept) and individuals (instance of concept) within the populated ontology, according to the metric space. It is the first time that a concept in the query is equivalent to the selection of a geometric subset of the representation space, that is, any logic query is converted in the selection of the geometric region containing all the concepts (classes) and instances (individuals) subsumed by the concept cited in the query.

Third, unlike other known methods, the present method integrates in the same semantic representation space the mentions to concepts (classes) and instances of concepts (individuals) in a consistent way, through the preservation of the structures defined by the intrinsic geometry of the base ontology.

Fourth, the present method explicitly integrates and preserves the intrinsic geometry of any base ontology in the representation space, given by the next structure relations: (1) the order relation of the taxonomy, (2) its intrinsic semantic distance, and (3) the set inclusion for the individuals and subsumed concepts of the ontology.

Fifth, the weighted-mentions to concepts or instances of concepts are represented in a metric space based in a novel ontology-based semantic distance, in contrast with most of methods that uses a vector space model (VSM) and the cosine function as similarity measure. The approach of the present invention removes the implicit orthogonality condition derived from the use of the cosine function as ranking method in every VSM-based ontology-based IR model in the literature, which is a source of semantic inconsistency in the previous representations.

Sixth, unlike other previous methods, the present method uses the Hausdorff distance as a metric on subsets of a metric space to compare and to rank information units (documents), instead of the cosine score. This feature also contributes to remove the implicit orthogonality condition of the VSM models. By other hand, the Hausdorff distance is well defined metric on subsets of a metric space, which allows to remove the continuity problems reported in [Rada et al., 1989], and to build a semantic ranking function supported by a meaningful ontology-based distance, such as the novel distance introduced in the present method.

Seventh, the proposed novel weighting method is defined as a statistical fingerprint, but it has a semantic meaning. The weight factor is a statistical and static weight derived from the frequency of every mention to a concept or instance within an information unit, equivalent to the standard TF (Term Frequency) weights used in all known IR models. However, the weight defines the ontology-based edge weight for each weighted-mention in the model, and it is a semantic weight defined by the IC-value of the mentioned ontological object. The novel weighting method proposed combines, for the first time, a statistical and static weight with an ontology-based semantic distance.

Eighth, the only known method that also uses a metric space for the representation of the information units is the model introduced in [Rada et al., 1989], but it presents some important differences respect to the present method. Firstly, the model of Rada et al. represents every document as a set of Boolean mentions to concepts, while our method includes a weighting method to represent the information units (documents) as a set of weighted-mentions to concepts and instances of concepts. Secondly, the model of Rada et al. uses the average ontology-based distance among concepts as a distance function among sets, while the present invention uses the Hausdorff distance, which is a strict metric among subsets and removes some continuity problems reported by the authors in [Rada et al., 1989]. Thirdly, the ontology-based distance of Rada et al. does not include the distance between instances of concepts in its model, and it is based in the shortest path distance between concepts, while the present method uses the shortest weighted path distance among concepts with weights defined by the novel weighted Jiang-Conrath distance.

Ninth, the present method proposes a novel ontology-based semantic distance based in the shortest weighted path on the populated ontology, where the weights are the negative logarithm of the joint probability between a child concept and its parent concept. The novel semantic distance is a generalization of the Jiang-Conrath distance, whose purpose is to remove the drawbacks described above. Unlike the standard Jiang-Conrath distance, the present method is a well-defined metric on any sort of ontology, while the first one is only a well-defined metric on tree-like ontologies.

Tenth, unlike the previous intrinsic IC-computations methods reported in the literature, our novel family of intrinsic IC-computation methods (IC-JointProbUniform, IC-JointProbHypo and IC-JointProbLeaves) fulfil the structural constraints relating the Information Content values, the joint probabilities and the underlying base taxonomy.

Eleventh, unlike the previous methods, the present method defines a novel IR model where each one of its components is ontology-based, avoiding the loss of any semantic information derived from the base ontology of the indexing model. First, the representation space is defined by a metric space of weighted-mentions to concepts and instances, whose metric is ontology-based. Second, the weighting method, in spite to be a classical TF scheme, has a semantic contribution to the distance among items in the populated ontology, because the weights define the joint probability for the weighted elements, whose IC-value is the length of edge joining any weighted-item to its parent concept/individual; thus, the weighting method is also ontology-based. Third, the ranking method is also ontology-based because it is based in the Hausdorff metric on subsets of the representing space, which derives directly from the ontology-based metric of the space. Fourth, the retrieval method is driven by the ranking method, thus, the retrieval operation is also ontology-based. Fifth, the information units are represented by a set of weighted-mentions to individuals and classes within ontology; therefore, the representation is directly defined on the underlying populated ontology space plus a metric derived from its structure. Sixth, the retrieval and ranking process is directly carried-out using the representation of information units, which avoids the necessity to interrogate the populated ontology through any formal query in SPARQL, or other equivalent language.

BIBLIOGRAPHIC REFERENCES

[Ahuja et al., 1990] Ahuja, R. K., Mehlhorn, K., Orlin, J., & Tarjan, R. E. (1990). Faster Algorithms for the Shortest Path Problem. *Journal of the ACM,* 37(2), 213-223.

[Basin & Pennacchiotti, 2010] Basili, R. & Pennacchiotti, M. (2010). Distributional lexical semantics: Toward uniform representation paradigms for advanced acquisition and processing tasks. Natural Language Engineering, 16, pp. 347-358.

[Baumgart et al., 2006] Baumgart, M., Eckhardt, S., Griebsch, J., Kosub, S., & Nowak, J. (2006). All-Pairs Common-Ancestor Problems in Weighted Dags. Technical Report TUM-I0606, Institut für Informatik, Technische Universitat München.

[Bratsas et al., 2007] Bratsas, C., Koutkias, V., Kaimakamis, E., Bamidis, P., & Maglaveras, N. (2007). Ontology-based vector space model and fuzzy query expansion to retrieve knowledge on medical computational problem solutions. In Engineering in Medicine and Biology Society, 2007. EMBS 2007. 29th Annual International Conference of the 5 IEEE (pp. 3794-3797). IEEE.

[Brin et al., 1995] Brin, S. (1995). Near neighbor search in large metric spaces. In Proceedings of the 21st Conference on Very Large Databases (VLDB.95) (pp. 574-584).

[Budanitsky & Hirst, 2001] Budanitsky, A. & Hirst, G. (2001). Semantic distance in WordNet: An experimental, application-oriented evaluation of five measures. In Workshop on WordNet and Other Lexical Resources, volume 2.

[Budanitsky & Hirst, 2006] Budanitsky, A. & Hirst, G. (2006). Evaluating wordnet-based measures of lexical semantic relatedness. Computational Linguistics, 32, 13-47.

[Cao & Ngo, 2012] Cao, T. H. & Ngo, V. M. (2012). Semantic search by latent ontological features. New Generation Computing, 30, 53-71.

[Castells, 2008] Castells, P. (2008). Búsqueda semántica basada en el conocimiento del dominio. In F. Verdejo & A. Garcia-Serrano (Eds.), Acceso y visibilidad de la información en la red: el rol de la semantica (pp. 111.138). España: Universidad Nacional de Educación a Distancia (UNED).

[Castells et al., 2007] Castells, P., Fernández, M., & Vallet, D. (2007). An adaptation of the vector-space model for ontology-based information retrieval. IEEE Trans. Knowl. Data Eng., 19(2), 261-272.

[Chu-Carroll et al., 2012] Chu-Carroll, J., Fan, J., Boguraev, B., Cannel, D., Sheinwald, D., & Welty, C. (2012). Finding needles in the haystack: Search and candidate generation. IBM J. Res. Dev., 56, 6: 1-6: 12.

[Clark, 2012] Clark, S. (2012). Vector space models of lexical meaning. In S. Lappin & C. Fox (Eds.), Handbook of Contemporary Semantics. Malden, Mass.: Blackwell, second edition.

[Clarke, 2007] Clarke, D. (2007). Context-theoretic Semantics for Natural Language: an Algebraic Framework. PhD thesis, University of Sussex.

[Clarke, 2009] Clarke, D. (2009). Context-theoretic semantics for natural language: an overview. In R. Basili & M. Pennacchiotti (Eds.), *Proceedings of the Workshop on Geometrical Models of Natural Language Semantics* (pp. 112-119). Athens, Greece: Association for Computational Linguistics.

[Clarke, 2012] Clarke, D. (2012). A context-theoretic framework for compositionality in distributional semantics. Comput. Linguist., 38, 41-71.

[Cross et al., 2013] Cross, V., Yu, X., & Hu, X. (2013). Unifying ontological similarity measures: A theoretical and empirical investigation. International Journal of Approximate Reasoning, 54(7), 861-875.

[Deza & Deza, 2009] Deza, M. & Deza, E. (2009). Encyclopedia of distances. Springer.

[Ding et al., 2007] Ding, L., Kolari, P., Ding, Z., & Avancha, S. (2007). Using ontologies in the semantic web: A survey. In R. Sharman, R. Kishore, & R. Ramesh (Eds.), Ontologies, volume 14 of Integrated Series in Information Systems (pp. 5 79.113).: Springer US.

[Dragoni et al., 2010] Dragoni, M., Pereira, C. D. C., & Tettamanzi, A. G. (2010). An ontological representation of documents and queries for information retrieval systems. In Trends in Applied Intelligent Systems (pp. 555.564).: Springer.

[Egozi et al., 2011] Egozi, O., Markovitch, S., & Gabrilovich, E. (2011). Concept-based information retrieval using explicit semantic analysis. ACM Transactions on Information Systems (TOIS), 29, 8.

[Eilenberg & MacLane, 1945] Eilenberg, S. & MacLane, S. (1945). General theory of natural equivalences. Trans. Amer. Math. Soc., 58, 231-294.

[Erk, 2012] Erk, K. (2012). Vector space models of word meaning and phrase meaning: A survey. Lang. Linguist. Compass, 6, 635-653.

[Erkan & Radev, 2004] Erkan, G. & Radev, D. R. (2004). LexRank: Graph-based lexical centrality as salience in text summarization. J. Artif. Intell. Res., 22, 457-479.

[Fang et al., 2005] Fang, W.-D., Zhang, L., Wang, Y.-X., & Dong, S.-B. (2005). Toward a semantic search engine based on ontologies. In Proceedings of International Conference on Machine Learning and Cybernetics, volume 3 (pp. 1913-1918). IEEE.

[Fernández et al., 2011] Fernández, M., Cantador, I., López, V., Vallet, D., Castells, P., & Motta, E. (2011). Semantically enhanced information retrieval: An ontology-based approach. JWS special issue on semantic search. Web Semantics: Science, Services and Agents on the World Wide Web, 9(4), 434-452.

[Fernández Sánchez, 2009] Fernández Sánchez, M. (2009). Semantically enhanced Information Retrieval: an ontology-based approach. PhD thesis, Universidad Autónoma de Madrid, Departamento de Ingeniería Informática.

[Frakes & Baeza-Yates, 1992] Frakes, W. & Baeza-Yates, R. (1992). Information Retrieval: Data Structures and Algorithms. Prentice Hall PTR.

[Gabrilovich & Markovitch, 2006] Gabrilovich, E. & Markovitch, S. (2006). Overcoming the brittleness bottleneck using wikipedia: Enhancing text categorization with encyclopaedic knowledge. In Proceedings of the Twenty-First National Conference on Artificial Intelligence (AAAI 2006), volume 6 (pp. 1301.1306). Boston, USA: AAAI Press.

[Gan et al., 2013] Gan, M., Dou, X., & Jiang, R. (2013). From ontology to semantic similarity: calculation of ontology-based semantic similarity. Scientific World Journal, 2013, 11.

[García-Hernández & Ledeneva, 2009] García-Hernández, R. A. & Ledeneva, Y. (2009). Word sequence models for single text summarization. In Second International Conference on Advances in Computer-Human Interactions (ACHI.09) (pp. 44-48). IEEE.

[Gold & Angel, 2006] Gold, C. & Angel, P. (2006). Voronoi hierarchies. In M. Raubal, H. Miller, A. Frank, & M. Goodchild (Eds.), Geographic Information Science, volume 4197 of Lecture Notes in Computer Science (pp. 99-111). Springer Berlin Heidelberg.

[Gupta & Gautam, 2014] Gupta, A. & Gautam, K. (2014). Semantic similarity 5 measure using information content approach with depth for similarity calculation. International Journal of Scientific & Technology Research, 3(2), 165-169.

[Harispe et al., 2014] Harispe, S., Sánchez, D., Ranwez, S., Janaqi, S., & Montmain, J. (2014). A framework for unifying ontology-based semantic similarity measures: A study in the biomedical domain. *Journal of Biomedical Informatics*, 48, 38-53.

[Hatzivassiloglou et al., 2001] Hatzivassiloglou, V., Klavans, J. L., Holcombe, M. L., Barzilay, R., Kan, M.-Y., & McKeown, K. R. (2001). SimFinder: A flexible clustering tool for summarization. In Proceedings of the NAACL workshop on automatic summarization (pp. 41-49).

[Henrikson, 1999] Henrikson, J. (1999). Completeness and total boundedness of the Hausdorff metric. MIT Undergraduate Journal of Mathematics.

[Hirst & St-Onge, 1998] Hirst, G. & St-Onge, D. (1998). Lexical chains as representations of context for the detection and correction of malapropisms. In C. Fellbaum (Ed.), WordNet: An electronic lexical database (pp. 305-332).: Massachusetts Institute of Technology.

[Hsieh et al., 2013] Hsieh, S.-L., Chang, W.-Y., Chen, C.-H., & Weng, Y. C. (2013). Semantic 20 similarity measures in the biomedical domain by leveraging a web search engine. Biomedical and Health Informatics, IEEE Journal of, 17(4), 853-861.

[Jiang & Conrath, 1997] Jiang, J. J. & Conrath, D. W. (1997). Semantic similarity based on corpus statistics and lexical taxonomy. In Proceedings of International Conference Research on Computational Linguistics (ROCLING X).

[Kannan et al., 2012] Kannan, P., Bala, P. S., & Aghila, G. (2012). A comparative study of multimedia retrieval using ontology for semantic web. In Advances in Engineering, Science and Management (ICAESM), 2012 International Conference on (pp. 400-405).

[KhounSiavash & Baraani-Dastjerdi, 2010] KhounSiavash, E. & Baraani-Dastjerdi, A. (2010). Using the whole structure of ontology for semantic relatedness measurement. SEKE.

[Leacock & Chodorow, 1998] Leacock, C. & Chodorow, M. (1998). Combining local context and WordNet similarity for word sense identi.cation. In C. Fellbaum (Ed.), WordNet: An electronic lexical database (pp. 265-283). Massachusetts Institute of Technology.

[Lee et al., 1993] Lee, J. H., Kim, M. H., & Lee, Y. J. (1993). Information retrieval based on conceptual distance in is-a hierarchies. Journal of Documentation, 49(2), 188-207.

[Lee et al., 2008] Lee, W.-N., Shah, N., Sundlass, K., & Musen, M. (2008). Comparison of ontology-based semantic-similarity measures. AMIA Annu. Symp. Proc., (pp. 384-388).

[Lewis et al., 2004] Lewis, D. D., Yang, Y., Rose, T. G., & Li, F. (2004). RCV1: A new benchmark collection for text categorization research. J. Mach. Learn. Res., 5, 361-397.

[Lin, 1998] Lin, D. (1998). An information-theoretic definition of similarity. In Proceedings of the 15th International Conference on Machine Learning, volume 98 (pp. 296.304). Madison, Wis.

[Lingling & Junzhong, 2012] Lingling, L. & Junzhong, J. (2012). A new model of information content based on concept's topology for measuring semantic similarity in WordNet1. International Journal of Grid and Distributed Computing, 5 (3), 81-94.

[Lord et al., 2003] Lord, P. W., Stevens, R. D., Brass, A., & Goble, C. A. (2003). Semantic similarity measures as tools for exploring the gene ontology. Pac. Symp. Biocomput., (pp. 601-612).

[Machhour & Kassou, 2013] Machhour, H. & Kassou, I. (2013). Ontology integration approaches and its impact on text categorization. International Journal of Data Mining & Knowledge Management Process (IJDKP), 3, 31-42.

[McKeown et al., 1999] McKeown, K. R., Klavans, J. L., Hatzivassiloglou, V., Barzilay, R., & Eskin, E. (1999). Towards multidocument summarization by reformulation: Progress and prospects. In Proceedings of the national conference on Artificial intelligence (pp. 453.460). John Wiley \& Sons Ltd.

[Meng et al., 2012] Meng, L., Gu, J., & Zhou, Z. (2012). A review of information content metric for semantic similarity. In Advances on Digital Television and Wireless Multimedia Communications, Communications in Computer and Information Science (pp. 299.306). Springer, Berlin Heidelberg.

[Meng et al., 2005] Meng, W., Xiaorong, W., & Chao, X. (2005). An approach to concept obtained text summarization. In Communications and Information Technology, 2005. ISCIT 2005. IEEE International Symposium on, volume 2 (pp. 1337-1340).

[Metzler, 2007] Metzler, D. A. (2007, September). *Beyond bags of words: effectively modeling dependence and features in Information Retrieval* (PhD diss.). University of Massachusetts Amherst.

[Mihalcea & Tarau, 2004] Mihalcea, R. & Tarau, P. (2004). TextRank: Bringing order into texts. In Proceedings of EMNLP, volume 4: Barcelona, Spain.

[Miller, 1995] Miller, G. (1995). WordNet: A lexical database for English. Commun. ACM, 38 (11), 39-41.

[Mustafa et al., 2008] Mustafa, J., Khan, S., & Latif, K. (2008). Ontology based semantic information retrieval. In Intelligent Systems, 2008. IS.08. 4th International IEEE Conference, volume 3 (pp. 22-14-22-19). Varna: IEEE.

[Navigli, 2009] Navigli, R. (2009). Word sense disambiguation: A survey. ACM Computing Surveys, 41 (2), 10.

[Orum & Joslyn, 2009] Orum, C. & Joslyn, C. A. (2009). Valuations and metrics on partially ordered sets. http://arxiv.org/abs/0903.2679

[Pesquita et al., 2009] Pesquita, C., Faria, D., Falcao, A. O., Lord, P., & Couto, F. M. (2009). Semantic similarity in biomedical ontologies. *PLoS Computational Biology*, 5(7), e1000443.

[Pierce, 1991] Pierce, B. C. (1991). Basic Category Theory for Computer Science. Cambridge, USA: Massachusetts Institute of Technology.

[Pirró & Euzenat, 2010] Pirró, G. & Euzenat, J. (2010). A feature and 5 information theoretic framework for semantic similarity and relatedness. In The Semantic Web Conference (ISWC. 2010), Lecture Notes in Computer Science (pp. 615-630). Springer Berlin Heidelberg.

[Pirró & Seco, 2008] Pirró, G. & Seco, N. (2008). Design, implementation and evaluation of a new semantic similarity metric combining features and intrinsic information content. In R. Meersman & Z. Tari (Eds.), On the Move to Meaningful Internet Systems: OTM 2008, volume 5332 of Lecture Notes in Computer Science (pp. 1271-1288).: Springer Berlin Heidelberg.

[Pirró, 2009] Pirró, G. (2009). A semantic similarity metric combining features and intrinsic information content. *Data & Knowledge Engineering*, 68(11), 1289-1308.

[Rada et al., 1989] Rada, R., Mili, H., Bicknell, E., & Blettner, M. (1989). Development and application of a metric on semantic nets. IEEE Trans. Syst. Man Cybern., 19(1), 17-30.

[Resnik, 1995] Resnik, P. (1995). Using information content to evaluate semantic similarity in a taxonomy. In Proceedings of the IJCAI (pp. 448-453).

[Salton et al., 1975] Salton, G., Wong, A., & Yang, C. S. (1975). A vector space model for automatic indexing. Commun ACM, 18(11), 613-620.

[Sánchez & Batet, 2012] Sánchez, D., & Batet, M. (2012). A new model to compute the information content of concepts from taxonomic knowledge. *International Journal on Semantic Web and Information Systems*, 8(2), 34-50.

[Sánchez et al., 2011] Sánchez, D., Batet, M., & Isern, D. (2011). Ontology-based information content computation. Internat. J. Uncertain. Fuzziness Knowledge-Based Systems, 24(2), 297-303.

[Sánchez et al., 2012] Sánchez, D., Batet, M., Isern, D., & Valls, A. (2012). Ontology-based semantic similarity: A new feature-based approach. Expert Syst. Appl., 39, 7718-7728.

[Saruladha et al., 2011] Saruladha, K., Aghila, G., & others (2011). Information content based semantic similarity for cross ontological concepts. International Journal of Engineering Science & Technology, 3(6), 5132-5140.

[Saruladha et al., 2010] Saruladha, K., Aghila, G., & Raj, S. (2010). A survey of semantic similarity methods for ontology based information retrieval. In Machine Learning and Computing (ICMLC), 2010 Second International Conference on (pp. 297-301). IEEE.

[Saruladha et al., 2012] Saruladha, K., Aghila, G., & Raj, S. (2012). Semantic similarity measures for information retrieval systems using ontology. In Second International Conference on Machine Learning and Computing (ICMLC), 2010 (pp. 297-301).: IEEE.

[Sebastiani, 2002] Sebastiani, F. (2002). Machine learning in automated text categorization. *ACM Computing Surveys (CSUR)*, 34(1), 1-47.

[Seco et al., 2004] Seco, N., Veale, T., & Hayes, J. (2004). An intrinsic information content metric for semantic similarity in WordNet. In R. López de Mántaras & L. Saitta (Eds.), Proceedings of the 16th European Conference on Artificial Intelligence (ECAI), volume 16 (pp. 1089-1094). Valencia, Spain: IOS Press.

[Siddharthan et al., 2004] Siddharthan, A., Nenkova, A., & McKeown, K. (2004). Syntactic simplification for improving content selection in multi-document summarization. In Proceedings of the 20th international conference on Computational Linguistics (pp. 896).: Association for Computational Linguistics.

[Taieb et al., 2012] Taieb, M. A. H., Ben Aouicha, M., Tmar, M., & Ben Hamadou, A. (2012). Wikipedia category graph and new intrinsic information content metric for word semantic relatedness measuring. In Data and Knowledge Engineering, Lecture Notes in Computer Science (pp. 128-140). Springer Berlin Heidelberg.

[Turney & Pantel, 2010] Turney, P. D. & Pantel, P. (2010). From frequency to meaning: Vector space models of semantics. J. Artif. Intell. Res., 37, 141-188.

[Vallet et al., 2005] Vallet, D., Fernández, M., & Castells, P. (2005). An ontology-based information retrieval model. In The Semantic Web: Research and Applications 2nd European Semantic Web Conference (ESWC 2005) (pp. 455-470). Heraklion, Crete, Greece: Springer.

[Vanderwende et al., 2004] Vanderwende, L., Banko, M., & Menezes, A. (2004). Event-centric summary generation. Working notes of DUC.

[Widdows, 2004] Widdows, D. (2004). Geometry and meaning. CSLI publications Stanford.

[Wolf & Gibson, 2004] Wolf, F. & Gibson, E. (2004). Paragraph-, word-, and coherence-based approaches to sentence ranking: A comparison of algorithm and human performance. In Proceedings of the 42nd Annual Meeting on Association for Computational Linguistics (pp. 383). Association for Computational Linguistics.

[Wu et al., 2011] Wu, J., Ilyas, I., & Weddell, G. (2011). A study of ontology-based query expansion. Technical Report CS-2011-04, University of Waterloo.

[Wu & Palmer, 1994] Wu, Z. & Palmer, M. (1994). Verbs semantics and lexical selection. In Proceedings of the 32Nd Annual Meeting on Association for Computational Linguistics, ACL '94 (pp. 133-138). Stroudsburg, Pa., USA: Association for Computational Linguistics.

[Xu & Shi, 2012] Xu, Q. & Shi, W. (2012). A comparison of semantic similarity models in evaluating concept similarity. In International Archives of the Photogrammetry, Remote Sensing and Spatial Information Sciences (ISPRS.2012), volume XXXIX-B2, (pp. 173-178). Melbourne, Australia.

[Zhou et al., 2008] Zhou, Z., Wang, Y., & Gu, J. (2008). A new model of information content for semantic similarity in WordNet. In Future Generation Communication and Networking Symposia, 2008. FGCNS.08. Second International Conference on, volume 3 (pp. 85-89). IEEE.

SUMMARY OF THE INVENTION

The main object of the present invention is to address the problems, drawbacks and limitations of the current ontology-based information retrieval (IR) models reported in the literature, which have been previously described.

It is an object of the present invention to disclose a method and system to build a novel ontology-based information retrieval (IR) model for the indexing and retrieval of semantically annotated information units, that we call Intrinsic Ontological Spaces. Moreover, the present invention also comprises a novel ontology-based semantic distance called weighted Jiang-Conrath distance that overcomes some drawbacks of the classical Jiang-Conrath semantic distance in the context of the main problem addressed by this invention.

The purpose of the present method is to provide an ontology-based IR model for the indexing and retrieval of semantically annotated data, such as text documents, web pages, or any other sort of information units that can be represented by semantic annotations within a base ontology.

The main idea of the disclosed method and system is to build a structure-preserving embedding of a populated ontology into a metric space, while its intrinsic geometry is preserved. The proposed approach bridges the gap of modelling inconsistencies in current methods, achieving a better ranking, precision and recall measures for any indexing and retrieval system based on it.

The proposed IR model unifies the representation of the classes and individuals of the ontology in a same semantic space, while their intrinsic semantic structure relations are preserved. The text documents, or any other sort of semantically annotated units, are represented by sets of weighted-mentions to individuals and classes within the base ontology, while the queries are represented as sets of mentions to individuals and classes considered as sets of subsumed concepts and individuals. The representation space is a metric space defined by an extension of the novel weighted Jiang-Conrath distance between concepts, whose purpose is to define the distance among weighted mentions to individuals and classes, and a weighting scheme to represent documents and queries.

The intrinsic geometry of any ontology is defined by three algebraic structures: (1) the order relation of the taxonomy, (2) the intrinsic semantic distance among the classes and individuals, and (3) the set inclusion for the individuals and subsumed classes of the ontology.

The method proposed in this invention comprises the following elements:

(1) the definition of the semantic representation space as the universal set of weighted-mentions to individuals and classes within the populated base ontology, space that we call Intrinsic Ontological Spaces;

(2) an embedding method to inject semantically annotated data, or information units, in the representation space of the model;

(3) an embedding method to inject semantically annotated queries in the semantic representation space of the model;

(4) a semantic weighting method that combines statistical and semantic information to represent the semantic annotations associated to the indexed information units in the semantic representation space;

(5) a novel ontology-based semantic distance among concepts (classes) and instances of concepts (individuals) within a populated base ontology, that we call weighted Jiang-Conrath distance;

(6) a novel ontology-based ranking method for the retrieval and sorting of the indexed units retrieved by the system;

(7) a pre-processing step for computing all the parameters and data structures to enable the indexing and searching operations of the search engine of the system;

(8) a retrieval method to get a ranked collection of indexed units related to an input query; and (9) an indexing and storing method to insert new data into the search and indexing system.

The representation space is a metric space defined by a distance function that is an extension of the novel weighted Jiang-Conrath distance disclosed in the present invention. The purpose of this novel ontology-based distance is to integrate the individuals in the representation, defining a metric on any sort of ontology, and to allow the definition of a semantic weighting scheme to represent documents and queries, while it overcomes the drawbacks of the standard Jiang-Conrath distance on taxonomies of concepts.

The weighted Jiang-Conrath distance is defined as the shortest weighted-path metric among concepts within the base ontology, according to the edge weights defined as the IC value of the joint probability between every child concept and its parent concept. The weighted Jiang-Conrath distance of the present invention is a well-defined metric on any sort of taxonomy. By contrast, the Jiang-Conrath distance is only a metric on tree-like ontologies [Orum & Joslyn, 2009]. The proposed model uses a novel intrinsic edge-based IC-based method, which will be later discussed in detail, to compute the IC-based edge weights used by the novel distance disclosed herein; however, we could use any other method to compute the edge weights, without changing the core of the invention herein proposed.

The IC-values depend only on the structure of the ontology; thus, these can be computed a priori during the set up process of the search engine. On the other hand, the computation of the shortest weighted-path among concepts needs to be done through any Djikstra-type algorithm, with the inconvenient that it could be very expensive for large base ontologies. For this reason, a pre-processing step is defined to compute a priori the IC-values and all the pairwise distances among concepts of the base.

The semantic ranking method proposed in the present invention is based on a distance function between document and queries, which is defined by the Hausdorff distance among subsets of a metric space, according to the semantic metric of the representation space. The proposed model is a well-defined metric space on any sort of base ontology. By other hand, the use of the Hausdorff distance guarantees that the model is a well-defined metric space on the space of all annotated information units (documents) within any sort of base ontology.

The IR model herein proposed is the first one to use an ontology-based semantic distance and the Hausdorff distance as ranking method, unifying the representation of weighted-mentions to classes and individuals in a same metric space. Moreover, in the case of a tree-like base ontology, the representation space also verifies the structure of a hierarchical Voronoi diagram [Gold & Angel, 2006], where every parent concept geometrically subsumes its descendant concepts. The present model transforms the logic hierarchy of the base ontology into a geometric hierarchy according to the semantic metric of the model.

The proposed model unifies the representation of the classes and individuals of the ontology in a same semantic metric space, while their intrinsic semantic relations are preserved. The documents, or other information units, are represented by sets of weighted-mentions to individuals and classes in the ontology, while the queries are represented as sets of mentions to individuals and classes considered as sets of subsumed concepts and individuals.

The present model avoids the use of vector spaces to rank documents; instead, a document (information unit) is defined as a collection of weighted mentions to classes and individuals, and the ranking method for documents is built using the metric of the space and the Hausdorff distance among subsets. The mentions to classes (concepts) within a user query are mapped to subsets of the representation space, while the mentions to classes in the documents are managed as weighted mentions to distinguished individuals of the parent class.

The main feature of the proposed model is that the embedding of the information units in the semantic representation space preserves the three main structure relations of the ontology, defined as follows: (1) the intrinsic semantic distance (metric structure) among classes, (2) the taxonomic relations (topologic/order structure), and (3) the set inclusion relations (set structure). We call these three structure relations as the intrinsic ontological structure.

The proposed model builds a natural equivalence between the information units and its embedding in the representation space, following the notion of natural morphism in the theory of categories [Eilenberg1945-am]. The proposed model tries to capture and to save all the semantic information provided by the ontology, avoiding any information lost in the embedding process. The input for our representation space is a populated ontology with semantic annotations of any sort of information unit; it means that the model assumes the existence of a semantic annotation module whose aim is to search the references to classes and entities of the ontology.

The Intrinsic Ontological Spaces model allows ranking documents, or any other semantically annotated data, using a semantic distance function derived from the ontology model, which improves the ranking quality and the precision and recall measures of the current methods, while it solves the inconsistencies in the current models.

The proposed solution has some theoretical and practical advantages over current methods. In particular:

First, the proposed IR model removes some inconsistencies in previous models, such as the orthogonality property and the cardinality mismatch, the lack of a ranking method based in an intrinsic semantic, and the lack of a semantic weighting method. The removal of these inconsistencies contributes to get an improved semantic representation model, whose main consequence is the improvement of the ranking quality and the precision and measures for any application based on the novel IR model.

Second, all the logic components of the IR model are ontology-based. It includes the retrieval process, the weighting schema, the ranking and the definition of the representation space itself. Every element of the IR model is directly derived from the structure relations encoded by the base ontology used for the indexing of the data.

Third, the proposed IR model allows the integration of many geometry-based algorithms and theoretical results with potential benefits for the model. For example, we can integrate well known geometry-based space search methods to find nearby documents [Brin, 1995], enabling the extension of the model to large scale document collections as the web, or large text repositories in government agencies and private companies.

Fourth, the ranking and weighting computation model that is herein proposed can be estimated on-the-fly without any training phase, because the novel weighting method does not use an inverse frequency table.

Fifth, the factorization of the weights for the mentions in static (normalized frequency of the mentions) and dynamic (IC-value per concept) factors, allows updating the input parameters of the model (IC-values) while the index form of the indexed units is preserved. It means that the ontology could be dynamically updated in different ways (merge, concept insertion, etc.), without making changes to the indexed units, if the parent classes for the weighted-mentions are still in the ontology. For example, if a set of new classes is added to the base ontology, the system only needs to run the pre-processing step to get the new set of distances among concepts (classes); then, any new query answer will be computed using the novel semantic relations in the base ontology.

Sixth, like other known methods, the present model also merges the retrieval and ranking of documents in a same step, removing in this way the necessity to use SPARQL or any other query language to retrieve the documents to be ranked, as well as any other semantic retrieval method as it is proposed in [Mustafa et al., 2008]. The query is represented as any another document, and it is used to search the full set of indexed documents, eliminating the first retrieval step of many of the adapted VSM models.

Throughout the present discussion a language inspired in geometric notions is used, with the purpose to enlighten some analogies and relations between the conceptual spaces and its geometric images, expecting that it allows using all these well established and powerful theories. The present invention is related to some results in a novel research trend called geometry-based semantic models, whose first reference is defined by the preliminary ideas discussed in [Widdows, 2004] and partially developed in [Clarke, 2007].

As discussed above, the present invention is a novel contribution to the family of ontology-based IR models, and to the family of ontology-based semantic distances. Lastly, the Intrinsic Ontological Spaces can also be interpreted as an extreme way of ontology-based query expansion, problem recently revised in [Wu et al., 2011], where all the admissible query expansions are already integrated in the representation space itself, avoiding the query expansion problem. In this last direction, in [Saruladha et al., 2012] the authors studied how the semantic similarity/distance measures could be used to expand the user's query through the use of semantically related word in an ontology, problem that is avoided in the present invention.

In accordance with one aspect of the present invention there is provided a computer-implemented method for retrieving semantically relevant information units from a collection of semantically annotated indexed information units in response to a query. The method comprises:

receiving, by a computer system, a semantically annotated query, the semantically annotated query including a set of semantic annotations to individuals or classes within a determined populated base ontology;

embedding, by the computer system, the semantically annotated query in a semantic representation space of an ontology-based IR model that uses a metric space for the representation of the indexed information units, the semantically annotated query being embedded as a set of weighted-mentions to individuals or classes within the populated base ontology;

obtaining, by the computer system, the representation in the semantic representation space for every indexed information unit of the collection;

computing, by the computer system, the Hausdorff distance between the space representation of the query and the space representation of all the indexed information units of the collection;

retrieving and ranking, by the computer system, the relevant information units based on the computed Hausdorff distance.

In a preferred embodiment the retrieving method may further comprise receiving, by the computer system, an input query in natural language; and converting, by the computer system, the input query into the semantically annotated query with regard to the populated base ontology.

A mention to a class in the semantically annotated query is preferably considered as a reference to a full class, the mentioned full class subsuming all the descendant individuals and classes within the populated base ontology.

The step of computing the Hausdorff distance preferably comprises:

retrieving information-content values of the populated base ontology;

retrieving pre-computed pair-wise semantic distances between all the classes within the base ontology;

computing all pair-wise semantic distances between the weighted-mentions of the query and the weighted-mentions of the indexed information units of the collection, using the information-content values and the pre-computed pair-wise semantic distances according to the metric of the representation space.

In a preferred embodiment the information-content values are retrieved by accessing a populated ontology repository.

The information-content values of the populated base ontology preferably include edge-based IC weights for each ontology edge, computed using an intrinsic edge-based IC-computation method.

The information-content values of the populated base ontology may include IC values for each ontology node computed using an intrinsic node-based IC-computation method.

The pre-computed pair-wise semantic distances are preferably retrieved by accessing a file.

In a preferred embodiment the pair-wise semantic distances between two ontology nodes are computed as the shortest weighted-path of the populated base ontology considering all possible paths between said two nodes, and that the edges of the taxonomy can be traversed in any direction.

The computation of pair-wise semantic distances between two ontology nodes preferably includes the computation of a weighted distance value which is the sum of the edge weights for all the edges of the populated base ontology along the shortest path joining said two ontology nodes.

In a preferred embodiment, the edge weight between two adjacent nodes of the populated base ontology is the information-content value of the joint probability between said two adjacent nodes.

The information-content value of the joint probability between two adjacent nodes is preferably computed as the negative binary logarithm of the joint probability.

In another preferred embodiment, the edge weight between two adjacent nodes of the populated base ontology is the information-content value of the child node minus the information-content value of the parent node.

The information units may be text documents, web pages, sentences, multimedia objects or any sort of data that can be represented as a collection of classes or individuals within an ontology.

The ontological representation space defined by the ontology-based IR model satisfies the following structure-preserving axioms: order invariance, metric invariance and inclusion invariance.

In accordance with a further aspect of the present invention there is provided a semantic search system for retrieving semantically relevant information units from a collection of semantically annotated indexed information units in response to a query, the semantic search system comprising a processor and a memory coupled with and readable by the processor and storing a set of instructions which, when executed by the processor, causes the processor to:

receive a semantically annotated query, the semantically annotated query including a set of semantic annotations to individuals or classes within a determined populated base ontology;

embed the semantically annotated query in a semantic representation space of an ontology-based IR model that uses a metric space for the representation of the indexed information units, the semantically annotated query being embedded as a set of weighted-mentions to individuals or classes within the populated base ontology;

obtain the representation in the semantic representation space for every indexed information unit of the collection;

compute the Hausdorff distance between the space representation of the query and the space representation of all the indexed information units of the collection;

retrieve and rank the relevant information units based on the computed Hausdorff distance.

The processor may be further configured to receive an input query in natural language; and convert the input query into the semantically annotated query with regard to the populated base ontology.

In accordance with yet a further aspect of the present invention there is provided a computer-readable memory for retrieving semantically relevant information units from a collection of semantically annotated indexed information units in response to a query, the computer-readable memory comprising a set of instructions stored therein which, when executed by a processor, causes the processor to:

receive a semantically annotated query, the semantically annotated query including a set of semantic annotations to individuals or classes within a determined populated base ontology;

embed the semantically annotated query in a semantic representation space of an ontology-based IR model that uses a metric space for the representation of the indexed information units, the semantically annotated query being embedded as a set of weighted-mentions to individuals or classes within the populated base ontology;

obtain the representation in the semantic representation space for every indexed information unit of the collection;

compute the Hausdorff distance between the space representation of the query and the space representation of all the indexed information units of the collection;

retrieve and rank the relevant information units based on the computed Hausdorff distance.

In accordance with yet a further aspect of the present invention there is provided a computer-implemented method for indexing semantically annotated information units into a search system based on an ontology-based information retrieval model, the method comprising:

receiving, by a computer system, a semantically annotated information unit, the semantically annotated information unit including a set of semantic annotations to individuals or classes within a determined populated base ontology and the frequency of said semantic annotations within the information unit;

embedding, by the computer system, the semantically annotated information unit in a semantic representation space of an ontology-based IR model that uses a metric space for the representation of the information units, the semantically annotated information unit being embedded as a set of weighted-mentions to individuals or classes within the populated base ontology;

storing the set of weighted-mentions of the indexed information unit in an information units repository;

storing the semantic annotations of the information unit in a populated ontology repository.

The indexing method may further comprise receiving, by the computer system, the information unit in natural language; and converting, by the computer system, the information unit into the semantically annotated information unit with regard to the populated base ontology.

The step of storing the semantic annotations of the information unit in a populated ontology repository preferably comprises:

inserting the new mentions to individuals and classes in the populated base ontology;

annotating the mentions to classes and individuals with inverted indexes to the indexed information units;

updating the information-content values for the registered individuals.

The information-content values for the registered individuals may be node-based IC values computed using an intrinsic node-based IC-computation method.

In a preferred embodiment the information-content values for the registered individuals are edge-based IC values computed using an intrinsic edge-based IC-computation method.

The edge-based IC values are preferably computed according to the updated joint probability between the individuals and their parent concepts.

In accordance with a further aspect of the present invention there is provided a system for indexing semantically annotated information units into a search system based on an ontology-based information retrieval model, the indexing system comprising a processor and a memory coupled with and readable by the processor and storing a set of instructions which, when executed by the processor, causes the processor to:

receive a semantically annotated information unit, the semantically annotated information unit including a set of semantic annotations to individuals or classes within a determined populated base ontology and the frequency of said semantic annotations within the information unit;

embed the semantically annotated information unit in a semantic representation space of an ontology-based IR model that uses a metric space for the representation of the information units, the semantically annotated information unit being embedded as a set of weighted-mentions to individuals or classes within the populated base ontology;

store the set of weighted-mentions of the indexed information unit in an information units repository;

store the semantic annotations of the information unit in a populated ontology repository.

In accordance with yet a further aspect of the present invention there is provided a computer-readable memory for indexing semantically annotated information units into a search system based on an ontology-based information retrieval model, the computer-readable memory comprising a set of instructions stored therein which, when executed by a processor, causes the processor to:

receive a semantically annotated information unit, the semantically annotated information unit including a set of semantic annotations to individuals or classes within a determined populated base ontology and the frequency of said semantic annotations within the information unit;

embed the semantically annotated information unit in a semantic representation space of an ontology-based IR model that uses a metric space for the representation of the information units, the semantically annotated information unit being embedded as a set of weighted-mentions to individuals or classes within the populated base ontology;

store the set of weighted-mentions of the indexed information unit in an information units repository;

store the semantic annotations of the information unit in a populated ontology repository.

BRIEF DESCRIPTION OF THE DRAWINGS

Embodiments of the present invention with now be described, by way of example, with reference to the accompanying drawings in which:

FIG. 2 shows a summary table with a comparative analysis of the ontology-based IR models used in the state of the art and in the present invention.

FIG. 3 represents a comparative analysis of semantic distances and similarities used in the state of the art and in the present invention.

FIGS. 9A and 9B show a summary of the elements defined by the IR model proposed in the present invention.

PREFERRED EMBODIMENT OF THE INVENTION

Figure 1:
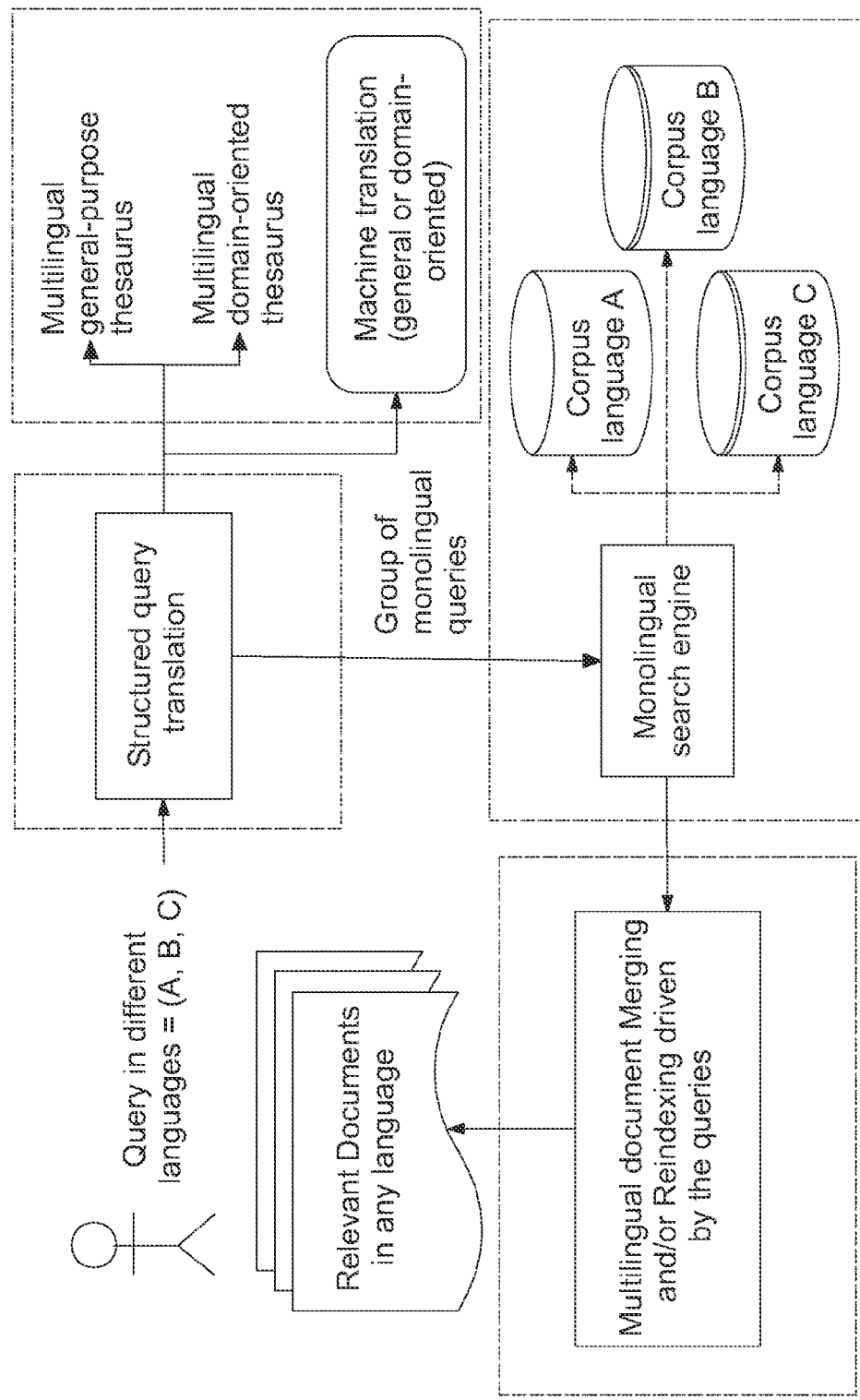
FIG. 1 shows the basic architecture of a multilingual or cross-language information retrieval (MLIR/CLIR) system as an application of the standard VSM IR models.
Figure 4:
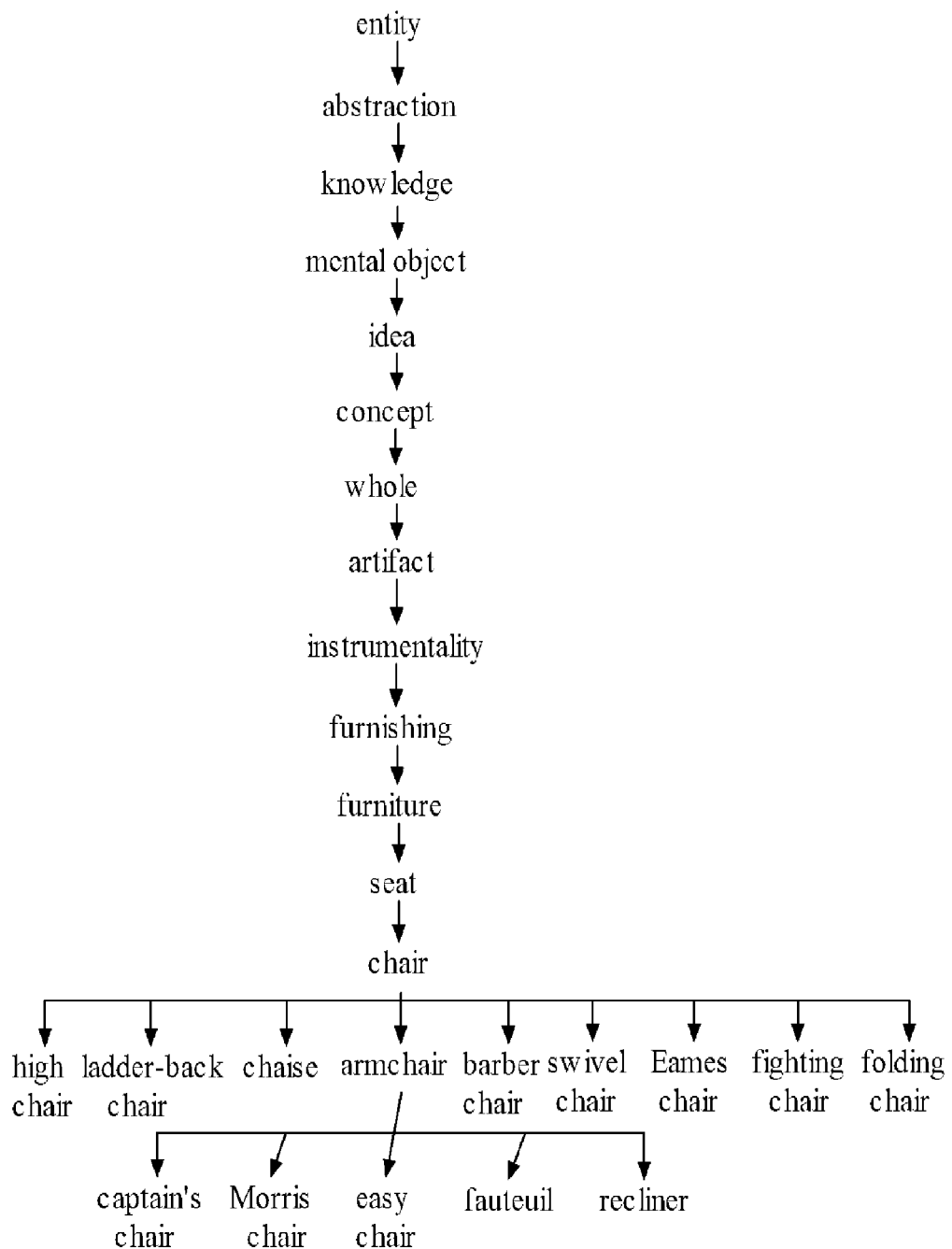
FIG. 4 shows an example of a tree-like ontology, which is a partial sub-graph of WordNet around the "armchair" concept.
Figure 5:
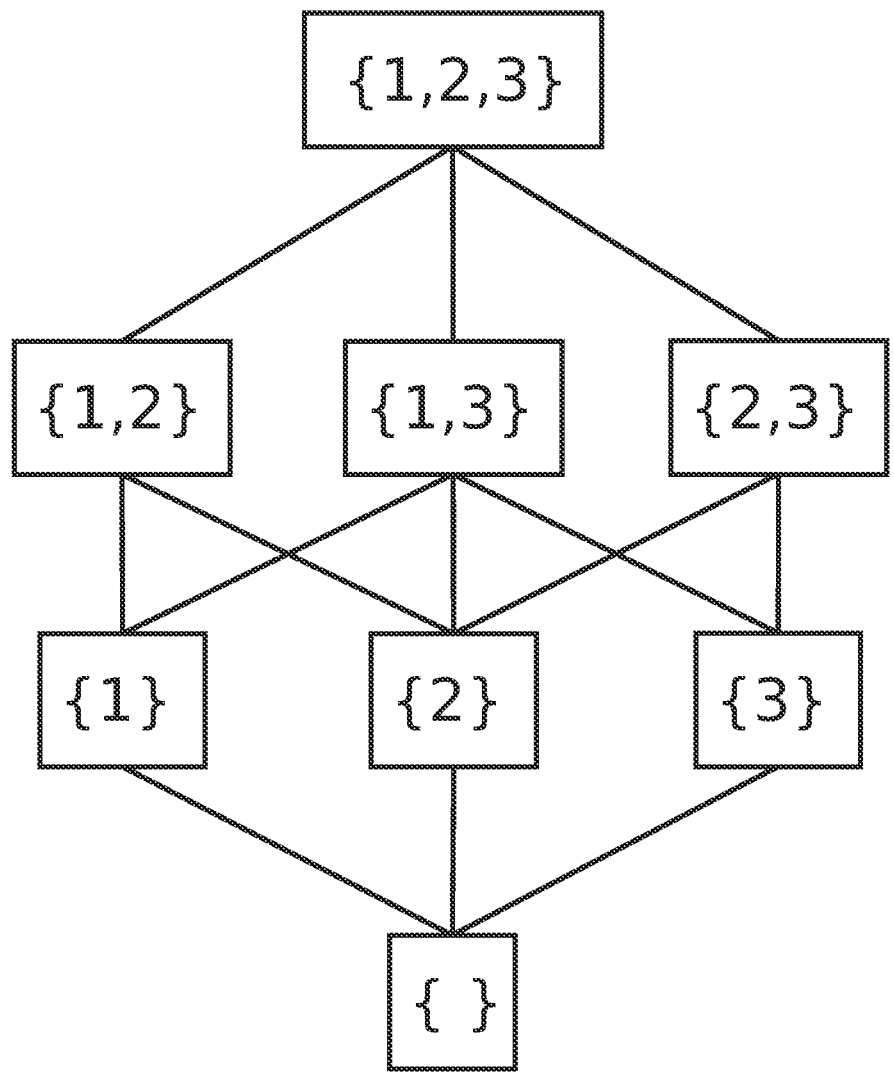
FIG. 5 shows an example of an algebraic lattice structure.
Figure 6:
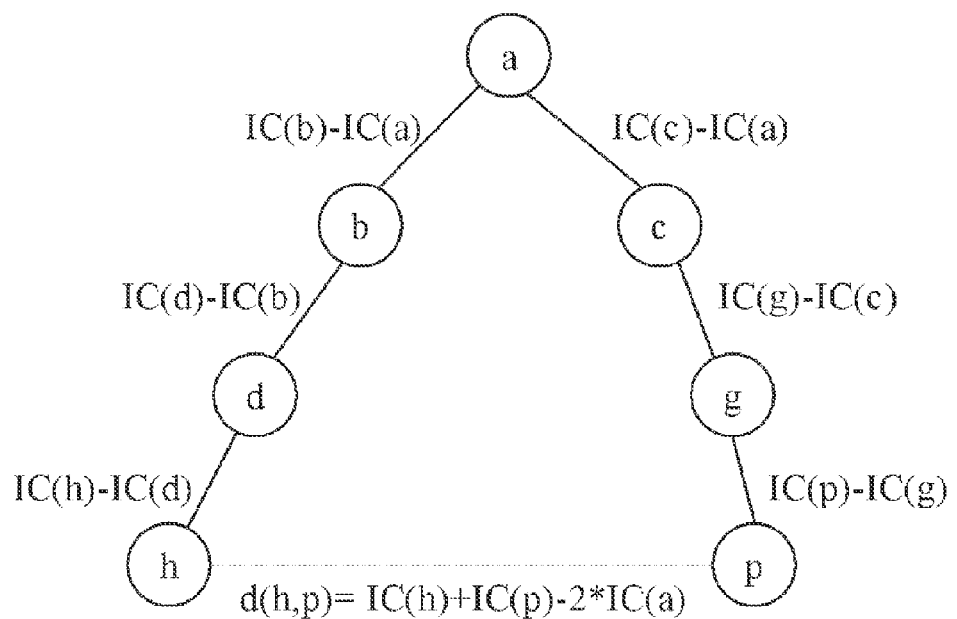
FIG. 6 shows a tree-like ontology with the edge weights defined as the difference of Information Content (IC) values between its extreme nodes.
Figure 7:
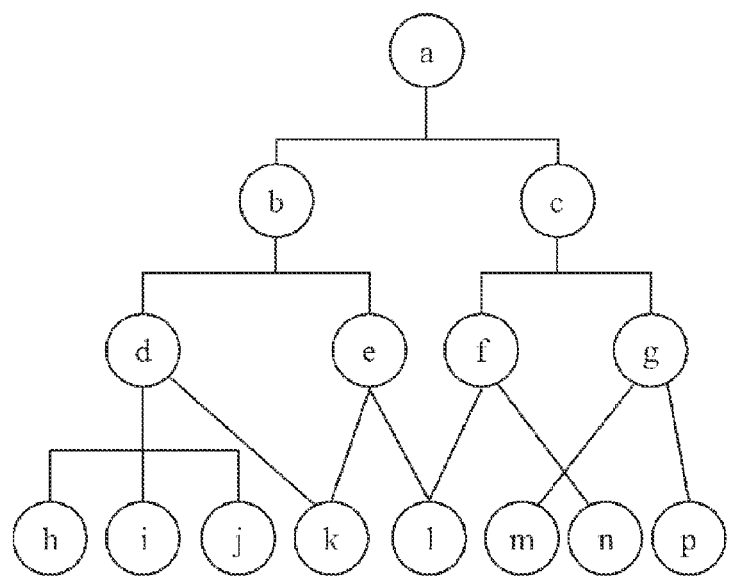
FIG. 7 shows a taxonomy with upper semi-lattice structure.
Figure 8:
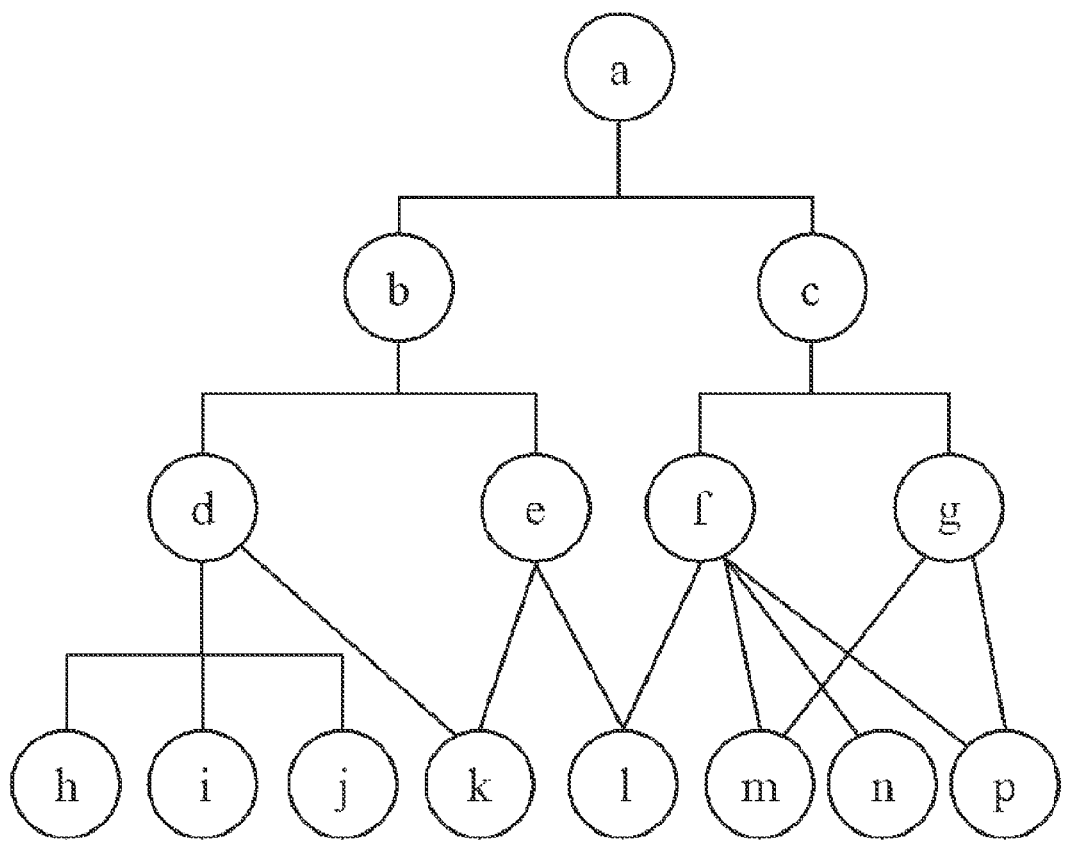
FIG. 8 shows a taxonomy with the structure of a general partially ordered set (poset structure).

The Intrinsic Ontological Spaces are a sort of semantic representation spaces for populated ontologies, which are based in a metric space derived from a novel ontology-based distance introduced in the present invention, and called weighted Jiang-Conrath distance. These spaces represent semantically annotated information units, such as text documents, in a metric space compound by weighted-elements. The semantic annotations encode mentions to individuals or classes within a base ontology provided by the user. The base ontology is populated with new added data through an indexing and storing process.

The representation space is a metric space endowed with a hierarchical structure, which represents the classes (concepts) and individuals (instances) in a base ontology within the same space, while their intrinsic structure relations are preserved.

The intrinsic geometry of the ontology is defined by three structures: (1) the semantic distance (metric structure) among classes, (2) the taxonomic relations (graph/order structure), and (3) the set inclusion relations (set structure).

The main goal of the present invention is to design a semantic representation of the ontology space that preserves these structures. The representation of the ontology is defined by a consistent metrization of the ontology space, integrating classes and individuals in a same representation, while their intrinsic structure relations are preserved.

The indexing method and IR model proposed in the present invention comprise the following components:

(1) the definition of the semantic representation space as the universal set of weighted-mentions to individuals and classes within the populated base ontology, space that we call Intrinsic Ontology Spaces;

(2) a novel ontology-based semantic distance among concepts (classes) and instances of concepts (individuals) within a populated base ontology, that we call weighted Jiang-Conrath distance;

(3) a semantic weighting method that combines statistical and semantic information to represent the semantic annotations associated to the indexed information units in the semantic representation space;

(4) an embedding method to injects semantically annotated data, or information units, in the representation space of the model;

(5) an embedding method to inject semantically annotated queries in the semantic representation space of the model;

(6) a novel ontology-based ranking method for the retrieval and sorting of the indexed units retrieved by the system;

(7) a pre-processing step for computing all the parameters and data structures to enable the indexing and searching operations of the search engine of the system;

(8) a retrieval method to get a ranked collection of indexed units related to an input query; and (9) an indexing and storing method to insert new data into the search and indexing system.

We herein explain the proposed method and model by describing every component enumerated above, using the drawings. The summary of algebraic objects and formulas are summarized in the summary table represented in FIGS. 9A and 9B.

Definition of the Representation Space

Hereinafter, uppercase letters are used to denote sets, and lowercase letters are used for elements of a set. By the pair $T=(C, \leq_C)$, see row 1 in FIG. 9A, we denote a partially ordered set with a root node, which defines a taxonomy denoted by T, where $C=\{C_i\}$ is a non-empty finite set of concepts (classes) and $\leq_C$ denotes the order relation on the set C.

If we provide the set of concepts C with any ontology-based metric $d_C: C \times C \to \mathbb{R}$, we get the metric space $(C, d_C)$, structure that we call a conceptual metric space, such as is defined below. Hence, A conceptual metric space is a pair $(C, d_C)$ defined by a non-empty set of concepts $C=\{C_i\}$ endowed with a metric $d_C: C \times C \to \mathbb{R}$ on it.

We can extend the taxonomy T with a family of sets $I_C=\{I_{C_i}\}$ (see row 2 in FIG. 9A) of instances (individuals) to concepts in C, to obtain the pair $(C \cup I_C, \leq_C)$, called a populated base ontology (see row 3 in FIG. 9A). A populated ontology is the tuple $O=(C \cup I_C, \leq_C)$, where $=(C,\leq_C)$ is a taxonomy and $I_C=\{I_{C_i}\}$ is a family of sets of instances to concepts in C.

Endowing the populated ontology with any ontology-based metric $d_C: C \times C \to \mathbb{R}$, we get the tuple $\mathscr{O}=(C \cup I_C, \leq_C, d_C)$, structure that we call a metric ontology, as defined in row 4 of FIG. 9A. Hence, a metric ontology is a tuple $\mathscr{O}=(C \cup I_C, \leq_C, d_C)$, where the tuple $(C \cup I_C, \leq_C)$ is a populated ontology, where there is also a metric space defined by the distance function $d_C: C \times C \to \mathbb{R}$. The finite set $I_C=\{I_{C_i} | \forall C_i \in C\}$ is a family of sets whose elements are instances of every concept $C_i \in C$. The family of sets of instances verifies the set inclusion relation with regard to its associated concepts, such that it verifies $\forall C_i \in C \to I_{C_i} \subset C_i$.

The goal of the IR model proposed in this invention is to build a semantic representation for any semantically annotated corpus, whose semantic annotation is based in a populated ontology $(C \cup I_C, \leq_C)$. The method only considers the "is-a" relations within the ontology, discarding any other sort of relations. The "is-a" relation refers to the explicit inheritance relation between two concepts, by example, one motorbike is a two-wheel vehicle, thus, the last one concept subsumes the first one. The input to our IR model is a populated taxonomic ontology.

We define an ontology representation space, as the pair $(X, d_X)$, with $X = C \cup I_C \times [0,1] \subset \mathbb{R}$, where $d_X: X \times X \to \mathbb{R}$ is a metric on the space of weighted-mentions to individuals and classes within a base metric ontology. The elements of the representation space X are weighted references to instances of classes (individuals), or weighted references to concepts (classes). The ontology representation space, shown in row 7 of FIG. 9A, is thus considered a metric space $(X, d_X)$, where $X = C \cup I_C \times [0,1] \subset \mathbb{R}$ is a space of weighted-mentions to individuals and classes on a base metric ontology $\mathscr{O}=(C \cup I_C, \leq_C, d_C)$, and $d_X: X \times X \to \mathbb{R}$ is a metric on X.

In the present model, any information unit is represented as a set of weighted references to classes or individuals. The inputs to the model are a collection of information units annotated with classes and individuals in the populated ontology. The information units could be documents, or other information source that admits the same representation. The information units must have been semantically annotated with the frequency of typed entities (individuals) or classes within the base ontology, as shown in row 5 of FIG. 9A. The weighting method used in the model consists in the unit normalization of the frequencies of every typed reference in the document (TF-weighting). As shown in row 6 of FIG. 9A, any annotated information unit $\delta_k$ is a set of tuples $\delta_k=\{(\tau j, fj^k) \in C \cup I_C \times \mathbb{N} | j \in J(k)\}$ where $\tau j$ denotes the j-th reference to a class or typed individual in the ontology, $fj^k$ the frequency of the concept or instance $\tau j$ in the information unit $\delta_k$, and J(k) is a set of indexes of the individuals or classes cited in the information unit $\delta_k$.

The ontology metric space is defined by the metric $d_X$: $X \times X$ R, which is based in an extension the novel ontology-based distance called weighted Jiang-Conrath given by equation (3) below.

Once the main elements of the present IR model have been introduced, we define the first principles or axioms satisfied by the model. The intrinsic ontology embedding and Intrinsic Ontology Spaces are defined in row 8 of FIG. 9A. Given a populated ontology $(C \cup I_C, \leq_C)$, its associated metric ontology $\mathscr{O}=(C \cup I_C, \leq_C, d_C)$, a space of frequency-annotated information units $D = C \cup I_C \times \mathbb{N}$, and a metric space $(X, d_X)$. A function pair $\phi_I: D \to X$ and $\phi_C: C \to X$ is called an intrinsic ontological embedding, and the metric space $(X, d_X)$ an Intrinsic Ontological Space, if the following axioms are satisfied:

(1) Order (subsumption) invariance:

$$C_1 \leq_C C_2 \Rightarrow \phi_C(C_1) \subset \phi_C(C_2), \forall (C_1, C_2) \in C \times C$$

(2) Metric invariance:

$$d_C(C_1, C_2) = d_H(\phi_C(C_1), \phi_C(C_2)), \forall (C_1, C_2) \in C \times C$$

(3) Inclusion invariance:

$$\phi_I(\tau) \subset \phi_C(C_i), \forall \tau \in I_{C_i} \qquad a)$$

$$\phi_I(\tau) \subset \phi_C(C_j), \forall \tau \in I_{C_i}, \forall C_j | C_i \leq_C C_j \qquad b)$$

In this way, the Intrinsic Ontology Spaces are defined as an ontological representation space which verifies the structure-preserving axioms enumerated above. Note that in the proposed model, every individual is considered as a child node of its parent concept, with its own IC-value. By other hand, every full class within the ontology is mapped as a set to the representation space through the function $\phi_C$.

The first axiom states that the mapping $\phi_C$ preserves the subset (order) relation among concepts in the representation space, while the taxonomy order is transformed in a space subset relation according to the metric $d_X$. The second axiom establishes the natural equivalence (morphism) between the input ontology-based metric $d_C$ and the metric on subsets of the representation space, given by the Hausdorff distance $d_H$ on the space of subsets of X. It means that the distance between concepts in the ontology is equal to the distance among its images. Finally, the third axiom establishes that the image of every individual (instance) of class in the representation space, must be included in the image set of its parent class and all the ancestor classes within the ontology. The last axiom (3.b) can be deduced from the axioms (1) and (3.a).

The algebraic objects involved in the definition of the Intrinsic Ontology Spaces model are summarized in FIGS. 9A and 9B.

The proposed method in this invention to build the IR model called Intrinsic Ontology Spaces comprises: (1) the definition of the collection of algebraic objects and functions summarized in FIGS. 9A and 9B, (2) the pre-processing step described in FIGS. 14A and 14B, (3) the search and retrieval method described in FIG. 15, and (4) the indexing method of information units described in FIG. 16. These mathematical objects are defined as follows.

Individuals Embedding.

The function $\phi_I$ defined in row 9 of FIG. 9A defines the embedding for isolated mentions to individuals within the populated ontology in the metric space X. If one information unit contains only one mention to an individual or class within the populated ontology, the individual is assigned the static weight 1, without taking into account its frequency inside the indexed unit.

Whole Class Embedding.

In the case of queries, we consider that any mention to a class (concept) within the populated ontology is a reference to the full class, it means that the query selects all the classes (concepts) and individuals (instances) subsumed by the mentioned class. Precisely, it is the meaning of the embedding function $\phi_C$ given by the definition of row 10 in FIG. 9A. The image of any class $C_i$ is simply the image in the representation space X of every subsumed class or individuals within the ontology.

Information Unit Embedding.

The function φ, defined in the row 11 of FIG. 9B, defines the embedding and static weighting method used to represent the information units (documents) in the representation space of the proposed IR model. The input to the function is a set of frequency-based weighted mentions to individuals and classes inside the information units to be indexed. The function computes a set of static weights for each mention through the normalization of the frequencies in the unit to be indexed, or represented in the space $(X, d_X)$ of the model. The function generates a set of tuples representing the weighted-mentions as indexing representation for the unit, such as is described in FIG. 16.

Semantic Weighting.

Because an information unit (document) is a collection of frequency-based weighted mentions, doing some algebra, we can conclude that the information content (IC-value) of the information unit is the sum of the IC-value of every mention multiplied by its number of occurrences in the information unit. The last observation allows us to define the normalized IC-value for each indexed information unit, as shown in row 12 of FIG. 9B. The normalized IC-value is a combination of two factors: (1) the static weights, which can be interpreted as the statistical fingerprint of the information unit, and (2) the IC-value of the mentioned node which is a semantic descriptor, updated dynamically every time a new information unit is indexed by the IR model. The normalized IC-value endorses the use of static normalized term-frequency (TF) weights as index form for the indexed information units, as shown in row 11 of FIG. 9B.

Novel Weighted Jiang-Conrath Distance.

The drawbacks of the standard Jiang-Conrath distance were already mentioned. To overcome these limitations and extending ontology-based distances to individuals, we herein introduce a novel ontology-based distance that we call weighted Jiang-Conrath distance, denoted by $d_{wJC}$, which is defined in row 13 of FIG. 9B. The name of the distance recalls that it is an extension and generalization of the standard Jiang-Conrath distance to any sort of taxonomy. Given any populated ontology $O=(C \cup I_C, \leq_C)$, we define a weighted and unoriented graph $G=(V,E,w)$, with a positive real-valued function on each edge $w: E \rightarrow \mathbb{R}$. Every vertex $v \in V$ represents an element in the set $C \cup I_C$, and the edges are defined by $E=\{(c_i, c_j) \in C \cup I_C \times C \cup I_C | c_i \neq c_j \wedge c_j = LA(c_i)\}$, where LA is the lowest ancestor. The edge-based weight function $w(e_{ij})$ is defined as the IC-value of the joint probability of observation for a subsumed child concept $c_i$ given its parent concept $c_j$, as it is defined in equation (3). The weighted Jiang-Conrath distance $d_{wJC}$ is defined as the shortest weighted-path among two taxonomy nodes $a,b \in C \cup I_C$, as it is shown in equation (3) given below.

The evaluation of $d_{wJC}$ requires the implementation of any shortest path algorithm to compute the shortest path among nodes of the ontology, such as the revised ones in [Ahuja et al., 1990]. Equation (3) represents the novel weighted Jiang-Conrath distance.

$$d_{wJC}: C \times C \rightarrow \mathbb{R} \quad (3)$$

$$d_{wJC}(a,b) = \min_{x \in P(a,b)} \left\{ \sum_{e_{ij} \in x} w(e_{ij}) \right\}$$

$$w: E \rightarrow \mathbb{R}^+$$

$$w(e_{ij}) = IC(P(c_i | c_j)) = -\log_2 P(c_i | c_j)$$

$$P(c_i | c_j) \in [0,1] \rightarrow w(e_{ij}) \geq 0, \forall e_{ij} \in E$$

In equation (3) the distance value is the sum of weights for all the edges along the shortest path joining the ontology nodes "a" and "b", which can be concepts or individuals, considering the taxonomy as an unoriented graph. P(a,b) denotes all possible edge paths joining the nodes "a" and "b" within the base ontology. The edge weights are defined by the IC-value of the joint probability $P(c_i | c_j)$ between any child concept $c_i$ and its parent concept $c_j$. Note that edge weights are always positive, because the joint probability takes values in the range [0,1]. The definition of the edge weights is valid on any sort of taxonomy, and if the taxonomy is tree-like, the weights induce that $d_{wJC}$ mimics the classical Jiang-Conrath distance.

Computation of the Edge Weights.

The edge weights $w(e_{ij})$ can be computed in two different forms as follows: (1) using an intrinsic IC-computation method, or (2) using an intrinsic computation method for the edge-based joint probabilities, the latter being the preferred method. It is now explained how to compute the edge weights using these two different approaches:

First, if any intrinsic IC-computation method is used to compute the IC values in the nodes, such as the method of [Zhou et al., 2008] defined by the equation (4) or other equivalent method proposed in [Seco et al., 2004], then the edge weights are defined by the equation (5). In equation (4) hypo(c) is the number of child concepts (hyponyms) of the concept c, k is a constant in the range [0,1] used to balance the contribution of every term (Zhou et al. suggests k=0.5), nodemax is the total number of concepts in the taxonomy, deep(c) is the depth of the concept in the taxonomy (the distance measured as the number of nodes from the concept to the root node), and $deep_{max}$ is the maximum depth value for any concept in the taxonomy.

$$IC(c) = -\log(p(c)) = k\left(1 - \frac{\log(hypo(c)+1)}{\log(node_{max})}\right) + (1-k)\frac{\log(deep(c))}{\log(deep_{max})} \quad (4)$$

$$w(e_{ij}) = IC(c_i) - IC(c_j) \quad (5)$$

Second, a direct method to estimate intrinsically the joint probabilities $P(c_i | c_j)$ for each edge can be used, fulfilling the intrinsic property that the sum of all the joint probabilities for the subsumed concepts of any parent concepts must be 1, as it is expressed by the equation (6). In this second case, new methods are herein provided to compute intrinsically the joint probabilities, and thus, the edge weights can be computed using the formula $w(e_{ij})=IC(P(c_i | c_j))$ in equation (3), wherein the joint probabilities $P(c_i | c_j)$ are defined, given by the equations (7), (8) and (9) below, being the equation (8) the preferred method. This method for the computation of the edge weights admits any other intrinsic estimation method for the edge-based joint probabilities that could be developed in the future. The computation of the IC-based edge weights using the equation (7) is called IC-JointProbUniform, while the method using the equation (8) is called IC-JointProbHypo, and when the equation (9) is used the method is called IC-JointProbLeaves.

$$\sum_{\forall i | c_j = LA(c_i)} P(c_i | c_j) = 1 \quad (6)$$

$$P(c_i | c_j) = \frac{1}{|children(c_j)|} \rightarrow w(e_{ij}) = \log_2 |children(c_j)| \quad (7)$$

-continued $$P(c_i \mid c_j) = \frac{hypo(c_i) + 1}{\sum_{\forall i \mid c_j = LA(c_i)} (hypo(c_i) + 1)} \rightarrow w(e_{ij}) = -\log_2\left(\frac{hypo(c_i) + 1}{\sum_{\forall i \mid c_j = LA(c_i)} (hypo(c_i) + 1)}\right) \quad (8)$$

$$P(c_i \mid c_j) = \frac{leaves(c_i) + 1}{\sum_{\forall i \mid c_j = LA(c_i)} (leaves(c_i) + 1)} \rightarrow w(e_{ij}) = \quad (9)$$

$$-\log_2\left(\frac{leaves(c_i) + 1}{\sum_{\forall i \mid c_j = LA(c_i)} (leaves(c_i) + 1)}\right)$$

The equation (7) represents a uniform probability distribution for each direct child (1-degree descendant) concept, and |children(ci)| is the number of direct child concepts. By other hand, the (8) and (9) equations are two weighting schemes based in the proportion of subsumed concepts or leaves for each child concept (node). The edge-based joint probability P(ci|cj) could be intrinsically computed by any other method, but it doesn't change the definition of the ontology-based semantic distance described herein.

In equation (8) the function hypo(ci) defines the number of subsumed concepts by the concept ci without inclusive it, while the function leaves(ci) in equation (9) returns the number of leaf concepts (no descendants) subsumed by the concept (ci) without inclusive it.

The intrinsic IC-computation methods associated to the equation (7), (8) and (9) could be easily adapted to be used in combination with any other ontology-based IC semantic measure in two steps: (1) the computation of the probability for each concept in the taxonomy, and (2) the computation of the IC values for each concept given by the negative binary logarithm of the probabilities values of each concept. One method for the first step is to use a total ordering traversal of the taxonomy starting on the root node, then to compute the probability for each concept traversing the ordered list of concepts. Here we describe in detail the previous method. First, the probability computation method must build a total ordering of the concept in the taxonomy, which is defined by an ordered list of concepts, such that every concept is in a subsequent position to every one of its parent concepts. Second, the method assigns a value of "1" to the probability of the first concept in the ordered list (root concept), then, the method traverses the concept nodes according to the total ordering built before, and it computes the probability of every child concept as the sum over each parent of the product of the parent probability by estimated intrinsic joint probability P(child|parent).

Extending the Distance Among Concepts to Individuals.

In the proposed model, every individual is considered as a child node of its parent concept, with its own IC-value. It means that the distance from an individual to any other ontology node is simply the accumulated weighted-path from the individual to the extreme node, which can be a class or other individual.

Static and Dynamic Nodes of the Base Ontology.

The populated ontology of the IR model contains static and dynamic nodes. The static nodes correspond to the classes within the base ontology, while the dynamic nodes correspond to the individuals, which are inserted as semantic annotations for the indexed info units. The proposed model considers two different types of individuals: (1) mentions to instances of concepts (individuals), or (2) mentions to whole classes using any name, synonym or morphological variant of the classes, for example, the word "hospital" in the user query "hospitals in Washington", refers to all the instances subsumed by the concept "hospital" that are registered within the populated ontology. Due to its static nature, we can compute a priori all the pair-wise distance values among classes of the base ontology, such as it is described in FIGS. 14A and 14B. The last process is called the pre-processing step, and it allows the efficient computation in run-time of the distance among weighted-mentions in the representation space.

Metric of the Intrinsic Ontology Space.

In row 14 of FIG. 9B we can appreciate the distance function $d_X$ which defines the metric for the representation space of the proposed IR model. The metric $d_X$ defines the distance between weighted-mentions to individuals or classes in the representation space (X, $d_X$). The $d_X$ function is given by the sum of distances from every weighted-mention to its lowest ancestor (LA) within the base ontology, plus the pre-computed weighted Jiang-Conrath distance among the LA concepts of both mentions. The present model supports multiple inheritance for any individuals, which means that any individual can belong to more than one class; thus, the closed form for the distance function $d_X$ is the shortest weighted-path considering all possible lowest ancestors of any individual, such as is defined by the formula shown in row 14 of FIG. 9B. The metric of the space given by $d_X$, is defined by two terms according to the difference among the lowest ancestor classes of every pair of mentions. Given two weighted-mentions (x,$w_x$) and (y, $w_y$), if x is equal to y, then the distance value is given by the absolute value of the binary $\log(w_x/w_y)$; otherwise, the distance $d_X$ is defined by the minimum value (shortest path) over the Cartesian product LA(x)×LA(y), such as shown in the formula of row 14 in FIG. 9B.

Intrinsic Ontological Spaces (IOS).

The representation space of the IR model proposed in the present invention is called Intrinsic Ontological Spaces. As it is shown in row 15 of FIG. 9B, the IOS space is simply the metric space (X, $d_X$) according to the function $d_x$ defined above.

Hausdorff Distance Between Subsets of a Metric Space.

Figure 10:
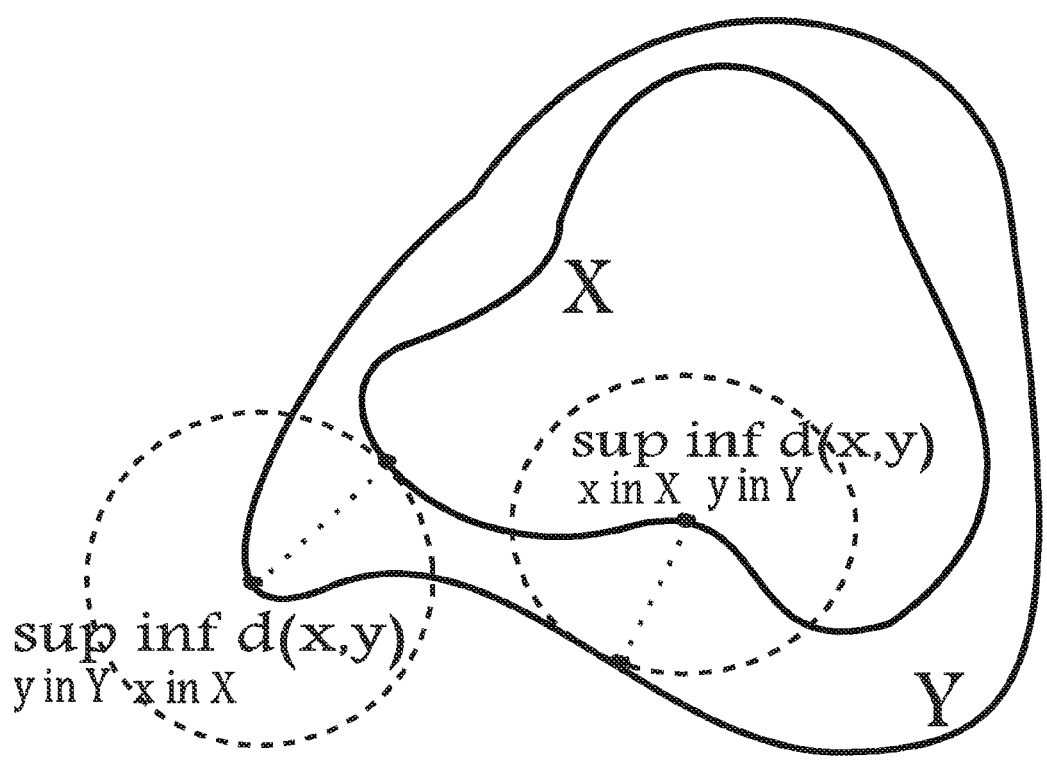
FIG. 10 shows the geometric interpretation of the Hausdorff distance among subsets of a same metric space.

The Hausdorff distance is well-known in the literature about metric spaces, whose definition is included in row 16 of FIG. 9B. The symbol P(X) denotes the power set of the set X, compounded by all the subsets of X. We use the Hausdorff distance to define the ontology-based ranking method $d_D$ of the IR model proposed in this invention, as shown in row 17 of FIG. 9B. FIG. 10 shows the geometric interpretation of the Hausdorff distance among subsets of a same metric space. The Hausdorff distance is defined as the largest distance value among all the pair-wise minimum distance value from the elements from one subset X to the opposite subset Y. For each subset, the Hausdorff distance selects the element with the largest distance value to the opposite subset; then, the Hausdorff distance is defined as the maximum of these two values. For example, the left bottom circle is centred on the element of Y with the largest distance value to any element of set X. On the other hand, the right bottom circle is centred on the element of X with the largest distance value to the any element of the set Y. Therefore, the Hausdorff distance will be the largest distance value between the distance values associated to these elements.

Ontology-Based Ranking.

In row 17 of FIG. 9B we define the ranking function as the distance function $d_D$ among information units. Any input query is embedded through the process described in FIG. 15.

Once the query has been injected in the representation space, the system measures its distance to every indexed information unit using the function $d_D$, which is simply their Hausdorff distance according to the metric $d_X$. The ranking is ontology-based because it is based in the Hausdorff distance, which is derived from $d_X$, and the last one is also derived from an ontology-based semantic distance, the novel weighted Jiang-Conrath distance.

Distance Between any Weighted-Mention and a Full Class.

We already explained above that the mention to any class (concept) within an input query is considered as a reference to the full class. It means that any mentioned full class must subsume all its descendant nodes within the ontology. The key idea to speed-up the computation of the Hausdorff in this case is to realize that we can use the definition of the full class embedding $\phi_C$, given by the expression in row 10 of FIG. 9A. Following this observation, we arrive to definition of the distance $d_{IC}$ (individual-full class), shown in row 18 of FIG. 9B. This function is used in step 1522 of the search and retrieval process described in FIG. 15. Note that a full class is selecting the region of the representation space that includes all its descendant nodes. The function $d_{IC}$ works like a geometry-based logic operator which avoids the necessity of executing a preliminary formal query on the populated ontology, with the aim of retrieving the indexed units semantically that are related to the input query.

Figure 11:
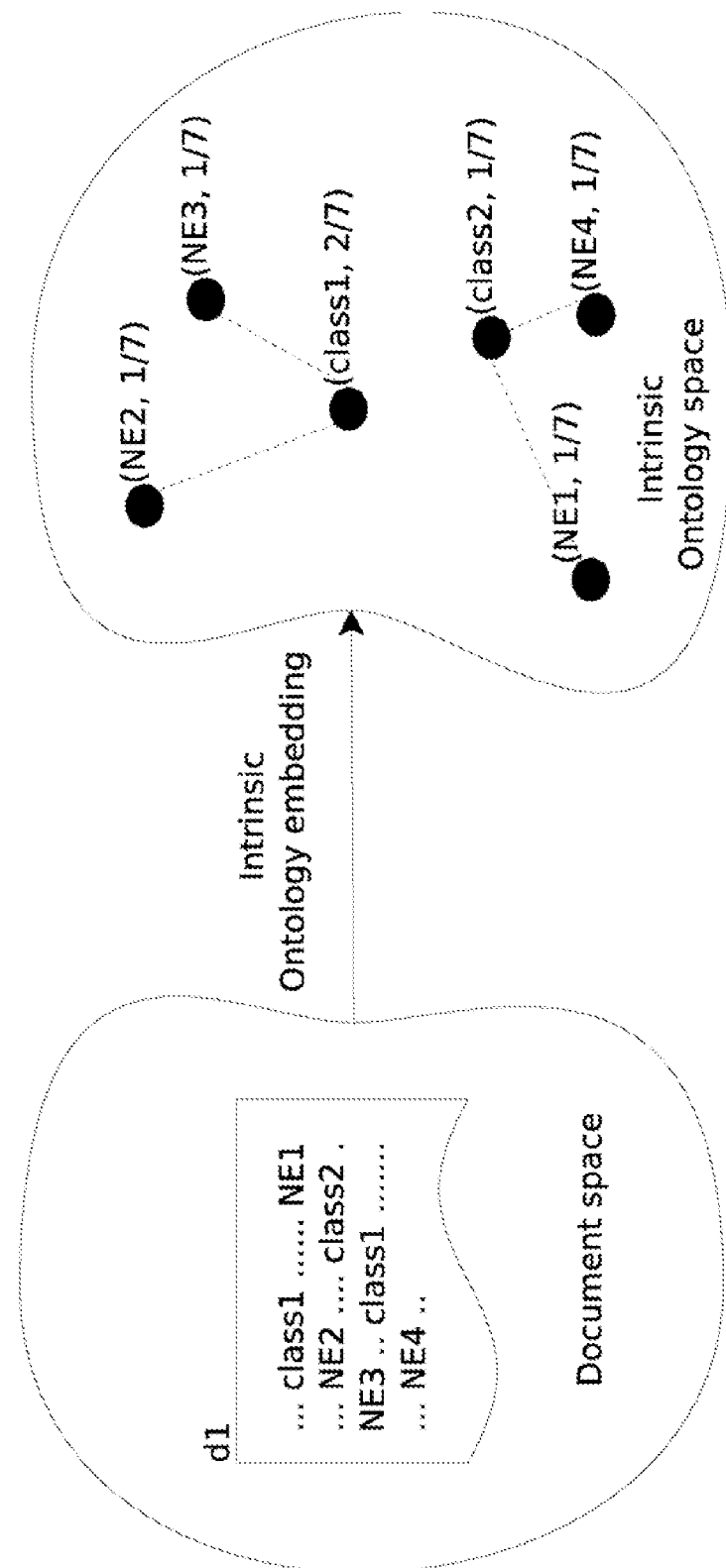
FIG. 11 shows the semantic representation of an input document into the metric space defined by the IR model proposed in the present invention.

FIG. 11 shows, as an example, a document embedding in the Intrinsic Ontological Space. The mentions to concepts (classes) and instances of concepts (individuals) within the document are weighted and injected in the metric space holding its relations to its parent concepts (classes). Since a metric space is a free-coordinate space, we do not have a direct image of the elements, as in the case of an Euclidean representation. By contrast, we can only appreciate the structure of the space through the distance relations induced by the metric. In FIG. 11, the acronym NE stands for Named Entity, being it the common name assigned in the scope of IR to the instances of a defined concept.

Figure 12:
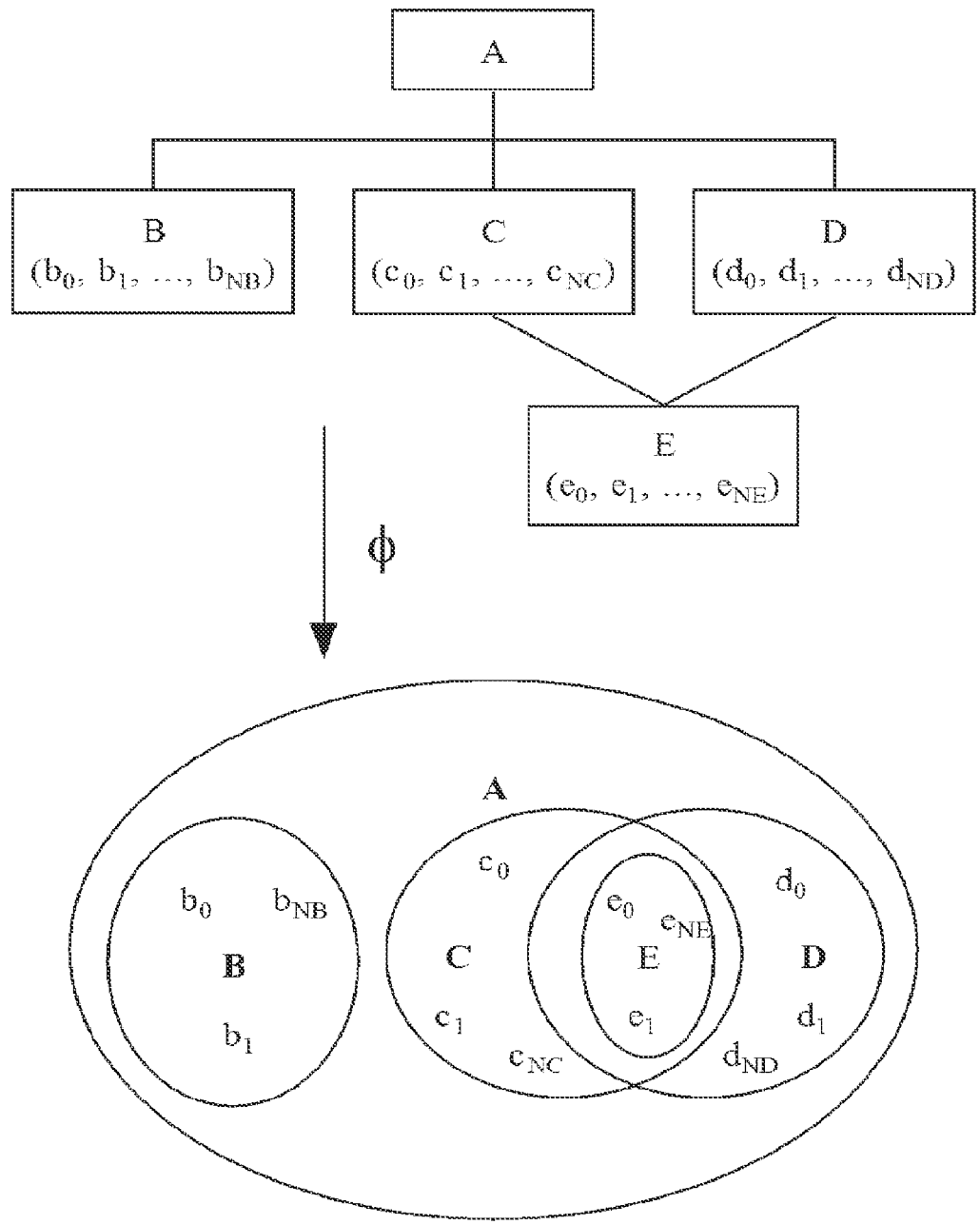
FIG. 12 shows a representation about how the intrinsic order structure of a taxonomy is transformed in a geometric structure into the semantic representation space, which reproduces geometrically the intrinsic order structure of the taxonomy.

FIG. 12 shows the intrinsic embedding on any populated base ontology in the representation space. Every concept (class) of the taxonomy is mapped to a subset of the representation space which subsumes the images by the embedding of all its individuals and derived concepts. If the taxonomy is tree-like, then we get a hierachical Voronoi structure [Good & Angel, 2006], where each cell is defined by the site associated to the distinguished element for each class. If one concept "E" derives from two parent concepts "C" and "D", then its image in the representation space is a region in the intersection of both parent regions.

Figure 13:
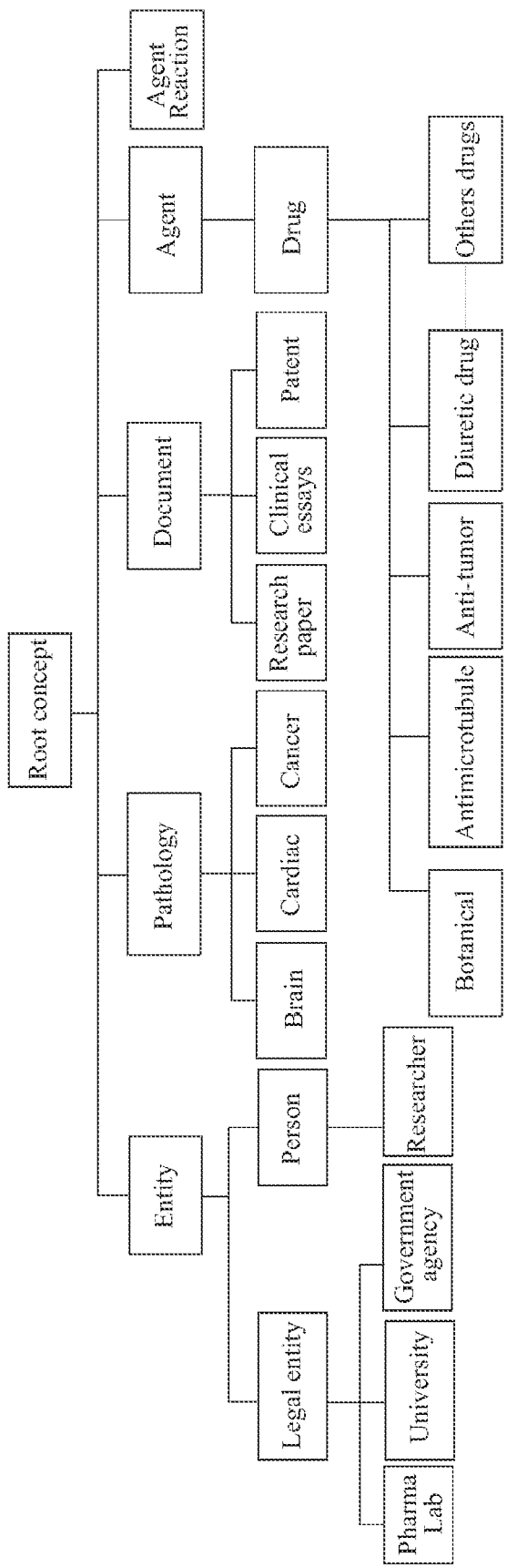
FIG. 13 shows an ontology example used for describing the proposed model.

FIG. 13 shows an ontology example in the bioengineering domain which is used as base ontology in the rest of the figures to clarify the operation of the proposed method. The ontology defines some types of documents to be indexed, as well as some types of entities, pathologies and sort of agents to be recognized within the indexed papers. The ontology defines an object model to organize the content of the indexed documents and for supporting the search and retrieval process.

The pre-processing, search and indexing methods will now be described in detail. The pre-processing of the IR model is described in FIGS. 14A and 14B; the search and retrieval method is described in FIG. 15; and the indexing method is described in FIG. 16.

Pre-Processing Method.

Figure 14A:
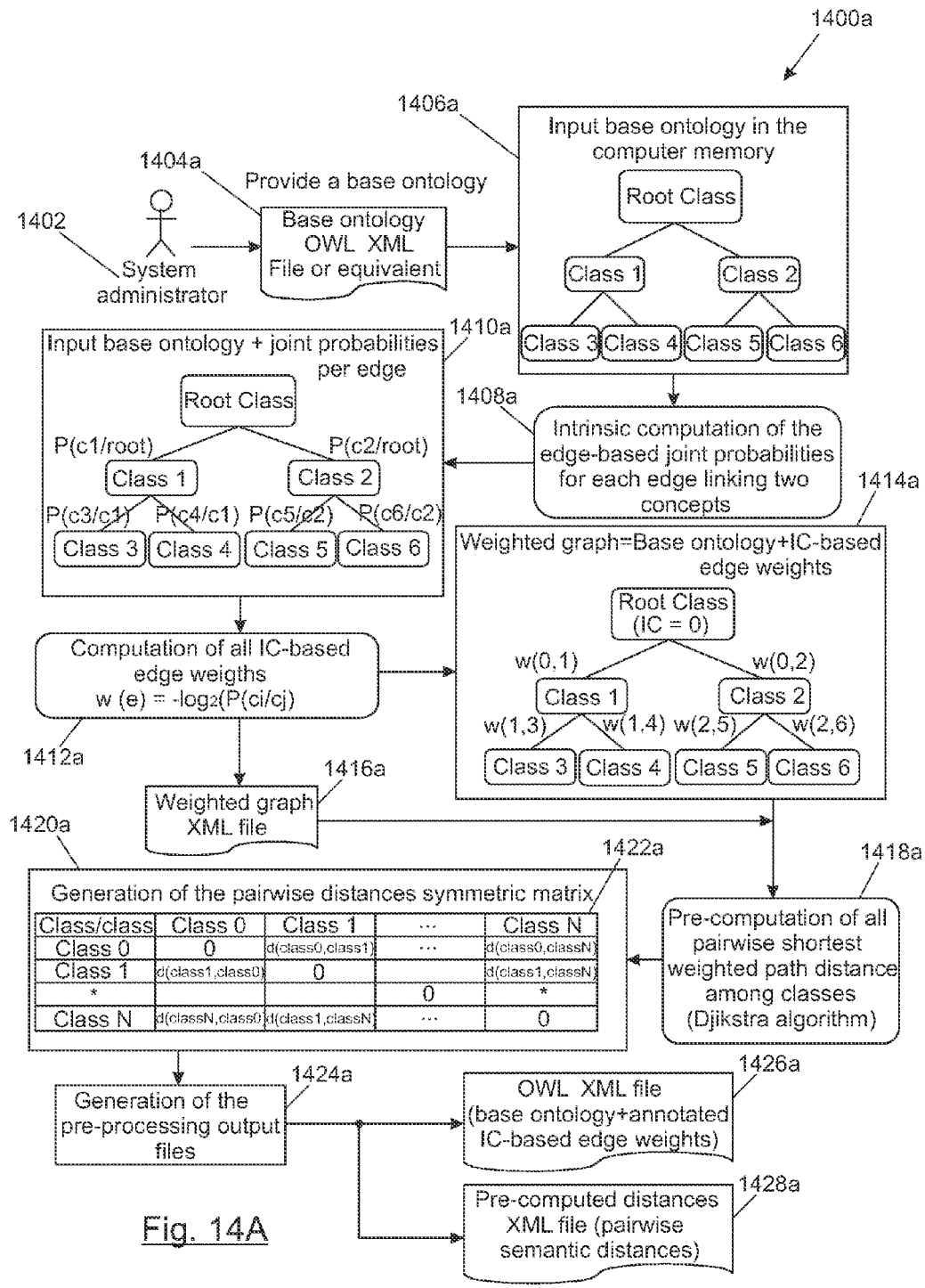
FIG. 14A shows a flowchart of a preferred embodiment of the pre-processing step of the proposed IR model.
Figure 14B:
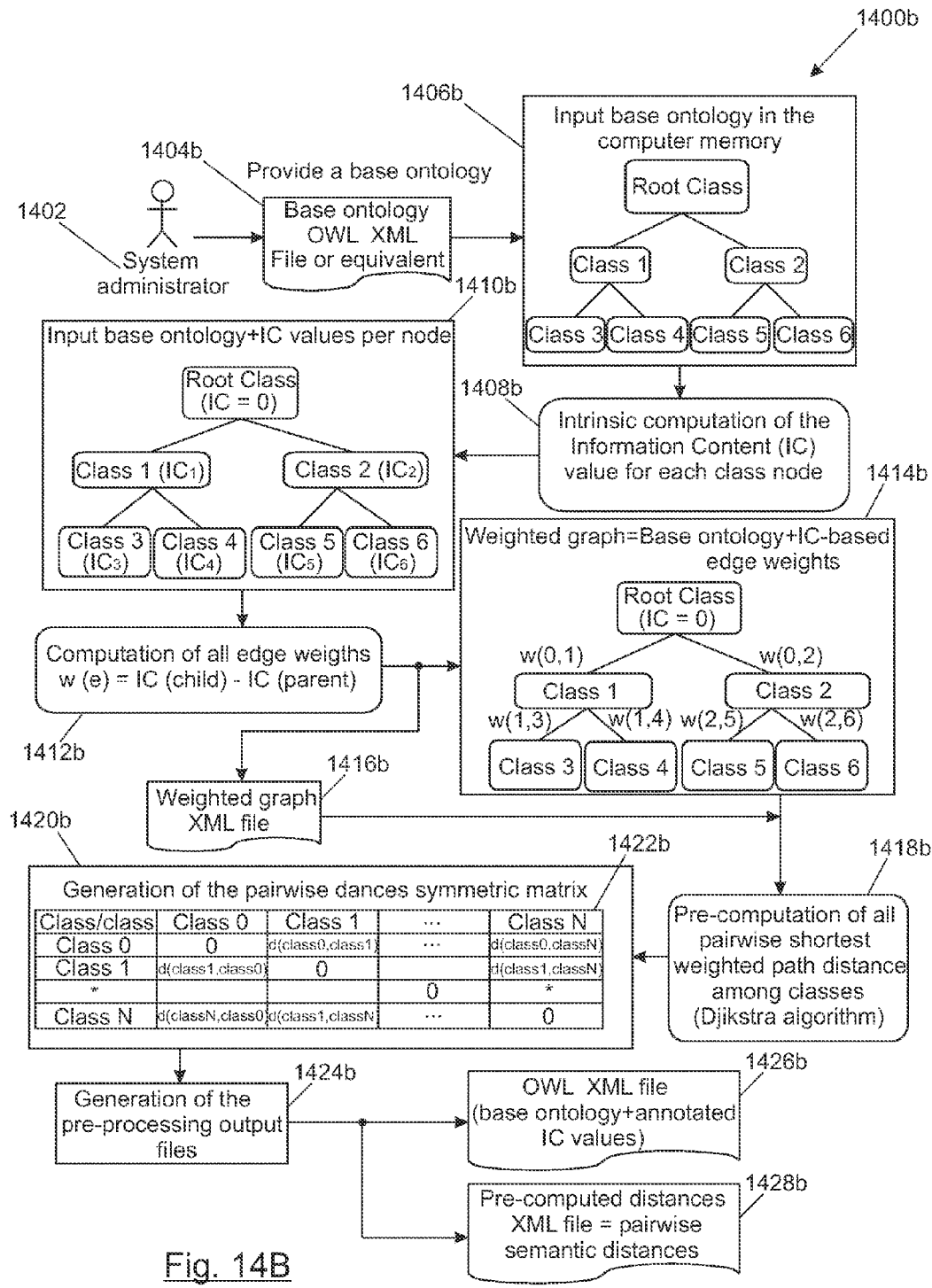
FIG. 14B shows a flowchart of another embodiment of the pre-processing step of the proposed IR model.

FIGS. 14A and 14B show two different preferred embodiments of a pre-processing method (1400a,1400b) for any indexing system based in the proposed IR model, whose main goal is computing all the static parameters required for the operation (loading and execution) of the proposed IR model. These parameters are, in the particular embodiment of FIG. 14A, the edge-based Information Content (IC) weights for the ontology edges and all pair-wise semantic distances among the classes of the ontology. In the embodiment of FIG. 14B these static parameters are the IC values for each ontology node and all pair-wise semantic distances among the classes of the ontology. The all pair-wise semantic distances correspond to the values of the function $d_{wJC}$ in row 13 of FIG. 9B. In a preferred embodiment the edge-based IC-weights of the embodiment of FIG. 14A are computed using the method previously disclosed, whose formula is given by equation (8) above. In the embodiment of FIG. 14B the IC values are computed using an intrinsic node-based IC-computation method (for instance, using the formula of equation (4)).

In step 1404a of the embodiment of FIG. 14A and step 1404b of the embodiment of FIG. 14B the system administrator 1402 provides a base ontology, for instance in OWL XML format file or other equivalent format. In step 1406a/1406b the system reads the input file and loads the base ontology in the computer memory. In step 1408a the system computes the joint probabilities values for each edge (FIG. 14A) using the preferred method, for instance defined by the equation (8), while in step 1408b the system computes the IC values for each class node (FIG. 14B) within the ontology using the equation (4). In step 1410a the system assigns the computed joint probabilities to each edge (FIG. 14A), while in step 1410b the system assigns de IC values for each node (FIG. 14B) of the base ontology. In step 1412a of FIG. 14A the system computes all the IC-based edge weights values for the edges of the ontology as the negative binary logarithm of the joint probabilities for each edge, such as is defined by the edge-valued function w(ei) in the equation (3), generating the weighted-graph 1414a, which is stored in the computer memory, and a XML file 1416a containing the data representation for the weighted-graph associated to the base ontology. In step 1412b the system computes all the edge weights values for the edges of the ontology (IC value of the child minus IC value of the parent), generating two different outputs: the weighted-graph 1414b stored in the computer memory, and a XML file 1416b containing the data representation for the weighted-graph associated to the base ontology. In step 1418a/1418b the system computes all the pair-wise distances among concepts of the weighted-graph, using the novel weighted Jiang-Conrath distance denoted by $d_{wJC}$, which is defined as the shortest path between two concepts, as shown in row 13 of FIG. 9B. The shortest path can be computed using any known variant of the Dijkstra algorithm, or any other method proposed in the literature. For the computation of all pair-wise distance among concepts within the weighted-graph, the system can use the representation of the weighted-graph 1414a/1414b stored in the computer memory and any shortest path implemented algorithm, or it can invoke any external program or library using the information in the XML file 1416b. In step 1420a/1420b, the system represents the distance matrix 1422a/1422b in the computer memory whenever it is possible, or uses any file-storing method to save this information. Finally, in step 1424a/1424b, the system generates the final pre-processing files as follows: an OWL XML file 1426a/1426b with the base ontology plus the IC-values for each edge (FIG. 14A) or node (FIG. 14B), and a XML file 1428a/1428b containing the pair-wise semantic distances for the base ontology.

To summarize, the pre-processing goal is to compute all the data needed for the loading and execution of the proposed IR mode as follows:

(1) the computation 1408a/1408b of all the edge-based joint probabilities or node-based IC-values, using for instance the method defined by equation (7) or equation (8), and the equation (4), where hypo(c) is the number of subsumed child or descendants concepts (hyponyms) of the concept c, whereas |children(c)| in equation (7) refers only to the number of direct child concepts; and (2) the computation 1418a/1418b of all the pair-wise distance among the classes within the base ontology provided by the users, which can be computed by any graph-based shortest path algorithm as the revised ones in [Abuja et al., 1990] or any variant of the well-known Dijkstra's algorithm.

Search and Retrieval Method.

Figure 15:
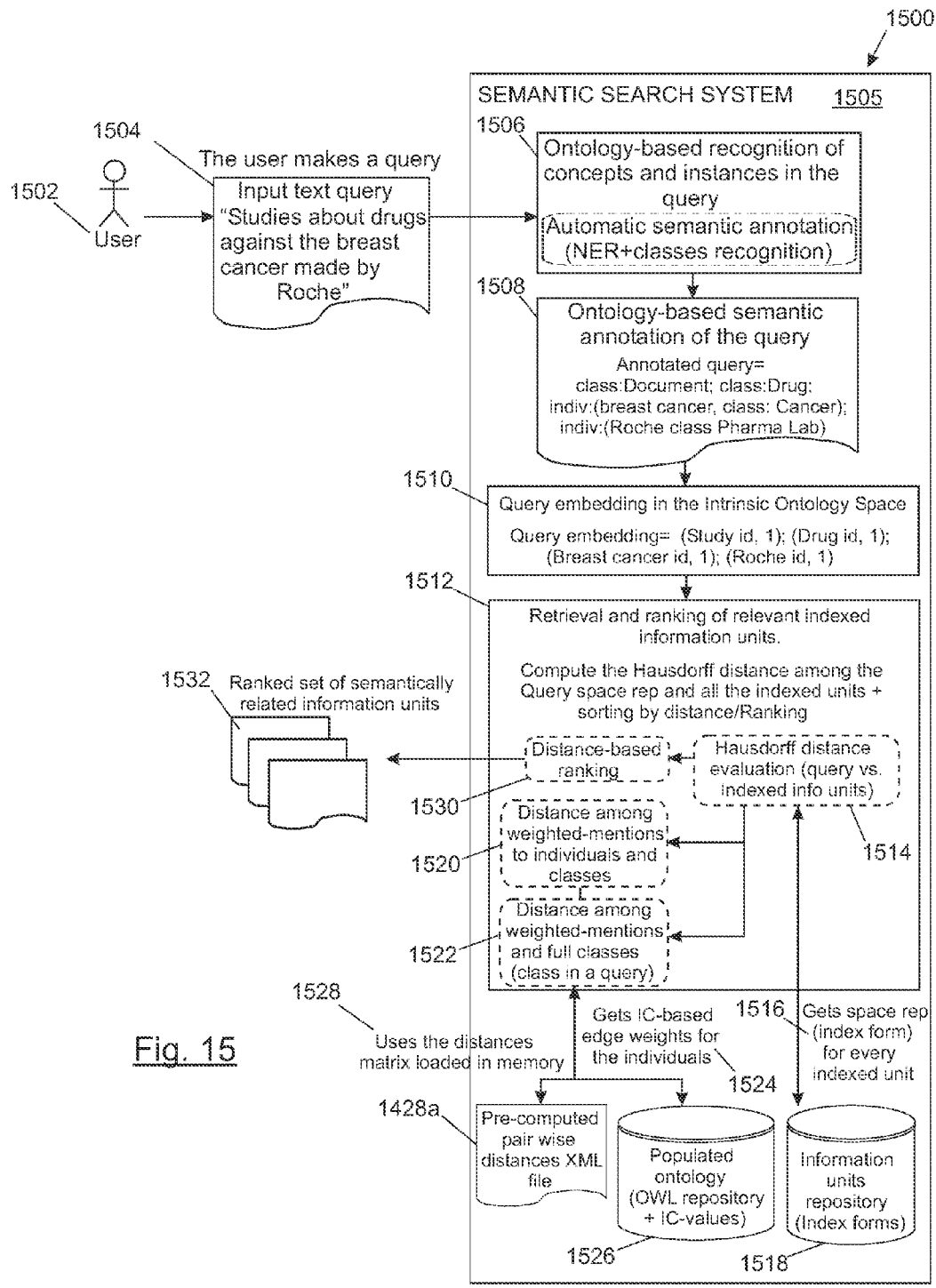
FIG. 15 shows a flowchart describing the method to compute a set of ranked information unit as answer to an input query provided by any user.

FIG. 15 shows the flowchart of the search and retrieval method 1500 to be used by any search system based in the proposed IR model. The user 1502 first provides an input query 1504 in text format, or other symbolic representation, which is fed into the semantic search system 1505 based in Intrinsic Ontology Spaces. Then, in step 1506 the semantic search system 1505 uses any automatic semantic annotator, out of the scope of the present invention, to convert the input query 1504 into a set of semantic annotations (ontology-based semantic annotation of the query 1508 or, in short, annotated query 1508) to individuals or classes within the populated base ontology of the system. In step 1510 the annotated query 1508 is embedded in the Intrinsic Ontological Space defined in row 15 of FIG. 9B. In the step 1510, id represents the unique identifier of any class or individual in the populated ontology, and the integer field "1" encodes a whole mention to any concept or individual within the populated base ontology. In step 1512 the retrieval and ranking of the relevant indexed information units (documents), with respect to the input query, is performed. The retrieval and ranking is based in the Hausdorff distance among the query and the indexed units. In step 1514, the semantic search system 1505 computes the ontology-based ranking function $d_D$ defined by row 17 in FIG. 9B. The ranking $d_D$ is defined by the Hausdorff distance (dH) between the representation of the query (step 1510) and the representation of every indexed document. The representation of the queries and documents is defined by a set of weighted-mentions to classes and individuals. The computation of the Hausdorff distance requires the computation of all pair-wise distances among the weighted-mentions of the queries and the weighted-mentions of the indexed documents, according to the metric of the representation space, given by dX in row 14 of FIG. 9B. In step 1516 the semantic search system 1505 gets the space representation for every indexed unit included in the information units repository 1518, where every indexed unit is represented by a set of weighted-mentions to classes or individuals. For the computation of pair-wise distances, we distinguish two cases as follows:

For mentions to individuals in a query, in step 1520 the distance between weighted-mention to individuals and classes is computed using the formula for $d_X$ in row 14 of FIG. 9B.

For mentions to (full) classes in a query, in step 1522 the distance between weighted-mentions and full classes is computed using the formula dIC in row 18 of FIG. 9B. For example, the distance between the whole mention to the class drug (Drug, 1) in step 1510 and any weighted-mention to class or individual within the populated ontology, is computed using the formula dIC in tow 18 of FIG. 9B.

In step 1524 the semantic search system 1505 gets the edge-based IC-values (weights) for the weighted-mentions to individuals and classes (which are used in the formula for $d_X$), accessing a populated ontology repository 1526, which includes the pre-computed OWL XML file 1426a with the base ontology and the IC-values (for the embodiment of FIG. 14B the semantic search system 1505 gets the IC values). In step 1528 the semantic search system 1505 uses the distances matrix loaded in memory, by accessing the pre-computed XML file 1428a containing the pair-wise semantic distances for the base ontology. Finally, the semantic search system 1505 performs the distance-based ranking 1530 and outputs a set of ranked information units 1532 semantically related to the query.

To sum up, the main goal of the method represented in FIG. 15 is the retrieving of a set of ranked documents as answer to any input query provided by the users. The documents are ranked according to their semantic similarity with the semantic representation of any input query. The steps 1506, 1508 and 1510 in the flowchart have as main purpose to convert the input query into a semantic information unit in the semantic space defined by the proposed IR model. One specific feature of the present approach is that the mentions to classes in the query are interpreted as references to the whole class; thus, the classes are embedded in the representation space as geometric regions which subsume all their descendant nodes within the populated ontology of the indexing system. This can be appreciated in step 1508, where the mention to the "Drug" concept has been defined as a whole class "class: Drug". The step 1512 includes the Hausdorff distance 1514 to compare the query with all the indexed units, and the distance-based ranking 1530 to sort the results according to the measured distance in the representation space. The Hausdorff distance uses two different functions to measure the distance among the query and any indexed unit: the metric of the representation space to compute the distance among weighted-mention to individuals or classes (step 1520); and the distance among any weighted-mention to individual or class and any whole class (step 1522). The distance function in step 1520 is defined by the function in row 14 of FIG. 9B, whereas the distance function in step 1522 is the defined in row 18 of FIG. 9B.

Indexing Method of Semantically Annotated Information Units.

Figure 16:
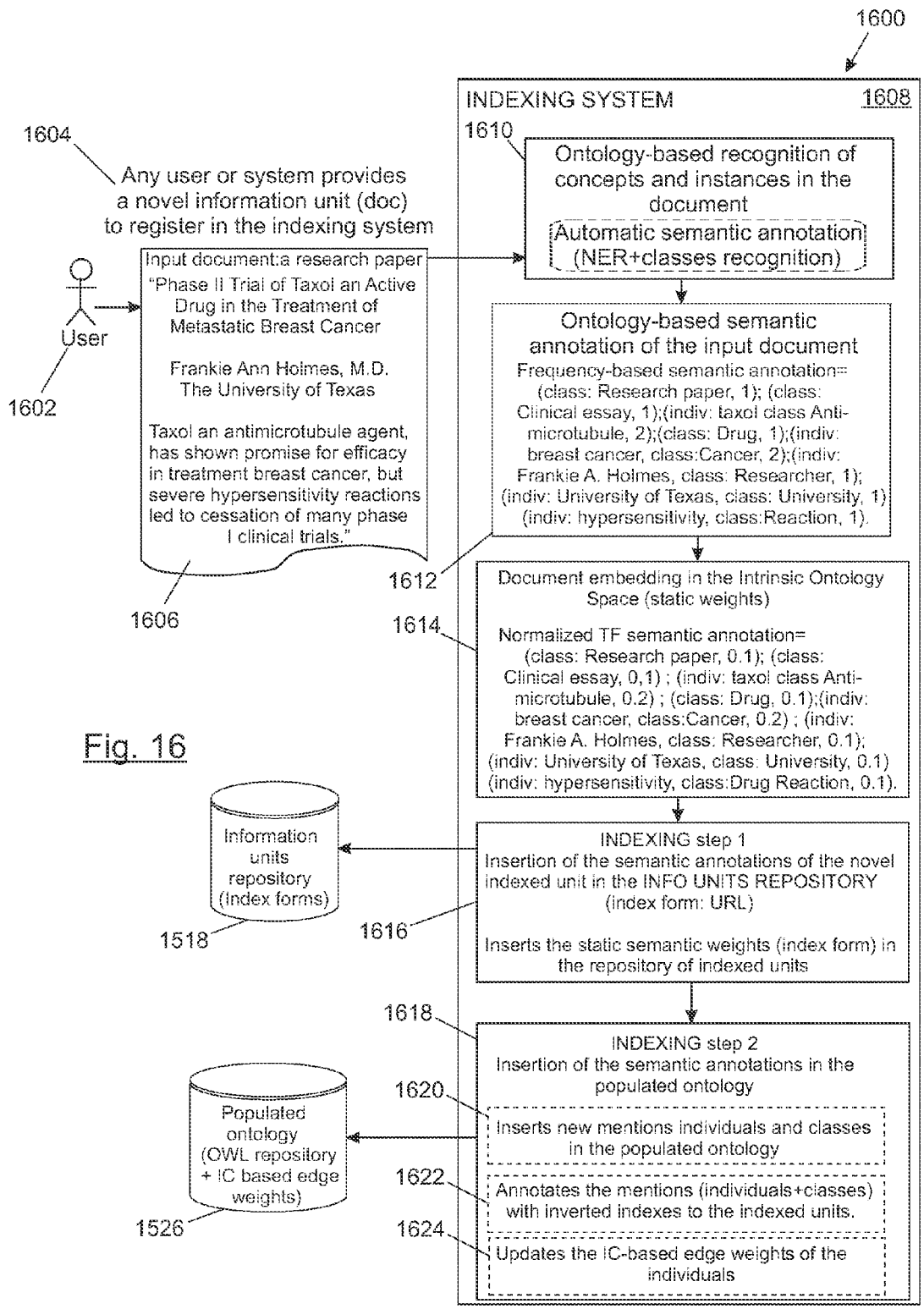
FIG. 16 shows a flowchart describing the indexing method for any novel information unit to store in the system ontology-based repository.

FIG. 16 shows the method for indexing 1600 any additional information unit (e.g. a new document) into a search system based on the proposed model, and then storing it in the system ontology-based repository. First, in step 1604 a user 1602 provides a new information unit, such as a text document 1606, to be registered by the indexing system 1608. In step 1610 the same automatic semantic annotator used in the query process (in step 1506 of FIG. 15) is used to identify the mentions to individuals and classes which are present, or able to be represented, in the populated base ontology. The semantic annotation step 1612 produces a set of semantic annotations plus its frequency within the input document. In another preferred embodiment these steps 1610 and 1612 are performed externally to the indexing system 1608, such that the indexing system 1610 retrieves the semantic annotations and frequency directly from an automatic semantic annotator. In step 1614 the document is embedded (represented) in the Intrinsic Ontological Spaces as a set of normalized weighted-mentions to classes and individuals in the base ontology. The indexing step is split in two:

A first indexing step 1616 has as main aim the storing of the index form, defined by a set of static semantic weights (normalized frequency of the mentions), into the repository 1518 of the indexed information units.

A second indexing step 1618 has as main goal the storing of the semantic annotations of the input document in the populated ontology repository 1526. The new mentions to individuals and classes are inserted in the populated ontology (sub-step 1620). The new annotations are extended to keep the inverted index to the indexed units where it appears (sub-step 1622). The edge-based IC-values (for the embodiment of FIG. 14A) or node-based IC-values (for the embodiment of FIG. 14B) for the registered individuals are updated (sub-step 1624), in the first case according to the updated joint probability between the individuals and their parent concepts.

To summarize, in the example shown in FIG. 16 the user provides a research paper in the bioengineering field as input document 1606 to be indexed by the indexing system 1608. An automatic semantic annotator, out of the scope of this invention, identifies mentions to classes and individuals according to the conceptual model defined by the base ontology. Then, the semantic annotator produces a frequency-based semantic annotation of the document (step 1612). In step 1614 the indexing system 1608 computes the embedding of the document in the representation space, which consists in a collection of normalized weighted-mentions to the classes and individuals stored within the base ontology. The collection of tuples (node type, node identifier, static weight) defines a whole index for each unit indexed by the system. The indexing system 1608 stores 1616 the index form for the inserted document in the indexing repository 1518, updates the populated ontology to store the new individuals (sub-step 1620), to annotate the classes and individuals with back references to the indexed units (sub-step 1622), and to update the joint probabilities and IC-values of the individuals (sub-step 1624). It is important to note that the IC-values for the edges linking the classes are static, and their value has been already computed in the pre-processing step described in FIG. 14.

We claim:

1. A computer-implemented method for retrieving semantically relevant information units from a collection of semantically annotated indexed information units in response to a query, the method comprising:
    receiving, by a computer system, a semantically annotated query, the semantically annotated query including a set of semantic annotations to individuals or classes within a determined populated base ontology;
    embedding, by the computer system, the semantically annotated query in a semantic representation space of an ontology-based IR model that uses a metric space for the representation of the indexed information units, the semantically annotated query being embedded as a set of weighted-mentions to individuals or classes within the populated base ontology;
    obtaining, by the computer system, the representation in the semantic representation space for every indexed information unit of the collection;
    computing, by the computer system, the Hausdorff distance between the space representation of the query and the space representation of all the indexed information units of the collection, wherein the Hausdorff distance is based on the weighted distance of the metric space defined as the shortest IC-based weighted-path between two ontology nodes, wherein the weighted distance of the metric space is the sum of IC-based weights for all the edges along the shortest weighted-path joining the ontology nodes;
    retrieving and ranking, by the computer system, the relevant information units based on the computed Hausdorff distance,
wherein the weights of the edges are defined by the information-content value of the joint probability P(ci|cj) between any child concept ci and its parent concept cj, and the joint probability P(ci|cj) is $$P(c_i \mid c_j) = \frac{1}{|\text{children}(c_j)|},$$

wherein |children(ci)| is the number of direct child concepts;

$$P(c_i \mid c_j) = \frac{hypo(c_i) + 1}{\sum_{\forall i \mid c_j = LA(c_i)} (hypo(c_i) + 1)},$$

wherein hypo(ci) defines the number of subsumed concepts by the concept ci without including it; or $$P(c_i \mid c_j) = \frac{leaves(c_i) + 1}{\sum_{\forall i \mid c_j = LA(c_i)} (leaves(c_i) + 1)},$$

wherein leaves(ci) is the number of leaf concepts subsumed by the concept (ci) without including it.

2. The computer-implemented method of claim 1, further comprising:
    receiving, by the computer system, an input query in natural language;
    converting, by the computer system, the input query into the semantically annotated query with regard to the populated base ontology.

3. The computer-implemented method of claim 1, wherein a mention to a class in the semantically annotated query is considered as a reference to a full class, the mentioned full class subsuming all the descendant individuals and classes within the populated base ontology.

4. The computer-implemented method of claim 1, wherein the step of computing the Hausdorff distance comprises:
    retrieving information-content values of the populated base ontology;
    retrieving pre-computed pair-wise semantic distances between all the classes within the base ontology;
    computing all pair-wise semantic distances between the weighted-mentions of the query and the weighted-mentions of the indexed information units of the collection, using the information-content values and the pre-computed pair-wise semantic distances according to the metric of the representation space.

5. The computer-implemented method of claim 4, wherein the information-content values are retrieved by accessing a populated ontology repository.

6. The computer-implemented method of claim 4, wherein the information-content values of the populated base ontology include IC values for each ontology node computed using an intrinsic node-based IC-computation method.

7. The computer-implemented method of claim 4, wherein the information-content values of the populated base ontology include edge-based IC weights for each ontology edge, computed using an intrinsic edge-based IC-computation method.

8. The computer-implemented method of claim 4, wherein the pre-computed pair-wise semantic distances are retrieved by accessing a file.

9. The computer-implemented method of claim 4, wherein the pair-wise semantic distances between two ontology nodes are computed as the shortest IC-based weighted-path of the populated base ontology considering all possible paths between said two nodes, and that the edges of the taxonomy can be traversed in any direction.

10. The computer-implemented method of claim 4, wherein the computation of pair-wise semantic distances between two ontology nodes includes the computation of a weighted distance value which is the sum of the edge weights for all the edges of the populated base ontology along the shortest weighted-path joining said two ontology nodes.

11. The computer-implemented method of claim 10, wherein the edge weight between two adjacent nodes of the populated base ontology is the information-content value of the joint probability between said two adjacent nodes, wherein the sum of all the joint probabilities for the subsumed concepts of any parent concept is equal to 1.

12. The computer-implemented method of claim 11, wherein the information-content value of the joint probability between two adjacent nodes is computed as the negative binary logarithm of the joint probability.

13. The computer-implemented method of claim 10, wherein the edge weight between two adjacent nodes of the populated base ontology is the information-content value of the child node minus the information-content value of the parent node.

14. The computer-implemented method of claim 1, wherein the information units are text documents, web pages, sentences, multimedia objects or any sort of data that can be represented as a collection of classes or individuals within an ontology.

15. The computer-implemented method of claim 1, wherein the ontological representation space defined by the ontology-based IR model satisfies the following structure-preserving axioms: order invariance, metric invariance and inclusion invariance.

16. A semantic search system for retrieving semantically relevant information units from a collection of semantically annotated indexed information units in response to a query, the semantic search system comprising a processor and a memory coupled with and readable by the processor and storing a set of instructions which, when executed by the processor, causes the processor to:
  receive a semantically annotated query, the semantically annotated query including a set of semantic annotations to individuals or classes within a determined populated base ontology;
  embed the semantically annotated query in a semantic representation space of an ontology-based IR model that uses a metric space for the representation of the indexed information units, the semantically annotated query being embedded as a set of weighted-mentions to individuals or classes within the populated base ontology;
  obtain the representation in the semantic representation space for every indexed information unit of the collection;
  compute the Hausdorff distance between the space representation of the query and the space representation of all the indexed information units of the collection, wherein the Hausdorff distance is based on the weighted distance of the metric space defined as the shortest IC-based weighted-path between two ontology nodes, wherein the weighted distance of the metric space is the sum of IC-based weights for all the edges along the shortest weighted-path joining the ontology nodes;
  retrieve and rank the relevant information units based on the computed Hausdorff distance wherein the weights of the edges are defined by the information-content value of the joint probability $P(c_i|c_j)$ between any child concept $c_i$ and its parent concept $c_j$.

17. The system of claim 16, wherein the processor is further configured to:
  receive an input query in natural language;
  convert the input query into the semantically annotated query with regard to the populated base ontology.

18. The system of claim 16, wherein a mention to a class in the semantically annotated query is considered by the processor as a reference to a full class, the mentioned full class subsuming all the descendant individuals and classes within the populated base ontology.

19. The system of claim 16, wherein the computing of the Hausdorff distance comprises:
  retrieving information-content values of the populated base ontology;
  retrieving pre-computed pair-wise semantic distances between all the classes within the base ontology;
  computing all pair-wise semantic distances between the weighted-mentions of the query and the weighted-mentions of the indexed information units of the collection, using the information-content values and the pre-computed pair-wise semantic distances according to the metric of the representation space.

20. The system of claim 19, wherein the information-content values are retrieved by accessing a populated ontology repository.

21. The system of claim 19, wherein the information-content values of the populated base ontology include IC values for each ontology node computed using an intrinsic node-based IC-computation method.

22. The system of claim 19, wherein the information-content values of the populated base ontology include edge-based IC weights for each ontology edge, computed using an intrinsic edge-based IC-computation method.

23. The system of claim 19, wherein the pre-computed pair-wise semantic distances are retrieved by accessing a file.

24. The system of claim 19, wherein the pair-wise semantic distances between two ontology nodes are computed as the shortest IC-based weighted-path of the populated base ontology considering all possible paths between said two nodes, and that the edges of the taxonomy can be traversed in any direction.

25. The system of claim 19, wherein the computation of pair-wise semantic distances between two ontology nodes includes the computation of a weighted distance value which is the sum of the edge weights for all the edges of the populated base ontology along the shortest path joining said two ontology nodes.

26. The system of claim 25, wherein the edge weight between two adjacent nodes of the populated base ontology is the information-content value of the joint probability between said two adjacent nodes, wherein the sum of all the joint probabilities for the subsumed concepts of any parent concept is equal to 1.

27. The system of claim 26, wherein the information-content value of the joint probability between two adjacent nodes is computed as the negative binary logarithm of the joint probability.

28. The system of claim 25, wherein the edge weight between two adjacent nodes of the populated base ontology is the information-content value of the child node minus the information-content value of the parent node.

29. The system of claim 16, wherein the information units are text documents, web pages, sentences, multimedia objects or any sort of data that can be represented as a collection of classes or individuals within an ontology.

30. The system of claim 16, wherein the ontological representation space defined by the ontology-based IR model satisfies the following structure-preserving axioms: order invariance, metric invariance and inclusion invariance.

31. A computer-readable memory for retrieving semantically relevant information units from a collection of semantically annotated indexed information units in response to a query, the computer-readable memory comprising a set of instructions stored therein which, when executed by a processor, causes the processor to:
receive a semantically annotated query, the semantically annotated query including a set of semantic annotations to individuals or classes within a determined populated base ontology;
embed the semantically annotated query in a semantic representation space of an ontology-based IR model that uses a metric space for the representation of the indexed information units, the semantically annotated query being embedded as a set of weighted-mentions to individuals or classes within the populated base ontology;
obtain the representation in the semantic representation space for every indexed information unit of the collection;
compute the Hausdorff distance between the space representation of the query and the space representation of all the indexed information units of the collection, wherein the Hausdorff distance is based on the weighted distance of the metric space defined as the shortest IC-based weighted-path between two ontology nodes, wherein the weighted distance of the metric space is the sum of IC-based weights for all the edges along the shortest weighted-path joining the ontology nodes;
retrieve and rank the relevant information units based on the computed Hausdorff distance, wherein the weights of the edges are defined by the information-content value of the joint probability P(ci|cj) between any child concept ci and its parent concept cj, or by the information-content value of the child concept ci minus the information-content value of the parent concept cj.

32. The computer-implemented method of claim 1, wherein $$P(c_i \mid c_j) = \frac{1}{|\text{children}(c_j)|},$$

and
|children($c_j$)| is the number of direct child concepts.

33. The computer-implemented method of claim 1, wherein $$P(c_i \mid c_j) = \frac{hypo(c_i) + 1}{\sum_{\forall i \mid c_j = LA(c_i)} (hypo(c_i) + 1)},$$

and hypo(ci) defines the number of subsumed concepts by the concept ci without including it.

34. The computer-implemented method of claim 1, wherein the weights of the edges are defined by the information content value of the joint probability P(c+cj) between any child concept ci and its parent concept cj, wherein $$P(c_i \mid c_j) = \frac{leaves(c_i) + 1}{\sum_{\forall i \mid c_j = LA(c_i)} (leaves(c_i) + 1)},$$

and wherein leaves(ci) is the number of leaf concepts subsumed by the concept (ci) without including it.

35. A computer-implemented method for retrieving semantically relevant information units from a collection of semantically annotated indexed information units in response to a query, the method comprising:
receiving, by a computer system, a semantically annotated query, the semantically annotated query including a set of semantic annotations to individuals or classes within a determined populated base ontology;
embedding, by the computer system, the semantically annotated query in a semantic representation space of an ontology-based IR model that uses a metric space for the representation of the indexed information units, the semantically annotated query being embedded as a set of weighted-mentions to individuals or classes within the populated base ontology;
obtaining, by the computer system, the representation in the semantic representation space for every indexed information unit of the collection;
computing, by the computer system, the Hausdorff distance between the space representation of the query and the space representation of all the indexed information units of the collection, wherein the Hausdorff distance is based on the weighted distance of the metric space defined as the shortest IC-based weighted-path between two ontology nodes, wherein the weighted distance of the metric space is the sum of IC-based weights for all the edges along the shortest weighted-path joining the ontology nodes;
retrieving and ranking, by the computer system, the relevant information units based on the computed Hausdorff distance, wherein the weights of the edges are defined by the information-content value of the child concept ci minus the information-content value of the parent concept cj, $w(e_{ij})=IC(c_i)-IC(c_j)$, and the weights of the edges w (eij) is
$w(e_{ij})=\log_2|\text{children}|(c_j)$, wherein |children($c_i$)| is the number of direct child concepts;

$$w(e_{ij}) = -\log_2 \left( \frac{hypo(c_i) + 1}{\sum_{\forall i \mid c_j = LA(c_i)} (hypo(c_i) + 1)} \right),$$

wherein hypo(ci) defines the number of subsumed concepts by the concept ci without including it or $$w(e_{ij}) = -\log_2\left(\frac{\text{leaves}(c_i) + 1}{\sum_{\forall i | c_j = LA(c_i)} (\text{leaves}(c_i) + 1)}\right),$$

wherein leaves(ci) is the number of leaf concepts subsumed by the concept (ci) without including it.

36. The computer-implemented method of claim 35, wherein $$w(e_{ij}) = -\log_2\left(\frac{\text{hypo}(c_i) + 1}{\sum_{\forall i | c_j = LA(c_i)} (\text{hypo}(c_i) + 1)}\right),$$

and hypo(ci) defines the number of subsumed concepts by the concept ci without including it.

37. The computer-implemented method of claim 35, wherein $$w(e_{ij}) = -\log_2\left(\frac{\text{leaves}(c_i) + 1}{\sum_{\forall i | c_j = LA(c_i)} (\text{leaves}(c_i) + 1)}\right),$$

and leaves(ci) is the number of leaf concepts subsumed by the concept (ci) without including it.

38. The system of claim 16, wherein the weights of the edges are defined by the information-content value of the child concept ci minus the information-content value of the parent concept cj.

39. The computer-implemented method of claim 35, wherein $w(e_{ij}) = \log_2 |\text{children}(c_j)|$, and $|\text{children}(c_i)|$ is the number of direct child concepts.

40. The computer-implemented method of claim 35, further comprising:
receiving, by the computer system, an input query in natural language;
converting, by the computer system, the input query into the semantically annotated query with regard to the populated base ontology.

41. The computer-implemented method of claim 35, wherein a mention to a class in the semantically annotated query is considered as a reference to a full class, the mentioned full class subsuming all the descendant individuals and classes within the populated base ontology.

42. The computer-implemented method of claim 35, wherein the step of computing the Hausdorff distance comprises:
retrieving information-content values of the populated base ontology;
retrieving pre-computed pair-wise semantic distances between all the classes within the base ontology;
computing all pair-wise semantic distances between the weighted-mentions of the query and the weighted-mentions of the indexed information units of the collection, using the information-content values and the pre-computed pair-wise semantic distances according to the metric of the representation space.

43. The computer-implemented method of claim 42, wherein the information-content values are retrieved by accessing a populated ontology repository.

44. The computer-implemented method of claim 42, wherein the information-content values of the populated base ontology include IC values for each ontology node computed using an intrinsic node-based IC-computation method.

45. The computer-implemented method of claim 42, wherein the information-content values of the populated base ontology include edge-based IC weights for each ontology edge, computed using an intrinsic edge-based IC-computation method.

46. The computer-implemented method of claim 42, wherein the pre-computed pair-wise semantic distances are retrieved by accessing a file.

47. The computer-implemented method of claim 42, wherein the pair-wise semantic distances between two ontology nodes are computed as the shortest IC-based weighted-path of the populated base ontology considering all possible paths between said two nodes, and that the edges of the taxonomy can be traversed in any direction.

48. The computer-implemented method of claim 42, wherein the computation of pair-wise semantic distances between two ontology nodes includes the computation of a weighted distance value which is the sum of the edge weights for all the edges of the populated base ontology along the shortest weighted-path joining said two ontology nodes.

49. The computer-implemented method of claim 48, wherein the edge weight between two adjacent nodes of the populated base ontology is the information-content value of the joint probability between said two adjacent nodes, wherein the sum of all the joint probabilities for the subsumed concepts of any parent concept is equal to 1.

50. The computer-implemented method of claim 49, wherein the information-content value of the joint probability between two adjacent nodes is computed as the negative binary logarithm of the joint probability.

51. The computer-implemented method of claim 49, wherein the edge weight between two adjacent nodes of the populated base ontology is the information-content value of the child node minus the information-content value of the parent node.

52. The computer-implemented method of claim 35, wherein the information units are text documents, web pages, sentences, multimedia objects or any sort of data that can be represented as a collection of classes or individuals within an ontology.

53. The computer-implemented method of claim 35, wherein the ontological representation space defined by the ontology-based IR model satisfies the following structure-preserving axioms: order invariance, metric invariance and inclusion invariance.

* * * * *